(12) United States Patent
Scott et al.

(10) Patent No.: US 11,353,371 B2
(45) Date of Patent: Jun. 7, 2022

(54) TENSION IN POST-TENSIONED RODS

(71) Applicant: FDH INFRASTRUCTURE SERVICES, LLC, Raleigh, NC (US)

(72) Inventors: Joshua Scott, Raleigh, NC (US); Armita Mohammadian, Raleigh, NC (US); David Milligan, Raleigh, NC (US)

(73) Assignee: FDH Infrastructure Services, LLC, Raleigh, NC (US)

( * ) Notice: Subject to any disclaimer, the term of this patent is extended or adjusted under 35 U.S.C. 154(b) by 0 days.

(21) Appl. No.: 17/432,341

(22) PCT Filed: Nov. 6, 2020

(86) PCT No.: PCT/US2020/059495
§ 371 (c)(1),
(2) Date: Aug. 19, 2021

(87) PCT Pub. No.: WO2021/092450
PCT Pub. Date: May 14, 2021

(65) Prior Publication Data
US 2022/0099509 A1    Mar. 31, 2022

Related U.S. Application Data

(60) Provisional application No. 62/933,737, filed on Nov. 11, 2019, provisional application No. 62/931,673, (Continued)

(51) Int. Cl.
*G01L 1/10* (2006.01)
*G01L 5/04* (2006.01)

(52) U.S. Cl.
CPC .......... *G01L 1/10* (2013.01); *G01L 5/042* (2013.01)

(58) Field of Classification Search
CPC .................... G01L 1/10; G01L 5/042
See application file for complete search history.

(56) References Cited

U.S. PATENT DOCUMENTS

2003/0145654 A1    8/2003    Knudsen et al.
2009/0251269 A1    10/2009   Stelzer et al.
(Continued)

FOREIGN PATENT DOCUMENTS

WO    2006/016787 A1    2/2006

OTHER PUBLICATIONS

PCT Written Opinion and International Search Report for PCT Patent Application No. PCT/US2020/059495 dated Apr. 1, 2021. 19 pages.

(Continued)

*Primary Examiner* — Paul M. West
(74) *Attorney, Agent, or Firm* — McAndrews, Held & Malloy, Ltd.

(57) ABSTRACT

The present disclosure provides systems, methods, and apparatuses for estimating tension in post-tensioned rods, such as anchor rods that support structural steel to concrete. A method of estimating tension in a target post-tension rod may include selecting a plurality of post-tensioned rods and modeling tension for the plurality of post-tensioned rods as a function of frequency differences between a first and a second modal frequency and cantilever length of each rod. The method may further include measuring the length of a cantilever of the target post-tensioned rod, determining first and second modal frequencies of the target post-tensioned rod, and determining a frequency difference between the first and second modal frequencies. The method may further include estimating tension in the target post-tensioned rod based on at least the model.

24 Claims, 35 Drawing Sheets

Related U.S. Application Data filed on Nov. 6, 2019, provisional application No. 62/931,671, filed on Nov. 6, 2019, provisional application No. 62/931,675, filed on Nov. 6, 2019, provisional application No. 62/931,662, filed on Nov. 6, 2019.

(56) References Cited

U.S. PATENT DOCUMENTS

| | | |
|---|---|---|
| 2011/0036180 A1* | 2/2011 | Cesare .................... G01L 5/042 73/862.42 |
| 2011/0130975 A1 | 6/2011 | Cesare et al. |
| 2011/0219712 A1 | 9/2011 | Clark et al. |
| 2013/0106447 A1 | 5/2013 | Bridges et al. |
| 2016/0274001 A1 | 9/2016 | Lin |
| 2018/0328797 A1* | 11/2018 | Gwon .................... B25B 23/14 |
| 2018/0371769 A1 | 12/2018 | Kang et al. |

OTHER PUBLICATIONS

Chacar, "Design of Cable Systems for Cable Suspension Bridges", Diss. Massachusetts Institute of Technology, Jun. 2001.

* cited by examiner

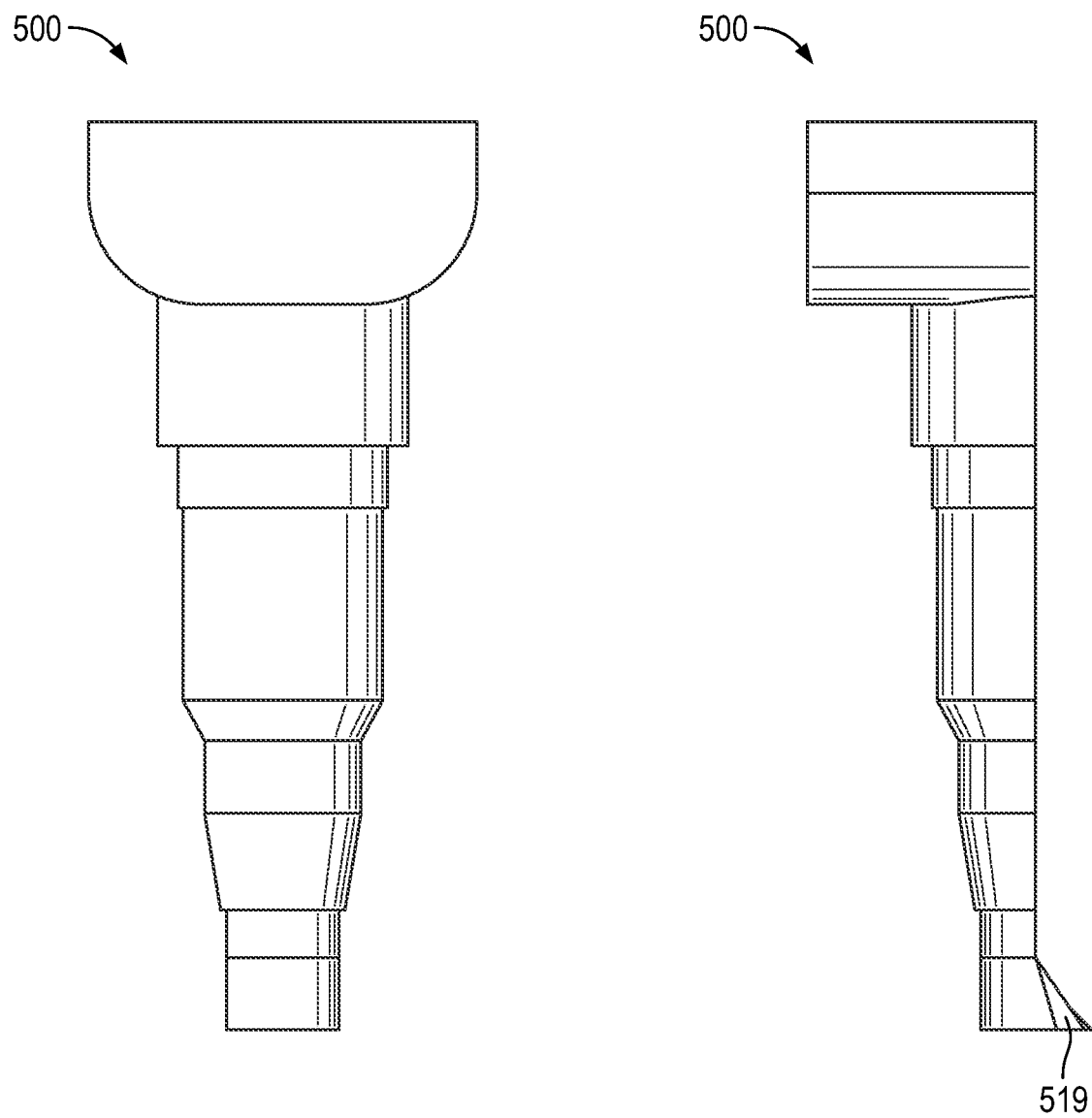
FIG. 12  FIG. 13

TENSION IN POST-TENSIONED RODS

CROSS REFERENCE TO RELATED APPLICATIONS

The present application is a U.S. national stage application under § 371 of International Patent Application No. PCT/US2020/059495, filed Nov. 6, 2020, which claims the benefit under 35 U.S.C. § 119(e) of the following U.S. provisional patent applications: U.S. Provisional Patent Application Ser. No. 62/931,671 filed Nov. 6, 2019 and titled "Systems and Methods for Estimating Tension in Post-Tensioned Rods"; U.S. Provisional Patent Application Ser. No. 62/931,673 filed Nov. 6, 2019 and titled "Systems and Methods for Modeling Tension in Post-Tensioned Rods"; U.S. Provisional Patent Application Ser. No. 62/933,737 filed Nov. 11, 2019 and titled "Systems and Methods for Estimating Tension in Post-Tensioned Rods Using Signal Damping"; U.S. Provisional Patent Application Ser. No. 62/931,675 filed Nov. 6, 2019 and titled "Apparatus and Methods for Orienting a Measuring Device on Post-Tensioned Rods"; and U.S. Provisional Patent Application Ser. No. 62/931,662 filed Nov. 6, 2019 and titled "Computer-Implemented Systems and Methods for Determining Modal Frequencies of Post-Tensioned Rods." The disclosures of all above-identified applications are expressly incorporated herein by reference in their entireties and are hereby made a part of this specification.

TECHNICAL FIELD

The present disclosure generally relates to evaluating tension in post-tensioned rods. More specifically, the present disclosure relates to systems, methods, and apparatuses for estimating, determining, and/or predicting tension in post-tensioned rods, such as anchor rods used to support structures.

BACKGROUND

Rods are used in structural systems for strength and stability. One type of rod is an anchor rod used to anchor structural steel to concrete (sometimes referred to as an "anchor bolt"). Depending on design considerations and constraints, anchor rods may be pre- or post-tensioned. An anchor rod can be pre-tensioned by imparting tensile forces onto the rod before embedding it within concrete, then allowing the concrete to set and to bond to the rod. Once the concrete sets and the ends of the rod are released, the tension in the rod is transferred into the concrete. Alternatively, an anchor rod can be post-tensioned by first embedding the rod in concrete, then applying tension after the concrete sets. For post-tensioned anchor rods, the rods are typically encased within a sheath in the concrete, such as in a PVC sleeve, to prevent the rod from bonding to the concrete. Instead of bonding, one end of the rod is fastened to an anchor assembly in the concrete while the other end of the rod remains outside, which can be used to anchor a structure.

FIG. 1 is a partial front elevation view illustrating an anchor rod 110 embedded in a concrete foundation 120. As illustrated, anchor rod 110 is encased within sheath 106 and clamped to the bottom anchor plate 102 with nuts 114. As further illustrated, an un-tensioned portion of the rod, cantilever 112, remains above anchor plate 102 and outside of concrete foundation 120. Once the concrete sets, cantilever 112 can be used to anchor a structure to the concrete foundation 120. An example application for anchor rod 110 is illustrated in FIG. 2, which is a perspective view of an anchor cage 100 that may be used to secure an onshore wind turbine to a concrete foundation 120. The entire anchor cage 100 would be embedded in a concrete foundation (not shown) with the two concentric rings of cantilevers 112 remaining above the concrete. Flanges on the base of a wind turbine would be placed on top of plate 104 and over cantilevers 112. An inside flange would be secured to the inner ring of cantilevers 112, while an outside flange would be secured to the outer ring of cantilevers 112. This is illustrated in FIG. 3, which is a partial view of anchor cage 100 after it has been embedded in a concrete foundation 120. As illustrated, outside flange 132 of wind turbine tower 130 is placed over the outer ring of cantilevers 112 and secured to the concrete foundation 120 with nuts 114.

The foregoing description is merely one example of post-tensioned rods. Post-tensioned rods can be used for structural support in many applications including, for example, wind turbines, communication towers, power transmission towers, light poles, rock anchors, buildings, bridges, dams, etc. In many circumstances, it is desirable to determine or estimate the amount of tension in a post-tensioned rod in situ. For example, to ensure that a structure does not collapse or tip over, engineers specify a tension to which an anchor rod must be set. For both safety and insurance purposes, the tension in anchor rods are periodically audited to ensure that the rods have not loosened over time, i.e., have a tension below the specified design tension.

One known method for auditing tension in post-tensioned rods is referred to as a "lift-off" method. This method requires applying an increasing load to the cantilevers of anchor rods until the point when the securing nut "lifts off" and becomes loose. At the point of lift-off, tension in the loaded cantilever will be substantially equal to tension in the anchor rod below the concrete. It can then be determined whether the loaded tension meets the specified design tension and, if not, the nut on the cantilever can be tightened at the specified tension. This method poses serious safety concerns and may not always work as intended. For one, it requires the use of heavy machinery, such as a hydraulic jack, which may not be easy or feasible to bring to a worksite and requires multiple people to operate. Moreover, if any anomalies exist in the anchor rod, such as cracks or corrosion, the rod can break during loading, potentially leading to a catastrophic collapse of the structure. Rust is another factor that can complicate matters. As explained above, anchor rods used to secure a structure typically remain exposed to the elements. Consequently, the exposed anchor rods and nuts inevitably rust over time. The rust can be so pervasive that the nut may not lift-off at all when the method is performed.

The lift-off method is also inefficient and time-consuming. For example, in the case of post-tensioned rods used to secure the base of a wind turbine to a concrete foundation, there can be as many as 120, 140, 200 or more anchor rods that secure the wind turbine. In practice, crews are often tasked with auditing the tension in about 10% of the anchor rods around the outside perimeter of the wind turbine base. Performing the lift-off method for each anchor rod requires at least two people and can take up to fifteen minutes or more for each rod. If the crew finds that even one of the audited rods has a tension below the specified design tension, the crew will typically test and tighten every remaining anchor rod. Consequently, it can take up to several days or more to audit the tension in anchor rods for just one structure. Considering that a wind farm can include numerous wind turbines (e.g., up to 100 or more), the lift-off method can be exceedingly time-consuming and expensive to audit tension in anchor rods. And, the safety concerns noted above are amplified when repeatedly performing the lift-off method for every anchor rod of every wind turbine at a wind farm. Also, if the tension in the audited anchor rods meets the specified design tension, critically, results from the lift-off method provide no insight about the tension for the remaining anchor rods that were not audited.

A safer and more efficient way of estimating, determining, and/or predicting tension in post-tensioned rods is therefore needed.

SUMMARY

The present disclosure provides systems, methods, and apparatuses for estimating, determining, and/or predicting tension in post-tensioned rods. The inventive systems, methods, and apparatuses generally involve creating a model for known tension levels in a subset of post-tensioned rods, then using the model to predict the tension in other post-tensioned rods. Because only a subset of post-tensioned rods are used to create the model, many of the safety concerns and inefficiencies of known methods are reduced or eliminated altogether. Indeed, the inventive systems, methods, and apparatuses can be applied to accurately predict the tension in all post-tensioned anchor rods at a wind farm in a fraction of the time and for a fraction of the cost of known methods. The inventive systems, methods, and apparatuses are also much safer than known methods because once a model is created, only the vibrational responses of post-tensioned rods are needed, which are procured in a non-destructive manner. Moreover, knowing the tension in every anchor rod can provide valuable insight for prioritizing which anchor rods to address for purposes of complying with design tensions.

In a first aspect, a method of estimating tension in a target post-tensioned rod is provided. The method includes modeling tension for the plurality of post-tensioned rods as a function of frequency differences between a first and a second modal frequency and cantilever length of each rod. The method further includes measuring the length of a cantilever of the target post-tensioned rod, determining a first modal frequency of the target post-tensioned rod, determining a second modal frequency of the target post-tensioned rod, and determining a frequency difference between the first modal frequency and the second modal frequency for the target post-tensioned rod. The method further includes estimating tension in the target post-tensioned rod based on at least the model.

In an embodiment of the first aspect, the step of modeling tension for the plurality of post-tensioned rods can include, for each post-tensioned rod in the plurality, obtaining a frequency response for one or more levels of tension and recording the length of a cantilever portion at each of the one or more levels of tension. The step can further include determining, from the frequency responses for each post-tensioned rod, frequency differences between first and second modal frequencies at each of the one or more levels of tension. The step can further include grouping the cantilever lengths into one or more groups. The step can further include performing regression analysis for each group, wherein the regression analysis is based on at least the frequency differences and the levels of tension.

In an embodiment of the first aspect, the step of obtaining a frequency response for one or more levels of tension can include setting tension in the post-tensioned rod to one or more levels of tension. The step can further include, for each level of tension, detachably coupling an accelerometer to the cantilever portion of the post-tensioned rod, applying one or more transversely-directed impacts to the cantilever portion of the post-tensioned rod, receiving temporal data from the accelerometer associated with a vibrational response for each of the one or more impacts, transforming the temporal data to the frequency domain to obtain a frequency response for each of the one or more impacts, measuring the level of tension in the post-tensioned rod, and associating a level of tension in the post-tensioned rod with each of the one or more frequency responses.

In an embodiment of the first aspect, the step of associating a level of tension in the post-tensioned rod with each of the one or more frequency responses can include finding, for each level of tension, an average of (a) the level of tension set in the post-tensioned rod and (b) the level of tension measured in the post-tensioned rod. The step can further include associating the average tension with each corresponding frequency response.

In an embodiment of the first aspect, the step of determining, from the frequency responses for each post-tensioned rod, frequency differences between first and second modal frequencies at each of the one or more levels of tension can include, for each level of tension, determining a value for the first modal frequency from each frequency response for that level of tension, determining a value for the second modal frequency from each frequency response for that level of tension, determining an average of the values for the first modal frequency, determining an average of the values for the second modal frequency, and determining a frequency difference between the average first modal frequency and the average second modal frequency.

In an embodiment of the first aspect, the step of grouping the cantilever lengths into one or more groups can include grouping the cantilever lengths into at least four groups.

In an embodiment of the first aspect, the cantilever length group can span approximately one-half inch.

In an embodiment of the first aspect, the step of determining a first modal frequency of the target post-tensioned rod can include detachably coupling an accelerometer to the cantilever portion of the target post-tensioned rod. The step can further include applying one or more transversely-directed impacts to the cantilever portion of the target post-tensioned rod. The step can further include receiving, from the accelerometer, data associated with a vibrational response for each of the one or more impacts. The step can further include determining, from the received data, a value for the first modal frequency for each of the one or more impacts, and determining a first modal frequency of the target post-tensioned rod based on an average of the values for the first modal frequency for the one or more impacts.

In an embodiment of the first aspect, the step of determining a second modal frequency of the target post-tensioned rod can include detachably coupling an accelerometer to the cantilever portion of the target post-tensioned rod. The step can further include applying one or more transversely-directed impacts to the cantilever portion of the target post-tensioned rod. The step can further include receiving, from the accelerometer, data associated with a vibrational response for each of the one or more impacts. The step can further include determining, from the received data, a value for the second modal frequency for each of the one or more impacts, and determining a second modal frequency of the target post-tensioned rod based on an average of the values for the second modal frequency for the one or more impacts.

In an embodiment of the first aspect, the step of estimating tension in the target post-tensioned rod based on at least the model can include identifying a level of tension in the model that corresponds to the frequency difference and the length of the cantilever portion of the target post-tensioned rod.

In an embodiment of the first aspect, the method can further include determining a decay time for the target post-tensioned rod.

In an embodiment of the first aspect, if the frequency difference in the target post-tensioned rod corresponds to more than one tension level in the model, estimating tension in the target post-tensioned rod can be further based on the decay time.

In an embodiment of the first aspect, the step of estimating tension in the target post-tensioned rod further based on the decay time can include selecting the lowest tension level in the model that corresponds to the frequency difference in the target post-tensioned rod when the decay time is above a first threshold, and selecting the highest tension level in the model that corresponds to the frequency difference in the target post-tensioned rod when the decay time is below the first threshold.

In an embodiment of the first aspect, the step of determining a decay time for the target post-tensioned rod can include detachably coupling an accelerometer to a cantilever portion of the target post-tensioned rod. The step can further include applying one or more transversely-directed impacts to the cantilever portion of the target post-tensioned rod. The step can further include receiving, from the accelerometer, data associated with a vibrational response for each of the one or more impacts. The step can further include determining, from the received data, a decay time for each of the one or more impacts, wherein the decay time is the time that it takes the vibrational response to dampen to a second threshold, and determining a decay time for the target post-tensioned rod based on an average of the decay times for the one or more impacts.

In an embodiment of the first aspect, the second threshold can be about ten percent of the maximum amplitude of the vibrational response.

In a second aspect, a method of estimating tension in a target post-tensioned rod is provided. The method includes determining frequency differences between first and second modal frequencies for a plurality of post-tensioned rods, wherein the frequency differences are determined for each rod at one or more levels of tension, and determining a frequency difference between a first and a second modal frequency for the target post-tensioned rod. The method further includes measuring cantilever lengths of the plurality of post-tensioned rods, wherein the cantilever lengths are measured for each rod at one or more levels of tension, and measuring a cantilever length of the target post-tensioned rod. The method further includes applying regression analysis to estimate tension in the target post-tensioned rod, wherein the regression analysis is based on at least the frequency differences determined for the plurality of post-tensioned rods, the frequency difference for the target post-tensioned rod, the measured cantilever lengths for the plurality of post-tensioned rods, and the measured cantilever length of the target post-tensioned rod.

In an embodiment of the second aspect, the step of determining frequency differences between first and second modal frequencies can include detachably coupling an accelerometer to a cantilever of a post-tensioned rod. The step can further include applying one or more transversely-directed impacts to the cantilever. The step can further include receiving, from the accelerometer, data associated with a vibrational response for each of the one or more impacts. The step can further include determining, for each of the one or more impacts, that a second modal frequency can be determined from the received data. The step can further include determining, from the received data, a value for the first modal frequency corresponding to each impact. The step can further include determining, from the received data, a value for the second modal frequency corresponding to each impact. The step can further include determining, from at least the values for the first modal frequency and the values for the second modal frequency, that a frequency difference can be determined for the values of the first and second modal frequencies. The step can further include determining a frequency difference between an average of the values for the first modal frequency and an average of the values for the second modal frequency.

In an embodiment of the second aspect, the step of determining, for each of the one or more impacts, that a second modal frequency can be determined from the received data can include determining, from a time-domain representation of the received data, that a maximum amplitude is below a threshold.

In an embodiment of the second aspect, the step of determining, for each of the one or more impacts, that a second modal frequency can be determined from the received data can include determining, from a time-domain representation of the received data, that noise is below a threshold.

In an embodiment of the second aspect, the step of determining, for each of the one or more impacts, that a second modal frequency can be determined from the received data can include determining, from a time-domain representation of the received data, that a minimum amplitude is above a threshold.

In an embodiment of the second aspect, the step of determining, for each of the one or more impacts, that a second modal frequency can be determined from the received data can include determining, from a time-domain representation of the received data, that the received data decays at an exponential rate until steady state.

In an embodiment of the second aspect, the step of determining, for each of the one or more impacts, that a second modal frequency can be determined from the received data can include determining, from a frequency-domain representation of the received data, that the sum of amplitudes of composite frequencies in a range is below a threshold.

In an embodiment of the second aspect, the step of determining, for each of the one or more impacts, that a second modal frequency can be determined from the received data can include determining a first modal frequency from the received data, finding a Fast Fourier Transform (FFT) of a frequency-domain representation of the received data, determining, from the FFT of the frequency-domain representation of the received data, that an amplitude corresponding to the period of the first modal frequency is less than an amplitude of the received data corresponding to the closest local maxima at a value less than the period of the first modal frequency, and determining, from the FFT of the frequency-domain representation of the received data, that the amplitude corresponding to the period of the first modal frequency is less than an amplitude corresponding to twice the period of the first modal frequency.

In an embodiment of the second aspect, the step of determining, for each of the one or more impacts, that a second modal frequency can be determined from the received data can include determining, from a frequency-domain representation of the received data, that amplitudes of at least three local maxima have widths at half-peak amplitude that is less than a threshold and amplitudes less than half of the maximum possible amplitude for the second modal frequency.

In an embodiment of the second aspect, the step of determining, for each of the one or more impacts, that a second modal frequency can be determined from the received data can include determining, from a frequency-domain representation of the received data, that a lower quartile of amplitudes in a range of frequencies is less than a threshold.

In an embodiment of the second aspect, the step of determining, from the received data, a value for the second modal frequency corresponding to each impact can include identifying a first frequency with the highest amplitude within a first range of frequencies. The step can further include determining, from the received data, whether a frequency-domain representation of the received data contains peak values at any whole or half multiples of a first modal frequency, wherein, if the frequency-domain representation of the received data does not contain peak values at any whole or half multiples of the first modal frequency, setting a value for the second modal frequency equal to the first frequency, and wherein, if the frequency-domain representation of the received data contains peak values at any whole or half multiples of the first modal frequency, setting the amplitude at the first frequency to zero, and setting a value for the second modal frequency equal to a second frequency with the highest amplitude within the first range of frequencies.

In an embodiment of the second aspect, the step of determining, from at least the values for the first modal frequency and the values for the second modal frequency, that a frequency difference can be determined for the values of the first and second modal frequencies can include identifying unique groups of values for the second modal frequency, removing outliers from each unique group of values for the second modal frequency, determining, from the unique groups, an optimum group, computing, from the optimum group, an average of the values for the second modal frequency, removing outliers from the values of the first modal frequency, and computing an average of the remaining values for the first modal frequency.

In an embodiment of the second aspect, the step of identifying unique groups of values for the second modal frequency can include defining, for each value for the second modal frequency, a bin window that corresponds to the value plus a frequency differential. The step can further include defining, for each bin window, a group as comprising all values for the second modal frequency that fall within the bin window. The step can further include discarding groups that are fully encompassed within another group.

In an embodiment of the second aspect, the step of removing outliers from each unique group of values for the second modal frequency can include discarding each unique group that contains an amount of values for the second modal frequency below a minimum threshold of values. The step can further include discarding, for each remaining unique group, any value that is greater than five standard deviations away from an average of the remaining values in the group. The step can further include discarding each remaining unique group that contains an amount of values for the second modal frequency below the minimum threshold of values. The step can further include discarding groups that are fully encompassed within another group.

In an embodiment of the second aspect, the step of determining, from the unique groups, an optimum group can include computing confidence sums for each unique group, and identifying an optimum group as the group with the highest confidence sum. If two or more groups have the same highest confidence sum, the step can further include identifying an optimum group as the group containing the most number of the highest confidence level, wherein, if two or more groups have an equal number of the highest confidence level, the step can further include identifying an optimum group as the group containing the most values for the second modal frequency, wherein, if two or more groups have an equal number of values for the second modal frequency, the step can further include determining that an optimum group cannot be identified.

In a third aspect, a system for estimating tension in a post-tensioned rod is provided. The system includes an impact device for transversely-impacting a post-tensioned rod, an accelerometer configured to generate data indicative of a vibrational response in the post-tensioned rod, and a receiver communicatively coupled to the accelerometer. The receiver includes a display, at least one input device, a communication module, a processor, and one or more memory devices coupled to the processor. The one or more memory devices stores instructions that, when executed by the processor, cause the processor to receive the data indicative of a vibrational response in the post-tensioned rod, process the received data to determine a difference between a first and a second modal frequency corresponding to the vibrational response, and store the difference between a first and second modal frequency corresponding to the vibrational response. The receiver is configured to transmit to an external system, via the communication module, the stored difference between a first and second modal frequency.

In a fourth aspect, a computing device for determining a frequency difference between a first and a second modal frequency of a post-tensioned rod is provided. The computer device includes an input module configured to receive, from an accelerometer detachably coupled to a post-tensioned rod, data resulting from one or more impacts to a cantilever portion of the post-tensioned rod, and a processor connected to the interface. The processor is configured to: determine, for each of the one or more impacts, that a second modal frequency can be determined from the received data; determine, from the received data, a value for the first modal frequency corresponding to each impact; determine, from the received data, a value for the second modal frequency corresponding to each impact; determine, from at least the values for the first modal frequency and the values for the second modal frequency, that a frequency difference can be determined for the values of the first and second modal frequencies; and determine the frequency difference between an average of the values for the first modal frequency and an average of the values for the second modal frequency.

In a fifth aspect, a non-transitory computer readable medium including computer-executable instructions stored thereon, which, when executed by a processor, implement instructions for determining a frequency difference between a first and second modal frequency of a post-tensioned rod is provided. The instructions include receiving, from an accelerometer detachably coupled to a post-tensioned rod, data resulting from one or more impacts to a cantilever portion of the post-tensioned rod; determining, for each of the one or more impact, that a second modal frequency can be determined from the received data; determining, from the received data, a value for the first modal frequency corresponding to each impact; determining, from the received data, a value for the second modal frequency corresponding to each impact; determining, from at least the values for the first modal frequency and the values for the second modal frequency, that a frequency difference can be determined for the values of the first and second modal frequencies; and determining the frequency difference between an average of the values for the first modal frequency and an average of the values for the second modal frequency.

In a sixth aspect, a method for determining whether a frequency difference between a first and second modal frequency of a post-tensioned rod can be found is provided. The method includes receiving, from an accelerometer detachably coupled to a post-tensioned rod, data resulting from one or more impacts to a cantilever portion of the post-tensioned rod, and determining, for each of the one or more impact, whether a second modal frequency can be determined from the received data. If a second modal frequency cannot be determined from the received data, the method further includes providing an indication that a frequency difference between a first and second modal frequency of a post-tensioned rod cannot be found from the received data.

In an embodiment of the sixth aspect, the step of providing an indication that a frequency difference between a first and second modal frequency of a post-tensioned rod cannot be found from the received data can include sending an error message.

In an embodiment of the sixth aspect, sending an error message can include requesting that the cantilever portion of the post-tensioned rod be struck again.

In a seventh aspect, a computing device for estimating tension in a target post-tensioned rod is provided. The computing device includes a display, an input module configured to receiver data from an accelerometer detachably coupled to a post-tensioned rod, and a processor coupled to the input module and one or more memory devices. The processor is configured to execute instructions stored in the one more memory devices, wherein execution of the instructions causes a graphical user interface to be displayed on the display, wherein the graphical user interface is configured to receive input from a user; receive, from the input module, and process, data corresponding to vibrational responses associated with impacting a plurality of post-tensioned rods, wherein each impact on each rod in the plurality of post-tensioned rods corresponds to a level of tension; receive, from the input module, and process, data corresponding to a vibrational response associated with impacting the target post-tensioned rod; receive, from the graphical user interface, and process, data corresponding to lengths of cantilevers for each rod in the plurality of rods, wherein each length of each cantilever corresponds to a level of tension; receive, from the graphical user interface, and process, data corresponding to a length of a cantilever of the target post-tensioned rod; perform regression analysis on the data corresponding to vibrational responses associated with impacting the plurality of post-tensioned rods, the data corresponding to a vibrational response associated with impacting the target post-tensioned rod, the data corresponding to lengths of cantilevers for each rod in the plurality of rods, and the data corresponding to a length of a cantilever of the target post-tensioned rod; and provide an estimate of the tension in the target post-tensioned rod based on at least the regression analysis.

In an eighth aspect, an apparatus for orienting an accelerometer on post-tensioned rod is provided. The apparatus includes an elongate structure that includes a first open channel having a first sidewall forming a substantially half cylinder shape along at least a portion of a length of the first open channel, and a first axis along a length of the first open channel; a second open channel having a second sidewall forming a substantially half cylinder shape along at least a portion of a height of the second open channel, and a second axis along a height of the second open channel; and a stopper wall having an inner surface disposed internal to a top end of the second channel, said inner surface being substantially perpendicular to the second axis. The apparatus further includes the first axis being substantially perpendicular to the second axis, and the first and second channels being contiguous.

In an embodiment of the eighth aspect, a distance from a boundary between the first open channel and second open channel to the inner surface of the stopper wall can be at least 0.5 inches.

In an embodiment of the eighth aspect, the first open channel can be suitable for receiving, along its length, a cylindrical magnet, an accelerometer, and a wire coupled to the accelerometer.

In an embodiment of the eighth aspect, the second open channel can be suitable for receiving, along its height, a substantially cylindrical, post-tensioned rod.

In an embodiment of the eighth aspect, a radius of the second sidewall can be between about 0.5 inch and one inch.

In an embodiment of the eighth aspect, a radius of the second sidewall can be between about 0.65 inch and 0.85 inch.

In an embodiment of the eighth aspect, the radius of the second sidewall can be approximately 0.75 inches.

DRAWINGS

The foregoing and other objects, features, and advantages of the systems, methods, and apparatuses described herein will be apparent from the following description of particular embodiments thereof, as illustrated in the accompanying figures, where like reference numbers refer to like structures. The figures are not necessarily to scale, emphasis instead being placed upon illustrating the principles of the systems, methods, and apparatuses described herein.

FIG. 12 is a rear elevation view illustrating an example orienting apparatus.

FIG. 13 is a left-side elevation view illustrating an example orienting apparatus.

DESCRIPTION

Figure 1:
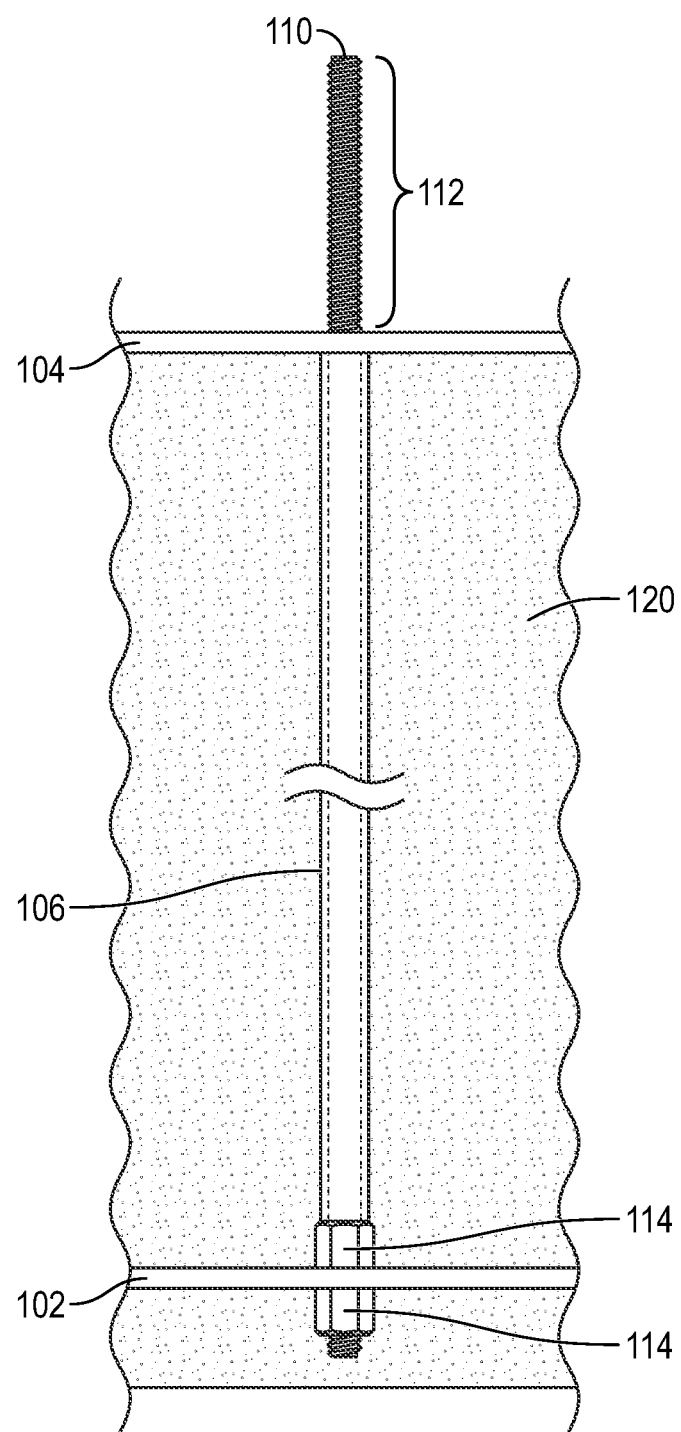
FIG. 1 is a partial front elevation view illustrating an anchor rod embedded in a concrete foundation.
Figure 2:
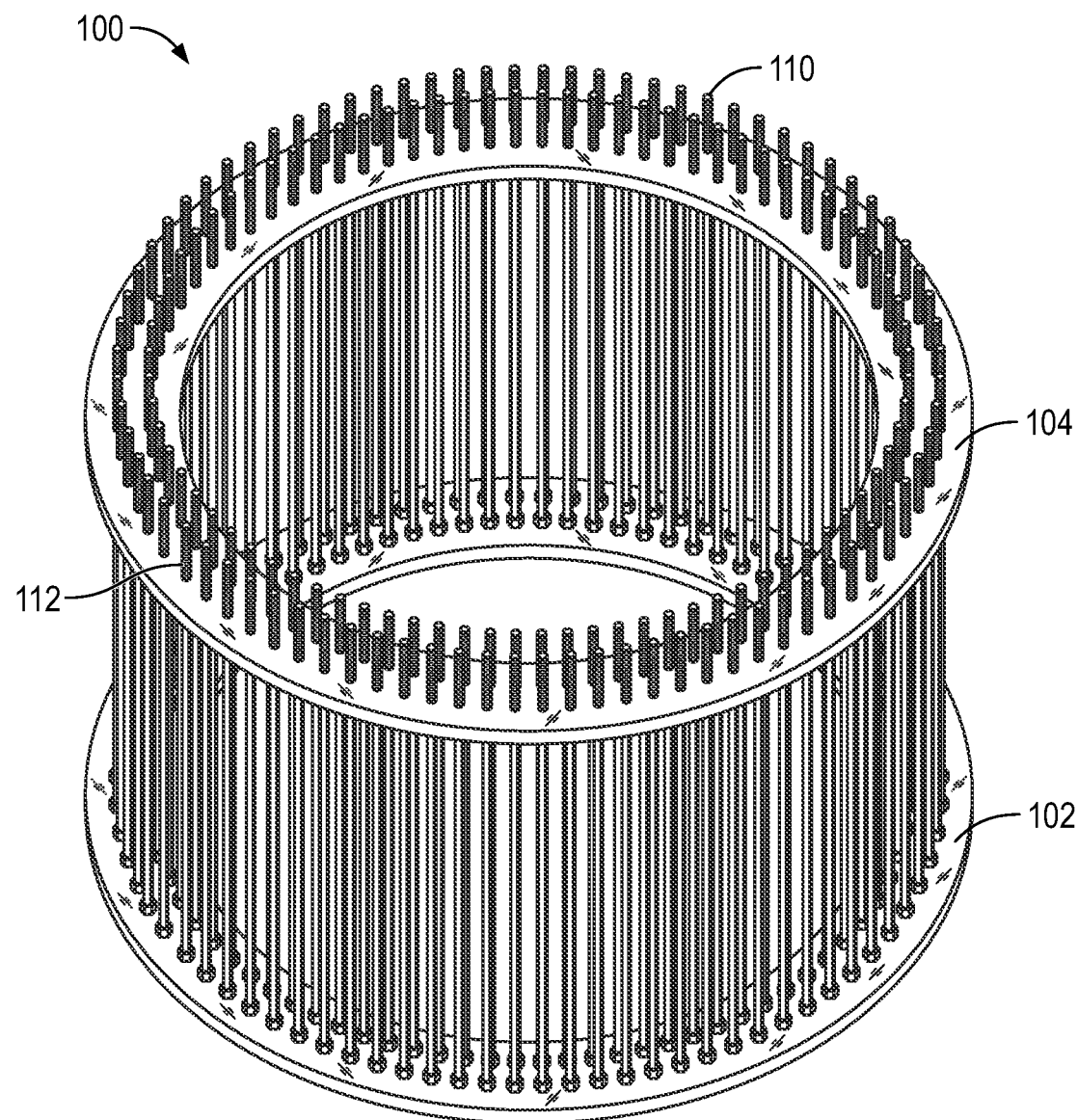
FIG. 2 is a perspective view illustrating an example anchor cage that may be used to secure an onshore wind turbine to a concrete foundation.
Figure 3:
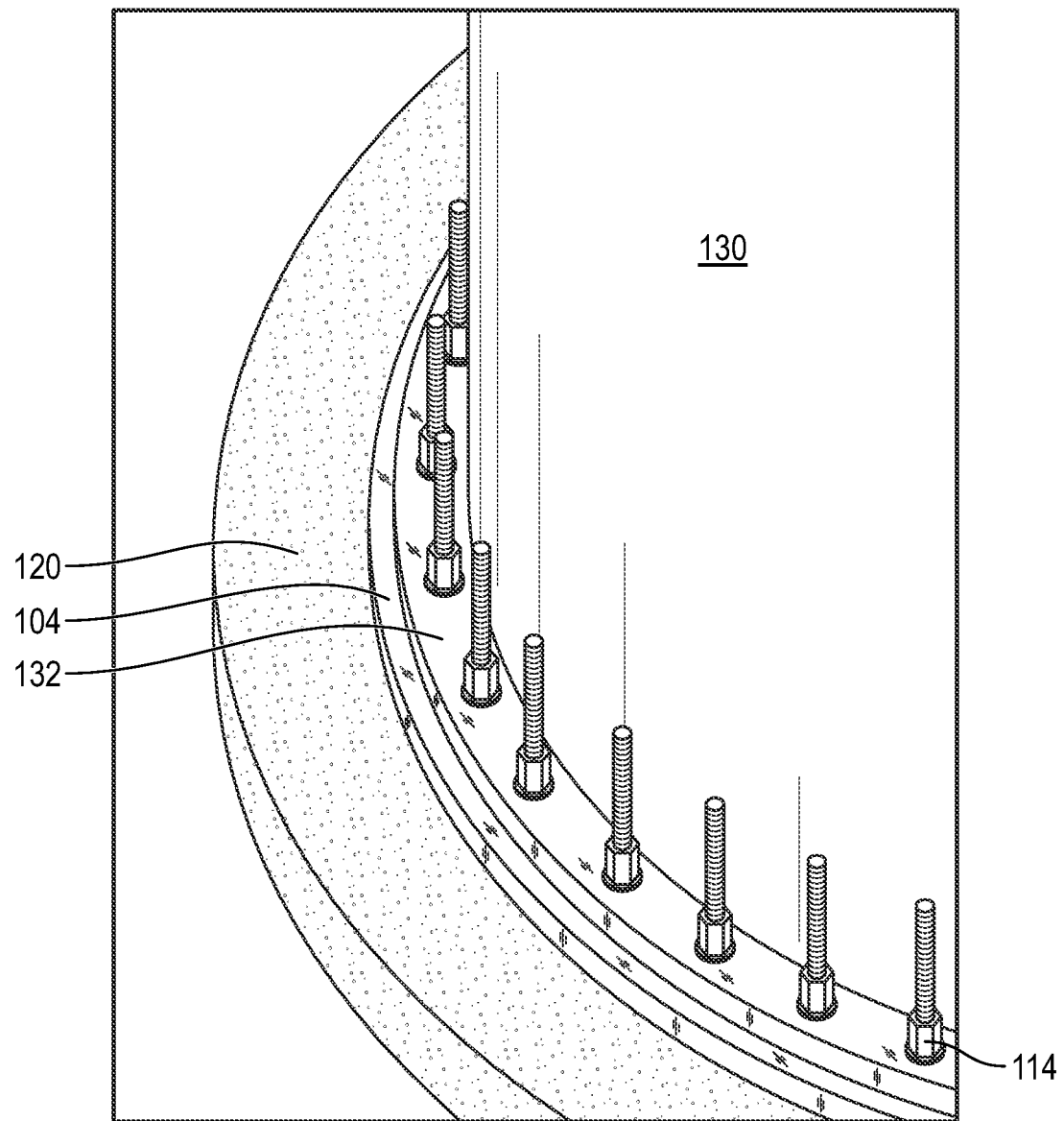
FIG. 3 is a partial view of the anchor cage of FIG. 2 after it has been embedded in a concrete foundation.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms unless otherwise stated or clear from context.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or "the like") provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention,"

"embodiments," or "invention" do not require that all embodiments of the invention include the discussed feature, advantage or mode of operation.

As used herein, the term "data" is a broad term and is to be given its ordinary and customary meaning to a person of ordinary skill in the art, and refers without limitation to any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

As used herein, the terms "memory" and "memory device" are broad terms and are to be given their ordinary and customary meaning to a person of ordinary skill in the art, and refer without limitation to computer hardware or circuitry to store information. Memory or memory device can be any suitable type of computer memory or other electronic storage means including, for example, read-only memory (ROM), random access memory (RAM), dynamic RAM (DRAM), static RAM (SRAM), ferroelectric RAM (FRAM), cache memory, compact disc read-only memory (CDROM), electro-optical memory, magneto-optical memory, masked read-only memory (MROM), programmable read-only memory (PROM), erasable programmable read-only memory (EPROM), electrically-erasable programmable read-only memory (EEPROM), rewritable read-only memory, flash memory, or the like. Memory or memory device can be implemented as an internal storage medium and/or as an external storage medium. For example, memory or memory device can include hard disk drives (HDDs), solid-state drives (SSDs), optical disk drives, plug-in modules, memory cards (e.g., xD, SD, miniSD, microSD, MMC, etc.), flash drives, thumb drives, jump drives, pen drives, USB drives, zip drives, a computer readable medium, or the like.

As used herein, the term "processor" is a broad term and is to be given its ordinary and customary meaning to a person of ordinary skill in the art, and refers without limitation to processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, microprocessors, microcontrollers, programmable devices and systems, field-programmable gate arrays (FPGAs), application-specific integrated circuits (ASICs), systems on a chip (SoC), systems comprising discrete elements and/or circuits, state machines, virtual machines, data processors, processing facilities, digital signal processing (DSP) processors, and combinations of any of the foregoing. A processor can be coupled to, or integrated with, memory or a memory device.

As used herein, the term "network" is a broad term and is to be given its ordinary and customary meaning to a person of ordinary skill in the art, and refers without limitation to any communication network including, for example, an extranet, intranet, inter-net, the Internet, local area network (LAN), wide area network (WAN), metropolitan area network (MAN), wireless local area network (WLAN), ad hoc network, wireless ad hoc network (WANET), mobile ad hoc network (MANET), or the like.

Figure 4:
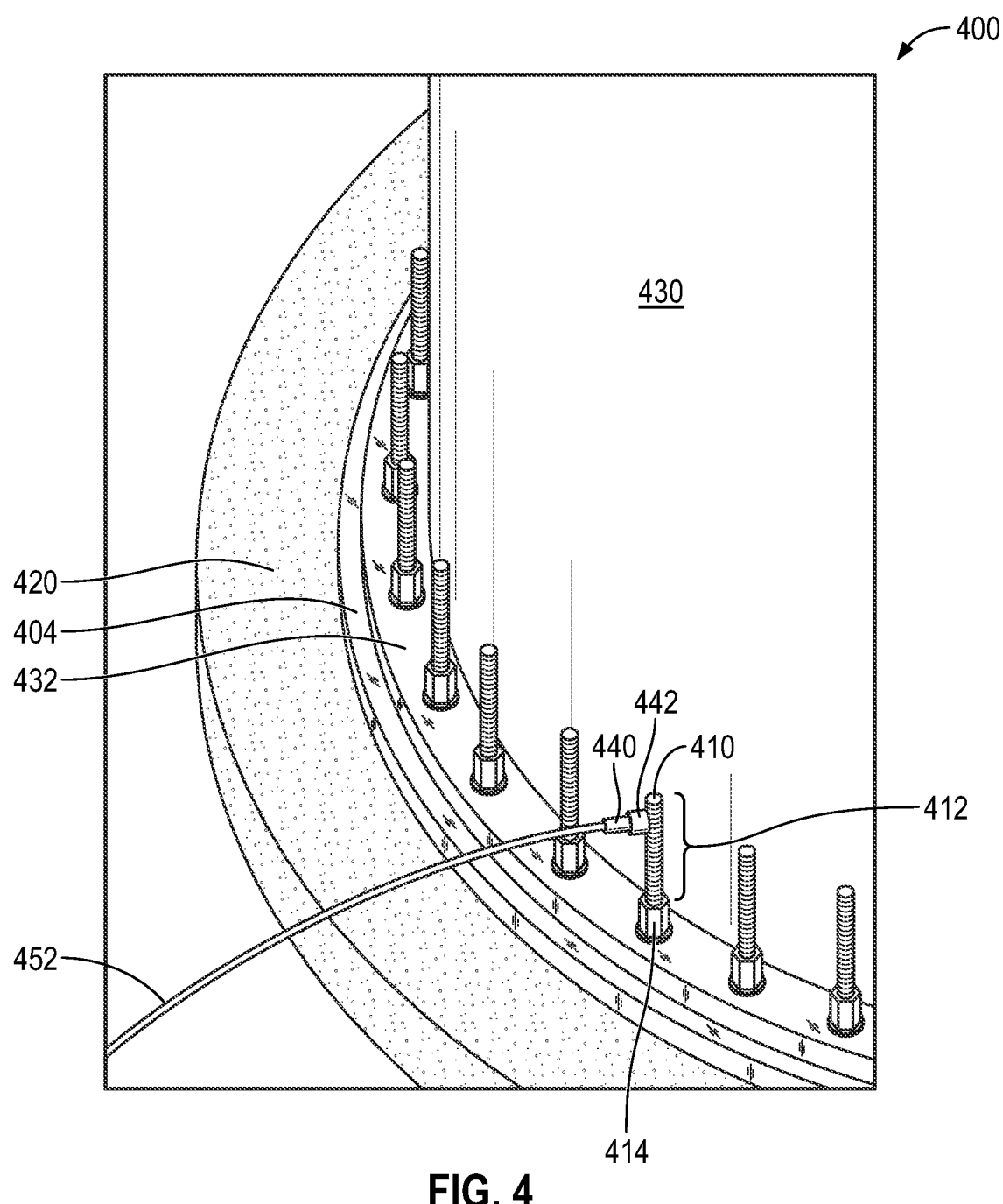
FIG. 4 is a schematic diagram illustrating an example setup of a system for estimating tension in post-tensioned rods.

FIG. 4 is a schematic diagram illustrating an example setup of a system 400 for estimating tension in post-tensioned rods. Although FIG. 4 illustrates post-tensioned rods as anchor rods 410 securing structure 430 to concrete foundation 420, this is only for convenience to illustrate the principles of the invention. Indeed, the inventive systems, methods, and apparatuses are not limited to anchor rods that support a structure to concrete and can be applied to any post-tensioned rods used for structural support or strength.

As illustrated in FIG. 4, anchor rod 410 includes a portion under tension that is below the concrete foundation 420 (not shown) and un-tensioned portion, cantilever 412, that extends above concrete 420 and protrudes through anchor plate 404 and structure flange 432. In the case of anchor rods that secure the base of a wind turbine tower to concrete, cantilevers 412 typically fall within the range of about 5 to 10 inches long. These lengths are provided for context only and do not limit the invention. Indeed, the inventive systems, methods, and apparatuses are not constrained by any particular length of cantilevers. As further illustrated in FIG. 4, nut 414 on cantilever 412 is tightened to create a clamping force that helps secure structure 430 to concrete foundation 420.

Sensors.

The system 400 can include a sensor 440 that is detachably coupled to cantilever 412 at a first point, for example, near the top of cantilever 412. Sensor 440 can be any type of sensor or transducer capable of or suitable for capturing and/or providing data indicative of a vibrational response of anchor rod 410. In some embodiments, sensor 440 can be an accelerometer that outputs data proportional to acceleration associated with a vibrational response of anchor rod 410. For example, sensor 440 can be a capacitive micro-electromechanical systems (MEMS) accelerometer, a piezoresistive accelerometer, a piezoelectric accelerometer, or the like. In other embodiments, sensor 440 can be a velocity sensor that outputs data proportional to velocity associated with a vibrational response of anchor rod 410. For example, sensor 440 can be a moving coil velocity sensor, a piezoelectric velocity sensor, or the like. In still other embodiments, sensor 440 can be a displacement sensor that outputs data proportional to positional displacement associated with a vibrational response of anchor rod 410. For example, sensor 440 can be a capacitive displacement sensor, an eddy-current displacement sensor, or the like.

As will be appreciated by those of ordinary skill in the art, data output from sensor 440 can be processed, transformed, or the like. For example, displacement data output from a displacement sensor can be differentiated to provide velocity data, and differentiated a second time to provide acceleration data. Velocity data output from a velocity sensor can be differentiated to provide acceleration data. Similarly, acceleration data output from an accelerometer can be integrated to provide velocity data, and integrated a second time to provide displacement data. Velocity data output from a velocity sensor can be integrated to provide displacement data. Further, although system 400 illustrates only one sensor 440, additional sensors can be used. For example, two or more sensors 440 can be detachably coupled to cantilever 412 at first and second points. The two or more sensors 440 can comprise any combination of accelerometers, velocity sensors, displacement sensors, or the like.

The use of more than one sensor 440 can be beneficial for several reasons. For one, more than one sensor can be used to sense transverse motion of the cantilever in radially-different directions. Further, data output from the sensors can be compared, averaged, etc. For example, if data from one sensor is insufficient for data analysis (e.g., the data is clipped, the data is too low in amplitude, etc.), data from the another sensor may be sufficient. Thus, the use of multiple sensors can provide redundancy, can increase efficiency, and can increase accuracy. The inventive systems, methods, and apparatuses are therefore not limited to any particular type of sensor 440, nor to any particular number of sensors.

Orienting a Sensor.

In the system 400, sensor 440 can be detachably coupled to cantilever 412 using, for example, magnet 442. In other embodiments, other means of detachably coupling sensor 440 to cantilever 412 can be used including, for example, adhesives such as tape or glue, or wax. Sensor 440 can be detachably coupled to cantilever 412 at a first point. The first point can be anywhere on cantilever 412 including, for example, on the side or the top of cantilever 412, and near the top, near the middle, or near the bottom of cantilever 412. Ideally, sensor 440 will be coupled to cantilevers of post-tensioned rods at approximately the same location each time a vibrational response is initiated. In embodiments in which the first point is on the side of cantilever 412, the distance from the top of cantilever 412 can be measured using any standard means, such as a tape measure or a ruler. However, to ensure consistent and precise placement of sensor 440 on cantilever 412, an orienting apparatus 500 can be used.

Figure 5:
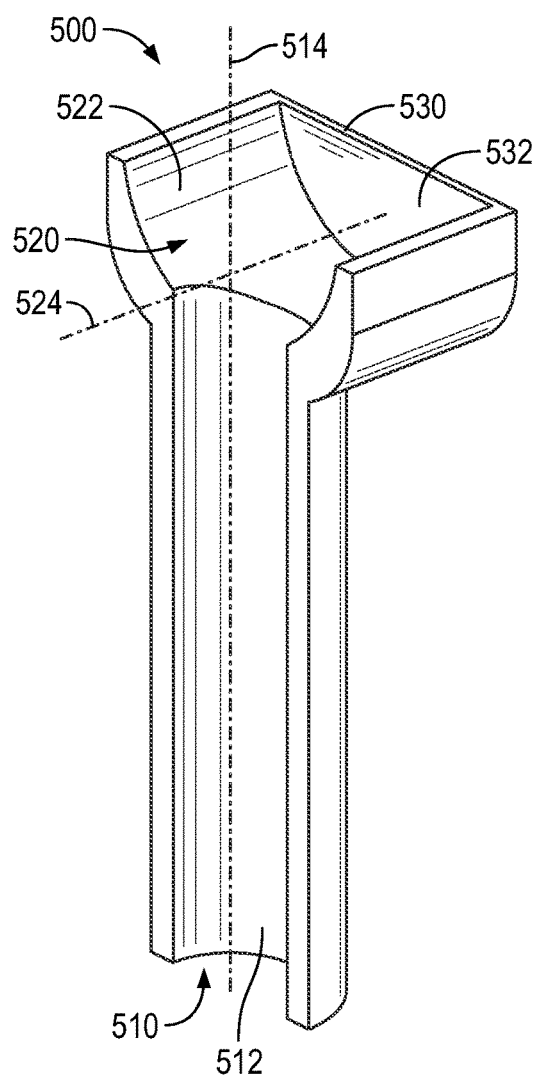
FIG. 5 is a right-side perspective view illustrating an example orienting apparatus.

FIG. 5 is right-side perspective view of an orienting apparatus 500. As illustrated, orienting apparatus 500 can comprise an elongate structure and can include a first open channel 510 having a first sidewall 512. The first sidewall 512 can have a substantially half cylinder shape along the length of the first open channel 510. The first open channel 510 can have a first longitudinal axis 514. Orienting apparatus 500 can include a second open channel 520 having a second sidewall 522. The second sidewall 522 can have a substantially half cylinder shape along the height of the second open channel 520. The second open channel 520 can have a second axis 524 along its height. As illustrated in FIG. 5, the first axis 514 can be substantially perpendicular to the second axis 524. As further illustrated, the first open channel 510 and second open channel 520 are contiguous. Orienting apparatus 500 can further include a stopper wall 530 having an inner surface 532. Inner surface 532 can be disposed internal to the top of the second open channel 520. As illustrated in FIG. 5, the inner surface 532 of stopper wall 530 can be substantially perpendicular to the second axis 524.

Figure 6:
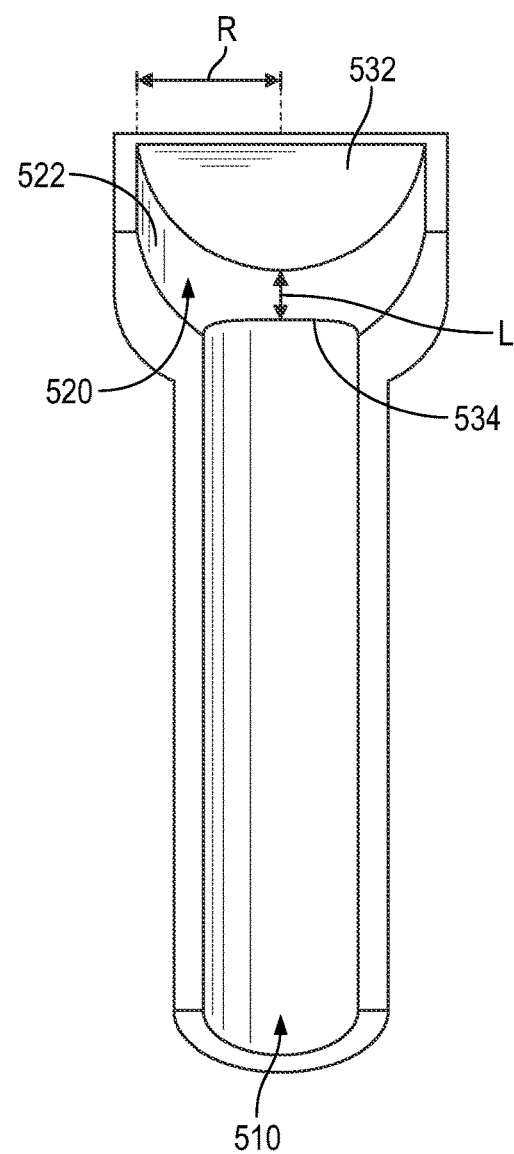
FIG. 6 is a top perspective view illustrating an example orienting apparatus.

FIG. 6 is a top perspective view of orienting apparatus 500. As further illustrated in FIG. 6 and explained above, the first open channel 510 and the second open channel 520 have a contiguous boundary 534. The boundary 534 can be located a minimum distance L from inner surface 532, which can be any value greater than 0. The distance L will dictate the distance that sensor 440 is located from the top of anchor rod 410 when orienting apparatus 500 is used to detachably couple sensor 440 to anchor rod 410. Thus, the distance L can be 0.1 inches, 0.25 inches, 0.5 inches, 1 inch, 3 inches, 5 inches, etc., including any lesser, greater, or intermediate value. Preferably, the distance L is about 0.5 inches. As further illustrated in FIG. 6, when second sidewall 522 has a substantially half circular cylinder shape, second sidewall 522 can have a radius R, which can be any value greater than 0 that is larger than the radius of anchor rod 410. That is, as explained more fully below, orienting apparatus 500 can be used by disposing anchor rod 410 within second open channel 520 to detachably couple sensor 440 to anchor rod 410. Thus, second open channel 520 should be large enough to accommodate anchor rod 410. For example, radius R can be about 0.1 inches, 0.25 inches, 0.5 inches, 1 inch, etc., including any lesser, greater, or intermediate value. Preferably, radius R is about 0.75 inches.

Figure 7:
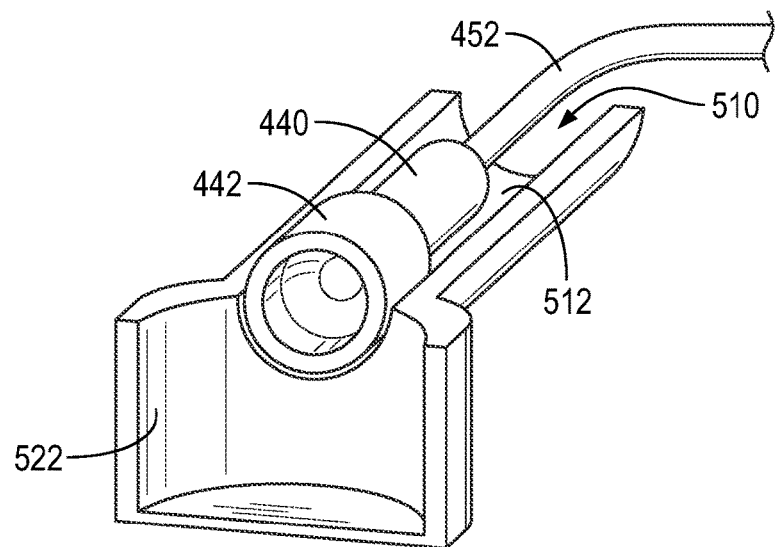
FIG. 7 is a perspective view illustrating a magnet, a sensor, and a transmission line positioned in an example orienting apparatus.

A preferred manner in which orienting apparatus 500 can be used to detachably couple sensor 440 to anchor rod 410 is now explained. Referring to FIG. 7, sensor 440 can be attached to magnet 442 to facilitate detachably coupling sensor 440 to anchor rod 410. Sensor 440 and magnet 442 can be positioned inside the first open channel 510 of orienting apparatus 500 such that at least magnet 442 contacts the first sidewall 512. Magnet 442 is preferably positioned inside first open channel 510 so that a front part of magnet 442 is approximately flush with second sidewall 522.

Figure 8:
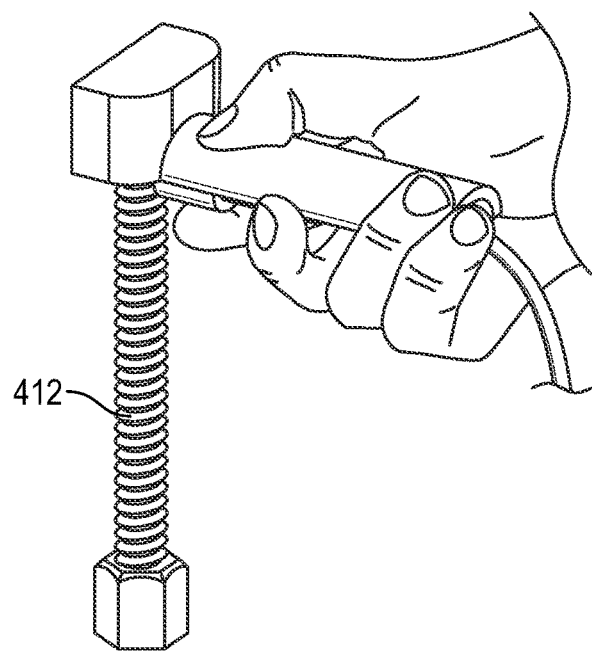
FIG. 8 is a perspective view illustrating an example of an operator using an orienting apparatus.
Figure 9:
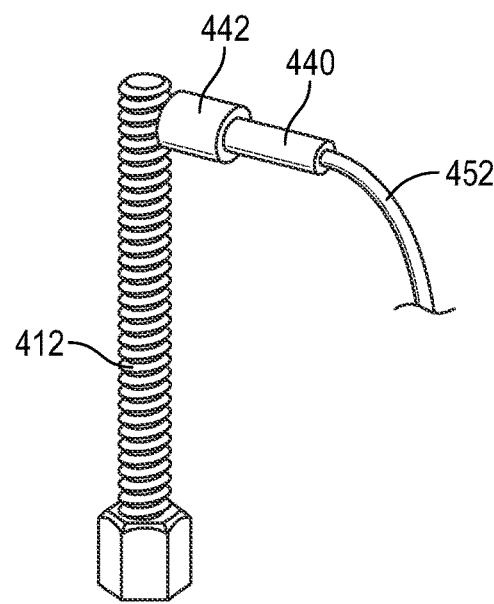
FIG. 9 is a perspective view illustrating a sensor detachably coupled to a cantilever of a post-tensioned rod.

Referring now to FIG. 8, an operator grasps orienting apparatus 500 with the first open channel 510 and second open channel 520 facing down. While holding orienting apparatus 500, magnet 442, and sensor 440 firmly, the operator places the second open channel 520 over cantilever 412 until the top of cantilever 412 is in contact with inner surface 532 of stopper wall 530 and magnet 442 is in contact with cantilever 412. After the operator removes orienting apparatus 500, which is illustrated in FIG. 9, sensor 440 remains detachably coupled to cantilever 412 via magnet 442.

Orienting apparatus 500 can be any shape and size that enables on operator to consistently and precisely detachably couple sensor 440 to anchor rod 410. For example, the first open channel 510 of orienting apparatus 500 can be contoured to closely match the shape of the components to be placed therein. This is illustrated in FIGS. 10-16.

Figure 10:
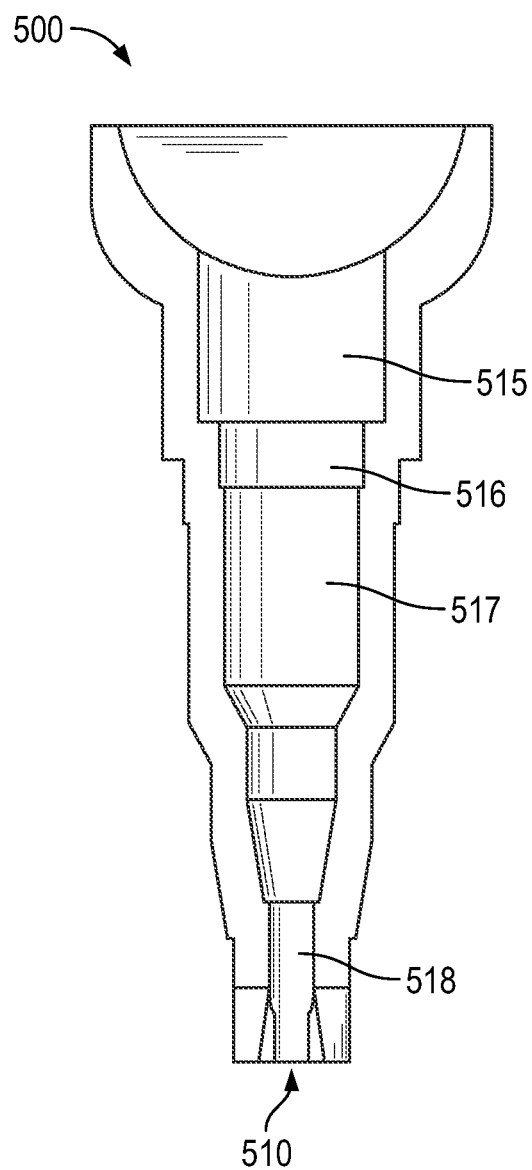
FIG. 10 is a front elevation view illustrating an example orienting apparatus.
Figure 11:
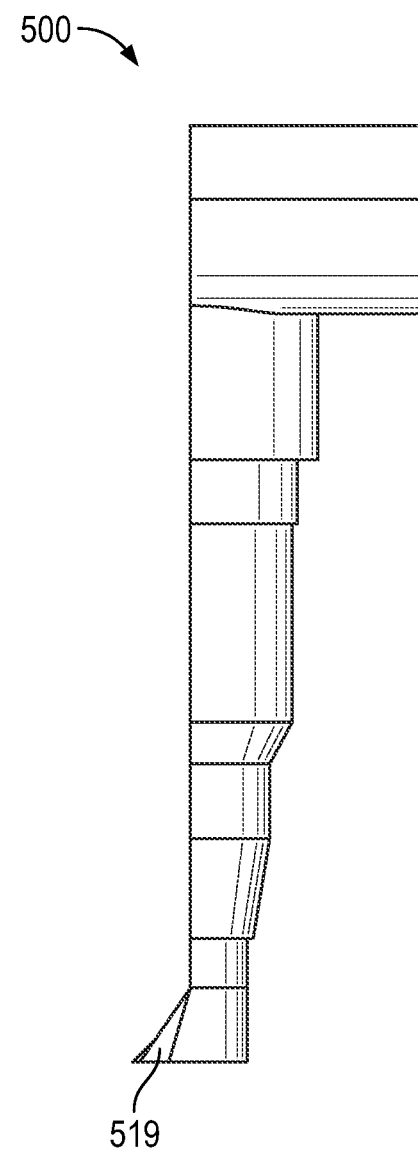
FIG. 11 is a right-side elevation view illustrating an example orienting apparatus.
Figure 14:
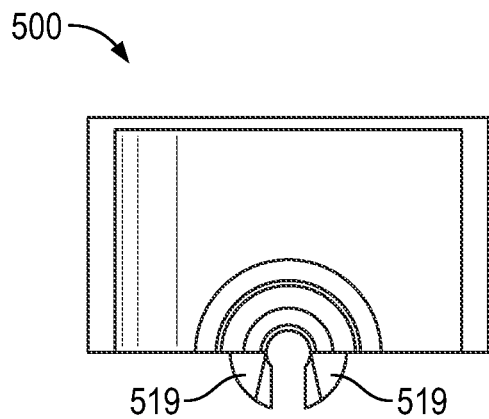
FIG. 14 is a top plan view illustrating an example orienting apparatus.
Figure 15:
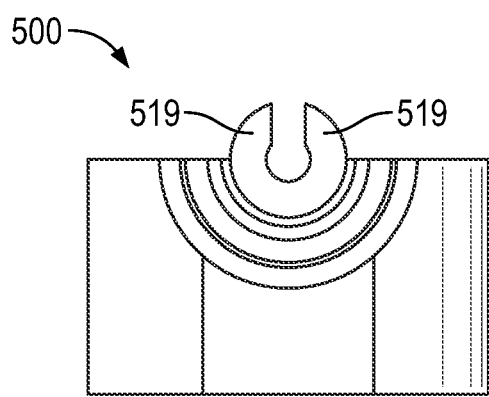
FIG. 15 is a bottom plan view illustrating an example orienting apparatus.
Figure 16:
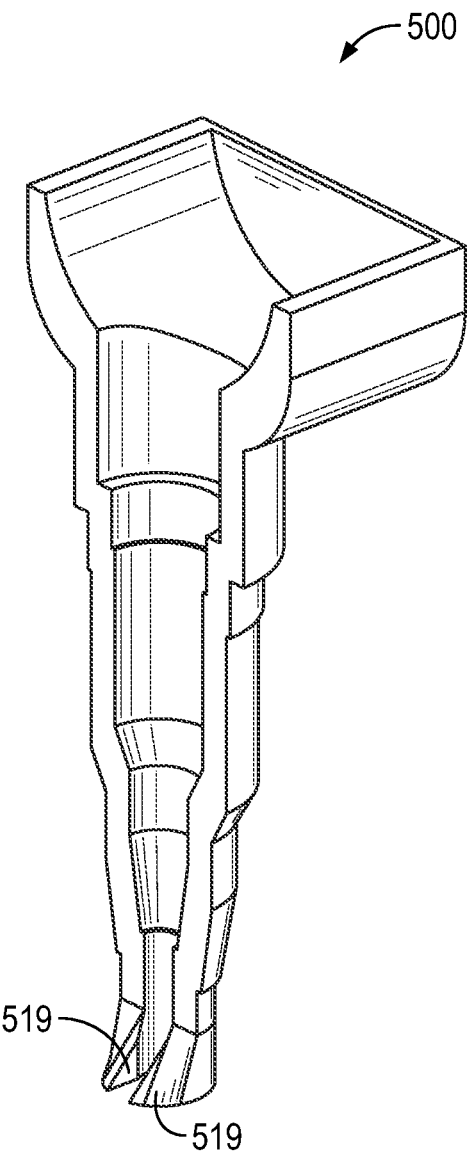
FIG. 16 is a right-side perspective view illustrating an example orienting apparatus.

FIG. 10 is a front elevation view of an orienting apparatus 500 having a contoured first open channel 510. As illustrated, first open channel 510 can have a first cavity 515 having a contour configured to match the dimensions of magnet 442, a second cavity 516 having a contour configured to match the dimensions of a fastening nut that couples magnet 442 to sensor 440, and a third cavity 517 having a contour configured to match the dimensions of sensor 440. In embodiments in which a transmission line is used to communicate data from sensor 440 (as opposed to other means, such as wirelessly), first open channel 510 can further include a fourth cavity 518 having a contour configured to match the dimensions of transmission line 452 and wings 519 configured to hold transmission line 452. Wings 519 can help stabilize magnet 442, sensor 440, and transmission line 452 while an operator detachably couples sensor 440 to cantilever 412. Wings 519 are best illustrated in FIGS. 14-16.

Exciting a Post-Tensioned Rod.

Embodiments disclosed herein can be used to estimate tension in post-tensioned rods, for example, by modeling tension as a function of a difference in frequency between a first and a second modal frequency for a subset of rods, then using the model to estimate tension in other rods. That is, a set of post-tensioned rods in situ can be used to generate training data, which training data can be used to create a model, which model can be used to estimate tension in a target post-tensioned rod. For both creating a model and to estimate tension in a post-tensioned rod, data associated with vibrational responses in cantilevers of the post-tensioned rods is obtained. This data can be received from a sensor 440 detachably coupled to a post-tensioned rod 410. A vibrational response can be initiated by imparting a transversely-directed impact on a cantilever of the post-tensioned rod. In some embodiments, the impact can be imparted manually, such as with a hammer or other striking tool. In other embodiments, the impact can be imparted with an automated impacting device. An automated impacting device can help provide a consistent level of force with each impact. Additionally, it can provide a means for accurately measuring and recording the force of each impact, which can provide additional data points. An automated impacting device can also enable sweeping through a spectrum of different levels of force for each impact.

Figure 17:
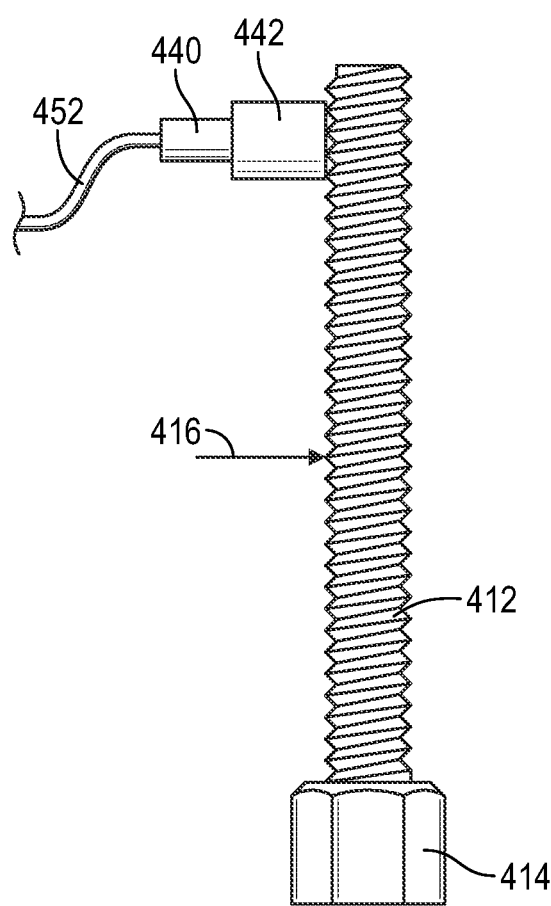
FIG. 17 is a side elevation view illustrating a cantilever and nut, and example locations where a sensor can be detachably coupled and where a cantilever can be impacted.
Figure 18:
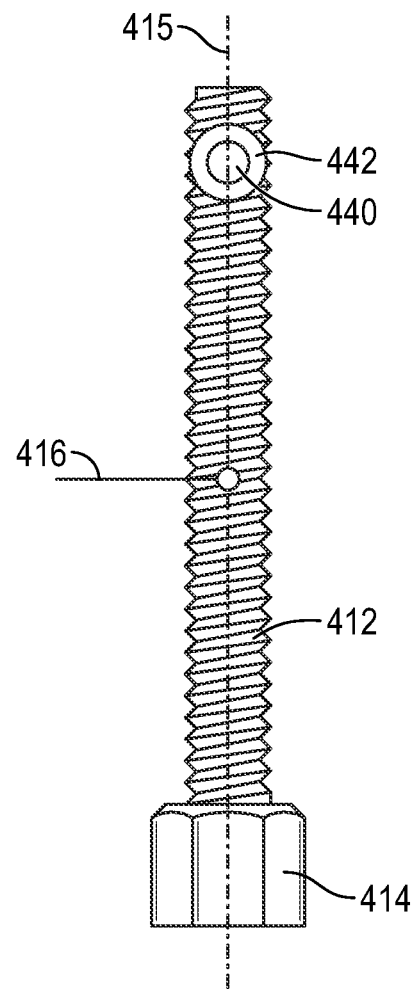
FIG. 18 is a front elevation view illustrating a cantilever and nut, and example locations where a sensor can be detachably coupled and where a cantilever can be impacted.

FIGS. 17 and 18 illustrate an example location on cantilever 412 at which anchor rod 410 may be impacted when a sensor 440 is detachably coupled near the top of cantilever 412. FIG. 17 is a side elevation view of cantilever 412 and nut 414. As illustrated, sensor 440 can be detachably coupled at a first point near the top of cantilever 412 with magnet 442. Cantilever 412 can be impacted at a second point 416. As better illustrated in FIG. 18, which is a front elevation view of cantilever 412 and nut 414, second point 416 can be substantially in line with the first point at which sensor 440 is detachably coupled. That is, sensor 440 and second point 416 can generally lie on a longitudinal axis 415. Other locations on cantilever 412 may also be impacted. However, it is believed that as the second point rotates around cantilever 412 and away from axis 415, the strength of a vibrational response measured by sensor 440 may begin to diminish, potentially making it more difficult to receive data. Thus, nearly any point of cantilever 412 may be impacted, and it is believed that the strongest vibrational response can be measured when second point 416 is located along axis 415.

Receiver/External System.

Figure 19:
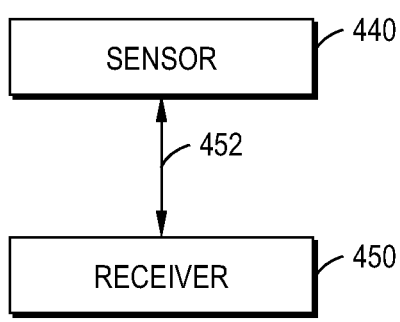
FIG. 19 is a simplified block diagram illustrating a sensor in communication with a receiver according to some embodiments.

Data from sensor 440 can be transmitted to a receiver 450. For example, FIG. 19 is a simplified block diagram illustrating a sensor 440 in communication with a receiver 450 according to some embodiments. The output of sensor 440 can include analog signals, digital signals, pulse-width modulated (PWM) signals, and other types of signals. Data generated by sensor 440 (i.e., sensor data) associated with a vibrational response can relate to time, voltage, acceleration, velocity, displacement, and other information. Sensor data can be transmitted from sensor 440 to receiver 450 via a wired or wireless connection 452. For example, in some embodiments, sensor data can be transmitted to receiver 450 via a coaxial transmission line (e.g., as illustrated in FIG. 4). Other types of wired connections may also be used as will be apparent to those of skill in the art. In other embodiments, sensor data can be transmitted from sensor 440 to receiver 450 via a suitable wireless technology such as, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies as will be apparent to those of skill in the art. Although only one sensor is illustrated in FIG. 19, it should be appreciated that any number of sensors and/or types of sensors may be used. In the case of multiple sensors in communication with receiver 450, communication media 452 can comprise a combination of both wired and/or wireless connections.

Figure 20:
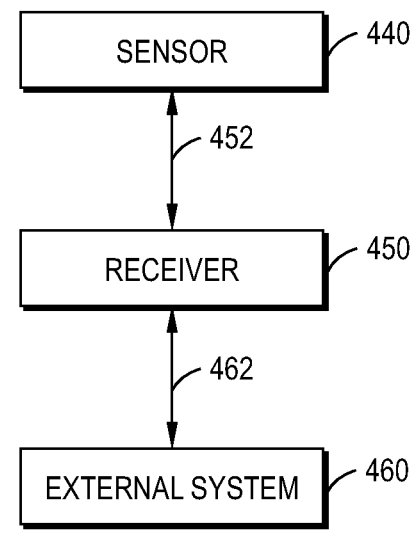
FIG. 20 is a simplified block diagram illustrating a sensor in communication with a receiver, and a receiver in communication with an external system, according to some embodiments.

In some embodiments, such as that illustrated in FIG. 20, receiver 450 can be in communication with an external system 460. In some embodiments, external system 460 can comprise a computing device such as a tablet, smartphone, laptop computer, desktop computer, or the like. For example, receiver 450 can be a data acquisition device (DAQ) and external system 460 can be a computer. In some embodiments, external system 460 can be a network, such as a private network, the Internet, or the like. It should be noted that external system 460 need not be a single system. Rather, external system 460 can comprise a combination of computing devices, networks, servers, the Internet, or the like. Communication medium 462 can comprise a wired or wireless connection. For example, in some embodiments, communication medium 462 can be a wired connection, such as a coaxial transmission line, USB cable, Ethernet cable, and other types of wired connections as will be apparent to those of skill in the art. In other embodiments, communication medium 462 can be a suitable wireless technology such as, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies as will be apparent to those of skill in the art. In the case of external system 460 comprising multiple systems or devices, communication media 462 can comprise a combination of both wired and/or wireless connections.

Figure 21:
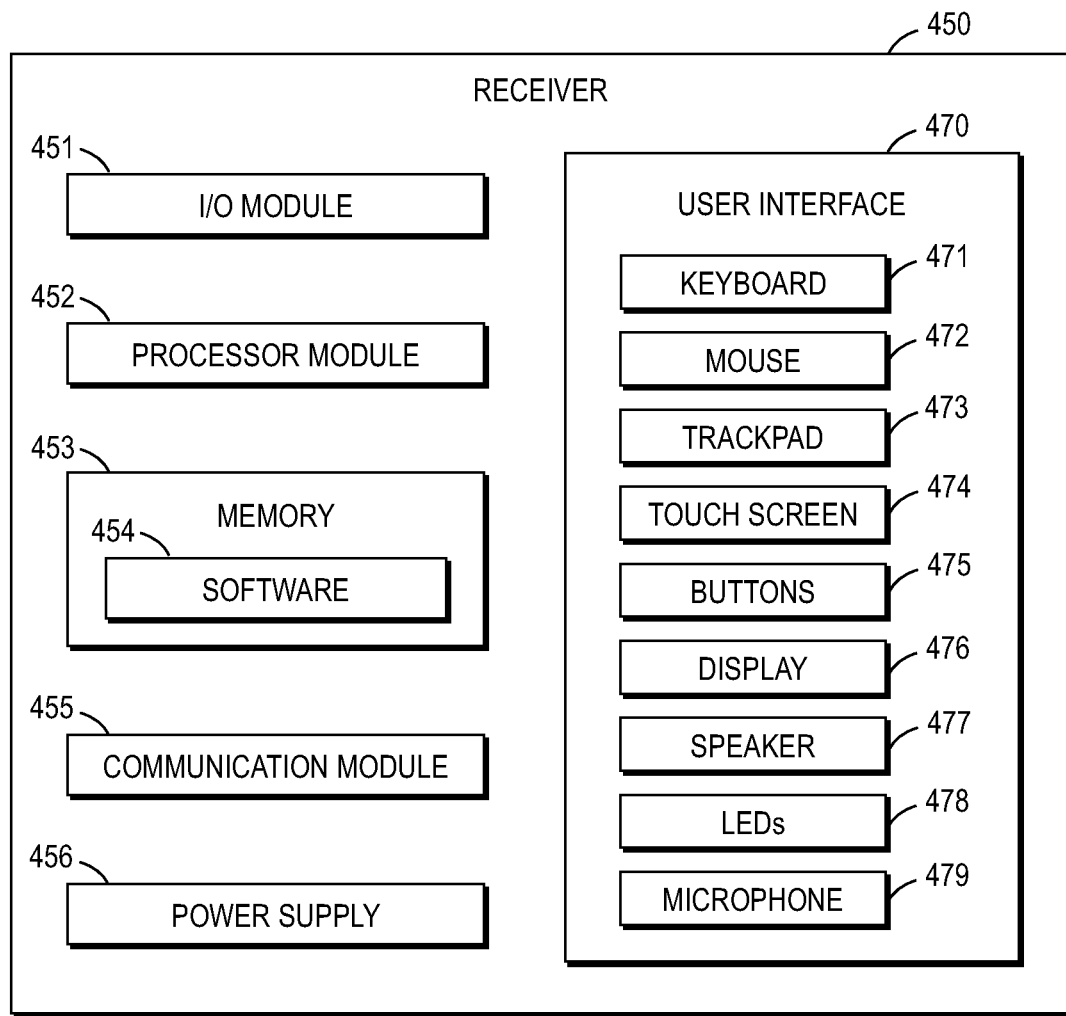
FIG. 21 is a block diagram illustrating an example receiver according to some embodiments.

Receiver 450 can include hardware, firmware, and/or software that generally enables a user to interact with the system, to receive data from sensor 440, to process the data, to analyze the data, to store the data, and/or to transmit the data to external system 460. FIG. 21 is a block diagram illustrating an example receiver 450 according to some embodiments. The receiver 450, which is communicatively coupled to sensor 440 via communication medium 452, can receive sensor data from sensor 440 via an input/output (I/O) module 451. The I/O module 451 can send the data to processor module 452.

Processor module 452 can be coupled to one or memory devices 453. The one or more memory devices 453 can store data, such as data received from sensor 440, data received from a user, and data received from an external system 460. The one or more memory devices 453 can also store software 454 (i.e., computer-executable instructions). Processor module 452 can process data, wherein the processing can include, for example, amplifying, converting from analog to digital or digital to analog, conditioning, filtering, and/or transforming the data. Processor module 452 can also serve as a central control unit of receiver 450. For example, software 454 can comprise operating system software, firmware, and other system software for controlling receiver 450 and its components. Software 454 can further include data processing software, application software, or the like, as discussed in more detail below.

Receiver 450 can include a user interface 470 that comprises input and output components configured to allow a user to interact with receiver 450. For example, user interface 470 can include a keyboard 471, mouse 472, trackpad 473, touch-sensitive screen 474, one or more buttons 475, display 476, speaker 477, one or more LED indicators 478, and microphone 479. Processor module 452 can control user interface 470 and its components. For example, processor module 452 can receive data and commands from input components through I/O module 451 and provide data and commands to output components through I/O module 451. Processor module 452 can execute software 454 stored in the one or more memory devices 453 to cause a graphical user interface (GUI) to be displayed on display 476. The GUI can provide the user with an intuitive and user-friendly means for interacting with the system, including to provide output to the user such as prompts, messages, notifications, warnings, alarms, or the like.

The components of the user interface 470 include controls to allow a user to interact with the receiver 450. For example, the keyboard 471, mouse 472, and trackpad 473 can allow input from the user. The touch-sensitive screen 474 can enable a user to interact with the GUI, for example, by inputting information, making selections, or the like. The one or more buttons 475 can provide for quick and easy selection of options or modes, such as by toggling functions on/off. The display 476 can be any type of display, such as an LCD, LED, OLED, or the like. The display 476 can provide the user with visual output. The speaker 477 can provide the user with audible output, such as by alerting the user of notifications, warnings, alarms, or the like. The one or more LED indicators 478 can provide the user with visual indications. For example, one LED indication might represent whether there is sufficient battery power, or whether the receiver is receiving power from an external source. Another LED indication might inform the user whether the receiver 450 is in an active state and measuring data received from sensor 440. The microphone 479 can provide a user with the capability to control receiver 450 by voice. Although not illustrated, the user interface 470 can include other components, such as a vibrating module to provide a user with tactile signals or alerts, a backlight to facilitate viewing the display in low light conditions, or the like.

As further illustrated in FIG. 21, receiver 450 can include communication module 455, which can comprise components, such as transceivers, drivers, antennas, and the like, to enable communication with various types of devices and systems. For example, communication module 455 can include Ethernet ports, USB ports, and ports for communicating over RS-232, RS-422, RS-485, and other protocols. Communication module 455 can further include antennas and other components typically used for wireless communication, such analog frontend circuitry, A/D converters, amplifiers, filters, and the like. Communication module 455 can enable communication with an external system 460. For example, an external system 460 may send commands or data to, or receive commands or data from, receiver 450. Communication module 455 may also enable receiver 450 to receive software updates. Thus, communication module 455 is a two-way communication module that enables receiver 450 to communication with an external system 460.

As further illustrated in FIG. 21, receiver 450 can include a power supply 456, which can include rechargeable or disposable batteries. Power supply 456 may also include circuitry to receive power from an external source and to supply the necessary power to receiver 450, such as through an AC adapter. In some embodiments, the external source can be a computer that supplies power to receiver 450 over a USB cable.

Receiver 450 can support various other functions. For example, in some embodiments, receiver 450 can include the ability to record and playback data events received from sensor 440, while also permitting for real-time display of the events. In some embodiments, receiver 450 can include the ability to tag events as they occur. For example, receiver 450 can include one or more buttons 475 that enables a user to insert a marker onto data in real-time. In some embodiments, receiver 450 can permit remote control and monitoring. For example, receiver 450 can be communicatively coupled to an external system 460 to enable the external system 460 to view data events in real time and to control receiver 450.

It should be noted that FIG. 21 is a functional block diagram and not a strict architectural diagram. Thus, FIG. 21 generally illustrates the function of components in receiver 450, some of which may be combined and some of which may be separated. For example, some or all of the functionality of the I/O module 451 might be combined with some or all of the functionality of the communication module 455 and vice versa. As another example, communication module 455 may comprise several individual modules, some of which may communicate with sensor 440 via a wired or wireless connection, while others may communicate with external system 460 via a wired or wireless connection. As yet another example, processor module 452 may comprise several components, such as discrete processing elements for amplifying, converting, conditioning, filtering, and transforming data, and a microprocessor or microcontroller for controlling receiver 450 (in addition to performing other functions, such as further processing data). Further, the functional blocks illustrated in FIG. 21 are communicatively coupled in an appropriate manner as would be appreciated by one of ordinary skill in the art. For example, the components can be communicatively coupled with a bus. Thus, commands, data, and other information received from the I/O module 451 and communication module 455 would be transmitted to processor module 452 for processing, storing, and or other action. Similarly, processor 452 would transmit commands, data, and other information to I/O module 451 and communication module 452, as appropriate, to be further communicated to other components, such as sensor 440, external system 460, and user interface 470 and its components.

Operation of the Inventive Systems.

The operation of the systems to estimate tension in post-tensioned rods are now explained. For convenience, reference will be made to the systems illustrated in the figures. Generally, the tension in a post-tensioned rod in situ (i.e., a "target" post-tensioned rod) can be estimated by first creating a regression model using training data, then using the model to predict the tension in the target post-tensioned rod. The training data can be generated from a plurality of other post-tensioned rods. The plurality can comprise any number of post-tensioned rods. It has been found that, in the case of post-tensioned rods used to support structural steel to concrete, a plurality comprising 12 post-tensioned rods may suffice. As explained in more detail below, the regression model will be based on at least a difference in frequency between first and second modal frequencies and cantilever lengths. Ideally, the post-tensioned rods selected for the plurality will have cantilever lengths that can be grouped evenly into a number of groupings. For example, if 12 post-tensioned rods are selected for the plurality and have cantilever lengths that can be grouped into one of four groupings of length, the plurality will comprise three post-tensioned rods in each cantilever grouping that can be used to generate the training data. Nevertheless, other configurations for cantilever groupings are possible as explained in more detail below.

Generating the training data. The training data can be generated by selecting one of the post-tensioned rods 410 in the plurality and setting the rod to a known level of tension, for example, using a hydraulic jack with a tension gauge. The goal of the training data is to correlate different levels of tension with a difference in frequency between first and second modal frequencies and cantilever lengths. Therefore, a range of tension levels is preferably used to generate the training data, which may include levels of tension both above and below the specified design tension for the particular post-tensioned rods being examined. For example, where the specified design tension is 320 kN, it may be desirable to set the tension in each post-tensioned rod from 90 kN to 450 kN in 40-kN increments.

Once the first level of tension is set in the post-tensioned rod 410, the length of the cantilever of the rod can be measured and recorded. The cantilever length will typically vary based on the tension in the rod. A sensor 440, such as an accelerometer, can be detachably coupled to the cantilever 412 of the post-tensioned rod 410 and communicatively coupled to a receiver 450, such as the receiver 450 of FIG. 21. Using an impact device, the cantilever 412 can be impacted to initiate a vibrational response, which can be measured by the accelerometer. The accelerometer, in turn, can transmit data associated with the vibrational response to the receiver 450. It is possible that the data associated with the vibrational response is insufficient for determining a first and/or a second modal frequency. For example, if the impact to cantilever 412 is too great, data received from the accelerometer might be clipped. If the impact to cantilever 412 is too soft, data received from the accelerometer might not have sufficient amplitude. In both instances, it may be necessary or desirable to impact cantilever 412 again to generate another vibrational response.

In practice, it is common for a field person to rely on experience to determine whether data from a vibrational response is clipped, too low in amplitude, or contains other apparent anomalies. However, the data may contain noise or other anomalies that are not readily apparent to the field person, but which will make it difficult or impossible to identify modal frequencies from the data. To address these concerns and to increase efficiency in generating the training data, receiver 450 can comprise software in the one or more memory devices that, when executed by the processor, cause the processor to analyze the data in real-time to determine whether it is sufficient to identify first and second modal frequencies, and ultimately, to identify the modal frequencies and a difference therebetween.

For example, the software can first analyze the sufficiency of the data to either validate that the impact was sufficient or to prompt the field person to impact the cantilever again to generate another vibrational response. If the impact was not sufficient, the software can provide feedback to the field person, such as a notification or message on receiver 450 that explains why the impact failed validation and what the field person can do to correct it. If the software validates the impact, it can analyze the data to identify a first and second modal frequency, and a difference in frequency between the modal frequencies. The software can store this data and instruct the field person that the data analysis for that measurement was successful. Example algorithms for validating the impact made to the cantilever, for determining first and second modal frequencies, for determining a frequency difference between the modal frequencies, and other data analysis are provided below.

It may be desirable to measure the vibrational response of the post-tensioned rod 410 several times at the same level of tension without readjusting the tension. For example, the vibrational response of a particular rod can be measured 1, 2, 3, 4, 5, 6, 7, 8, 9, 10 or more times. It may also be desirable to measure the vibrational response of the post-tensioned rod 410 several times at the same approximate level of tension, but by resetting the tension. For example, where the tension in the rod was set to approximately 90 kN, the actual tension might have been 89.95 kN. Thus, several measurements can be made at 89.95 kN as just explained, then the tension in the rod can be reset to approximately 90 kN again. This time, however, the actual tension might be 90.03 kN. Several measurements can then be made at 90.03 kN as just explained. This iterative process can be repeated any number of times. In some embodiments, the vibrational response is measured at least 8 times for each level of tension, and the approximate level of tension is readjusted at least 5 times, resulting in a data set comprising 40 measurements for an approximate level of tension. By increasing the size of the data set, the effects of poor, noisy, anomalous, or otherwise aberrant readings can be diminished.

Furthermore, it may also be desirable to determine the actual tension in the rod after all measurements are made for a specific level of tension, but before the tension in the rod is reset to the same approximate level of tension. The tension can be determined, for example, using the lift-off method. It may be desirable to determine the actual tension in the rod even though it was set to a known level of tension because the rod may release or give slightly after the tension was set, thereby resulting in a determined tension that differs slightly from the tension that was set.

Once all the necessary or desirable data has been collected and/or stored for the first-selected rod in the plurality of post-tensioned rods, the measurements outlined above can be repeated for each of the remaining rods in the plurality of post-tensioned rods.

In some embodiments, data collected during the measurements can be automatically and/or manually stored in one or more memory devices, such as memory 453 of receiver 450, as well as one or more external memory devices connected to receiver 450. For example, software executing on the receiver 450 can automatically store the collected data. As another example, software on the receiver 450 can provide a GUI that enables the user to enter data manually. For example, the GUI can provide various fields for the user to enter measurements, such as tension levels set in the post-tensioned rods, tension levels measured in the post-tensioned rods, cantilever lengths, and the like. Other data can also be stored in receiver 450, whether entered manually or collected automatically, such as the date and time when each measurement was made, GPS coordinates, weather conditions, thermal conditions of the post-tensioned rods, information about the user of the system, information about the equipment used to conduct the measurements, and the like. In other embodiments, some or all of the data mentioned above can be stored in an external system 460 instead of, or in addition to, being stored in receiver 450. For example, in some embodiments, receiver 450 stores data received from sensor 440 while the remaining data is stored in external system 460. Thus, it is contemplated that the inventive systems disclosed herein can comprise a distributed system in which receiver 450 and external system 460 work in concert to collect, process, store, and transmit data related to the measurements and other parameters.

Modeling the training data. The training data can be analyzed to provide one or more models that correlates tension with a difference between first and second modal frequencies and cantilever lengths. The models can be used to estimate tension in other post-tensioned rods that were not used to create the training data. It should be noted, however, that nothing precludes using the models to also estimate tension in the post-tensioned rods used to create the models. However, since these post-tensioned rods would have been set to various levels of tension to create the training data, it is presumed that the tension in these rods is already known.

The data can be modeled by finding the frequency difference between first and second modal frequencies for each level of tension set while creating the training data and by grouping the cantilever lengths into one or more groups. To determine the frequency difference between first and second modal frequencies, the training data can be analyzed to determine a value for the first modal frequency and a value for the second modal frequency that corresponds to each impact that was made, and thus, each vibrational response that was measured. The values for the first and second modal frequencies can be found in numerous ways. One way is to convert temporal data received from the sensor, such as an accelerometer, from the time domain to the frequency domain, then to identify the first and second modal frequencies from the frequency domain representation.

Figure 22:
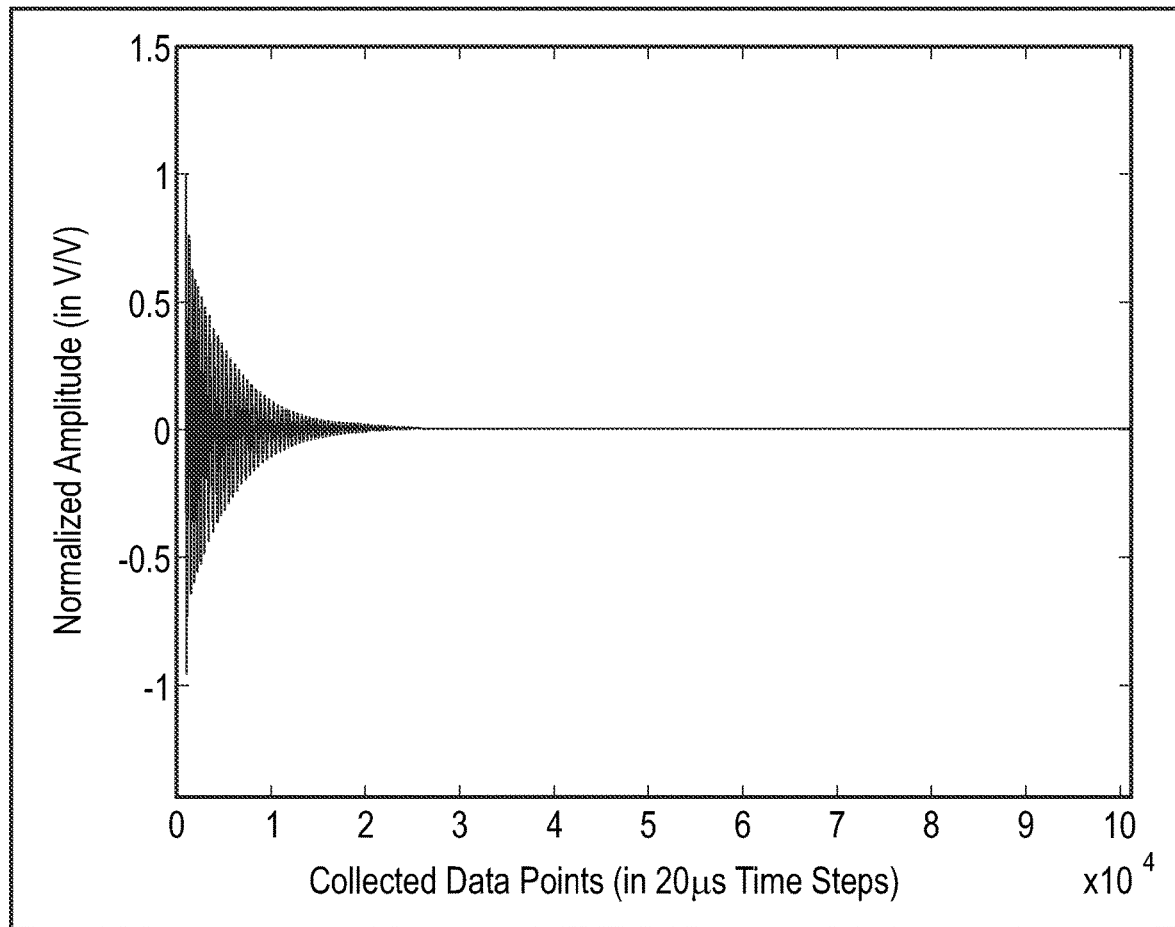
FIG. 22 is a graph diagram illustrating an example of temporal data associated with a vibrational response received from an accelerometer.
Figure 23:
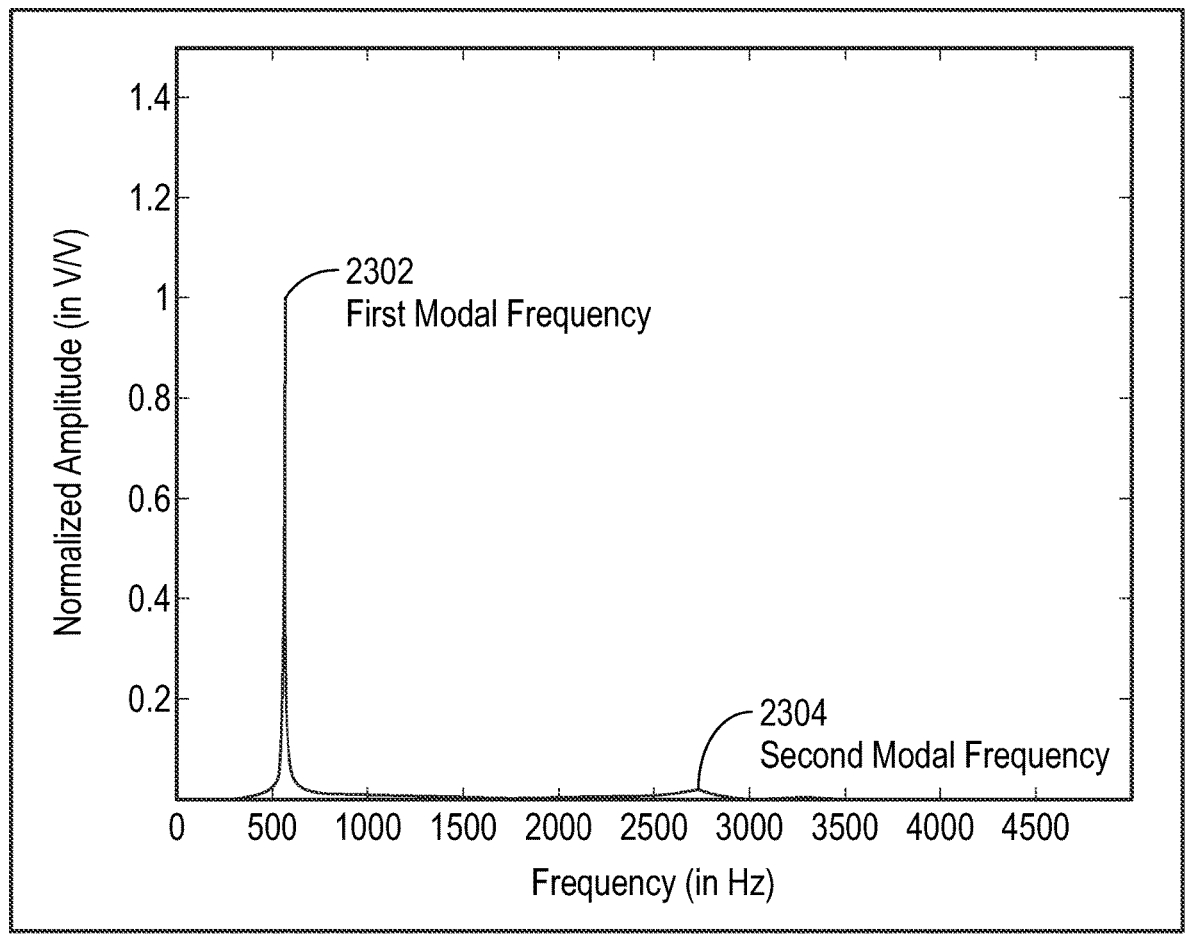
FIG. 23 is a graph diagram illustrating an example frequency response associated with a vibrational response received from an accelerometer.

FIG. 22 illustrates an example of temporal data associated with a vibrational response received from an accelerometer. The example illustrated in FIG. 22 is representative of training data that might be associated with one impact to one post-tensioned rod at one level of tension. As illustrated in FIG. 22, the x-axis corresponds to time and the y-axis corresponds to acceleration data that has been normalized to create a unity peak amplitude. The temporal data illustrated in FIG. 22 can be transformed to the frequency domain to obtain a frequency response corresponding to the impact to the post-tensioned rod. The temporal data can be transformed using, for example, a Fourier Transform and in particular, a Fast Fourier Transform (FFT). An example frequency response is illustrated in FIG. 23. As illustrated, the first modal frequency is identified as 2302 and the second modal frequency is identified as 2304. Other methods to determine the value of the first and second modal frequencies can be used. For example, the training data can be analyzed with software that can determine the modal frequencies. Additionally, the algorithms discussed in more detail below can be used.

Once the values for the first and second modal frequencies are determined from the training data, the values for each can be averaged. The average first modal frequency can then be subtracted from the average second modal frequency to determine a frequency difference between the average first and second modal frequencies for each tension level. An alternative approach that will produce the same results is to subtract the first modal frequency from the second modal frequency for each impact that was made, then to average the differences found for each impact. It should be noted that, if only a single measurement was made on a particular post-tensioned rod for a given level of tension (or only one measurement produced usable data to identify modal frequencies), the average frequency difference will be the frequency difference corresponding to that single measurement.

The lengths of the cantilevers measured at each tension level can be grouped into one or more groups. For example, where cantilevers of the post-tensioned rods ranged from 5.5 to 7.5 inches long, the lengths of the cantilevers can be grouped, for example, into four equal groups, each spanning 0.5 inches. In this regard, group one could contain cantilevers ranging between 5.5 to 6.0 inches long; group two from 6.0 to 6.5 inches long; group three from 6.5 to 7.0 inches long; and group four from 7.0 to 7.5 inches long. These groupings are merely an example configuration. The cantilever lengths can be group in myriad other ways. For example, the cantilever lengths can be grouped into 1, 2, 3, 4, 5, 6, 7, 8, 9, 10, and any greater number of groups. The groupings need not span an equal distance. For example, a first group can span 0.25 inches, a second group can span 0.5 inches, and a third group can span 1.5 inches. Thus, a group can span any size. The groupings also need not contain an equal number of cantilevers. Thus, the cantilevers may be grouped in any number of ways and the inventive systems, methods, and apparatuses are not limited to any specific grouping configuration.

Regression analysis can be performed on the frequency differences and tension levels for each cantilever grouping. The tension levels used in the analysis, and therefore associated with the frequency responses (i.e., frequency differences), can be the level of tension that was set in each post-tensioned rod while creating the training data, the level of tension that was measured before resetting tension levels during training, or an average of the two levels of tension. Once performed, the regression analysis can provide regression equations and/or regression plots that correlate the various levels of tension from the training data with frequency differences for each grouping.

Figure 24:
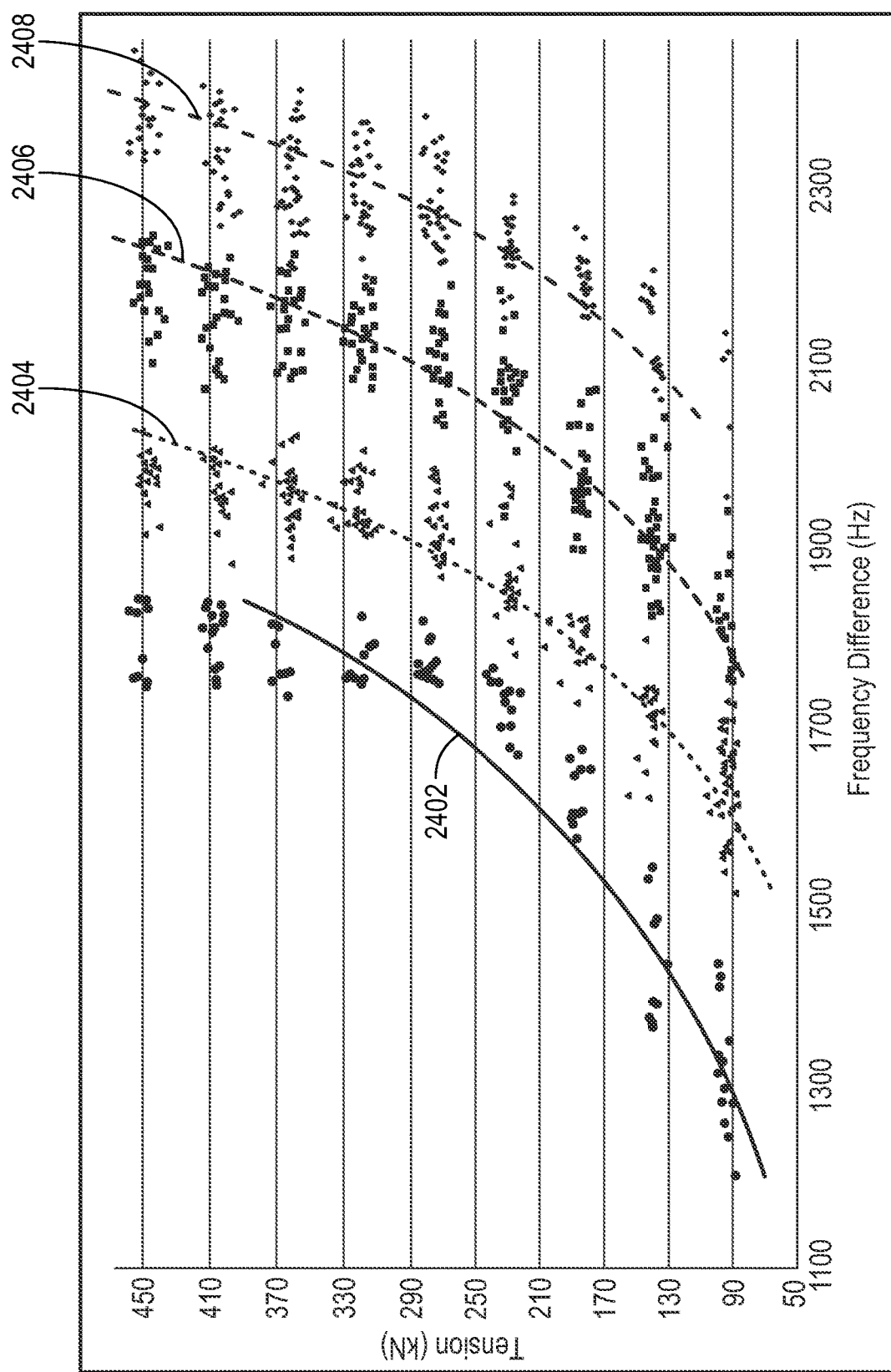
FIG. 24 is a graph diagram illustrating example regression plots for four cantilever groupings.

FIG. 24 illustrates example regression plots for four cantilever groupings, where the data for each grouping is identified by a different symbol (i.e., circles, triangles, squares, and diamonds). As illustrated in FIG. 24, frequency differences are plotted along the x-axis and tension levels are plotted along the y-axis. In this example, tension levels ranging from 90 kN to 450 kN were set in the plurality of post-tensioned rods in 40-kN increments. The regression analysis was performed for the four cantilever groupings, resulting in the four regression curves shown. Curve 2402 corresponds to cantilever group 1; curve 2404 corresponds to cantilever group 2; curve 2406 corresponds to cantilever group 3; and curve 2408 corresponds to cantilever group 4.

Estimating tension. The regression analysis can be used to estimate tension in a target post-tensioned rod. To do so, the length of a cantilever of the post-tensioned rod and a frequency difference between first and second modal frequencies can be found in a manner similar to that explained above in connection with generating the training data. That is, the length of the cantilever 412 of the target post-tensioned rod 410 can be measured and/or recorded. A sensor 440, such as an accelerometer, can be detachably coupled to the cantilever 412 and communicatively coupled to a receiver 450, such as receiver 450 of FIG. 21. The cantilever 412 can be transversely-impacted one or more times to initiate vibrational responses. The accelerometer can transmit data associated with the vibrational responses to receiver 450. From the received data, values for the first modal frequency and values for the second modal frequency can be determined. If more than one impact was made, these values can be averaged. The average first modal frequency can be subtracted from the average second modal frequency to provide an average frequency difference between the modal frequencies.

The average frequency difference between first and second modal frequencies for the target post-tensioned rod can be used to non-destructively estimate tension in the rod based on at least the model. For example, suppose the cantilever length of the target post-tensioned rod falls within the second cantilever grouping of the model illustrated in FIG. 24 (i.e., curve 2404). Suppose further that the frequency difference for the post-tensioned rod is determined to be 1950 Hz. Using the example model illustrated in FIG. 24, the post-tensioned rod would have an estimated tension of about 330 kN. Notably, this level of tension was estimated merely by measuring the cantilever length and determining the frequency difference of first and second modal frequencies in the target post-tensioned rod. Thus, once the training data is used to create a model, the process of estimating tension in other post-tensioned rods can be scaled rapidly. Indeed, the tension in all anchor rods at an entire wind farm, for example, can be estimated in a small fraction of the time than with current methods.

The model of FIG. 24 was used above to illustrate the principles of the invention. In practice, tension would typically be estimated based on the model using a software program. Software can add speed, precision, and efficiency over manually using graphs to identify estimated levels of tension. Thus, an alternative way to estimate tension in a target post-tensioned rod is to enter the training data, along with the data for the frequency difference and cantilever length of the target post-tensioned rod, into a software program that can analyze the data and generate a regression model that best fits the data, as well as an estimate for the tension in the target post-tensioned rod based on the model.

For example, once the training data and the data for the target post-tensioned rod are entered, the software program can analyze the data to determine which type of regression model results in the lowest mean absolute error (MAE). Example regression models include a Decision Tree Regressor, Random Forest Regressor, Gradient Boosting Regressor, XGB Regressor, K-Neighbors Regressor, Extra Trees Regressor, Stacking Regressor, Kernel Ridge, Ridge, Linear SVR, Keras Regressor, Lasso, SGD Regressor, MLP Regressor, SVR, Linear Regression, and Dummy Regressor. Other regression models can be considered and/or used as will be apparent to those of skill in the art. Based on the regression model selected, the training data, and the data associated with the target post-tensioned rod, the software program can provide an estimate for the tension in the target post-tensioned rod.

In addition to speed, precision, and efficiency, there are several other advantages of using the software program. For one, additional parameters can be input into the program to expand the data set for regression modeling. For example, the thermal condition of the post-tensioned rod, the size of the post-tensioned rod, and the time that it takes the vibrational response to dampen to a certain threshold can be input into the program. These additional parameters can help improve the accuracy of the estimations. Another benefit is that the program can identify when one parameter is a function of another parameter and thereby provide insight into which parameters to consider when procuring training data. Still another benefit is that the regression analysis is not dependent on any particular model, but rather will be based on the model that produces the lowest MAE. A regression model for one set of training data may not be the best-fit model for another set of training data.

Still another benefit of using software is that it can be loaded onto the receiver, such as the receiver 450 illustrated in FIG. 21. In this regard, receiver 450 can be an all-in-one unit for modeling tension with training data and estimating tension in post-tensioned rods. For example, receiver 450 can be a computing device, such as a tablet, that interfaces with a sensor 440 and receives sensor data associated with vibrational responses of post-tensioned rods. Receiver 450 can process and analyze the data to model tension as a function of differences in frequency for first and second modal frequencies of the post-tensioned rods. Receiver 450 can further receive input from a user associated with the length of cantilevers of the post-tensioned rods. Receiver 450 can then analyze the data and provide an estimate for tension in a target post-tensioned rod based on at least the model. Receiver 450 can include other functions, such as the ability to generate audit reports for a plurality of target post-tensioned rods, such as anchor rods used to support wind turbines at a wind farm.

In other embodiments, receiver 450 can be a data acquisition device (DAQ) configured to receive data from sensor 440, process the data, store the data, and optionally transmit the data to an external system 460. For example, external system 460 can be a computing device that contains software for analyzing the data received from the DAQ 450. Alternatively, external system 460 can comprise a network. Data from DAQ 450 can be transmitted to the network for offsite analysis. Other configurations in which receiver 450 and/or external system 460 receive data from sensor 440, process and analyze the data, and provide estimates for tension are possible and contemplated herein.

Distinguishing between models with signal damping. One potential difficulty that can arise when estimating tension in a target post-tensioned rod based on a model is that the frequency difference determined for the post-tensioned rod may correspond to two cantilever groupings and thus, potentially two different levels of tension. This potential difficulty can be exacerbated if the cantilever length of the target post-tensioned rod is on the cusp of two cantilever groupings. For example, returning to FIG. 24, a frequency difference of 1950 Hz corresponds to about 330 kN for cantilever grouping 2 (i.e., curve 2404) as previously explained; however, it also corresponds to a tension of about 170 kN for cantilever grouping 3 (i.e., curve 2406). If the cantilever length of the target post-tensioned rod is on the cusp of cantilever groups 2 and 3, it may be difficult to discern whether 330 kN or 170 kN is the more accurate estimate for tension in the target post-tensioned rod.

One approach to address this situation is to select the regression curve that results in the least amount of estimated tension. Although the tension may be underestimated with this approach, it should prompt further investigation to determine whether the tension complies with a specified design tension for the rod, which is favored over the alternative—potentially overestimating tension and allowing an under-tensioned rod to go unaddressed.

Another approach is to identify the correct model based on signal damping. It is believed that the time it takes the vibrational response to dampen in a post-tensioned rod can be correlated to the tension in the rod. For example, where two post-tensioned rods have approximately the same cantilever lengths and are impacted with approximately the same force, the vibrational response should dissipate sooner in the rod at a higher tension. Thus, if the frequency difference measured in the target post-tensioned rod corresponds to two regression models, signal damping may be used to resolve which model is more accurate. Preferably, for signal damping to distinguish regression models, an automated impacting device should be used to impact the plurality of post-tensioned rods to create the training data as well as the target post-tensioned rod. An automated impacting device can help deliver a consistent level of force for each impact, thus correlating the signal damping with tension in each of the post-tensioned rods.

Figure 25:
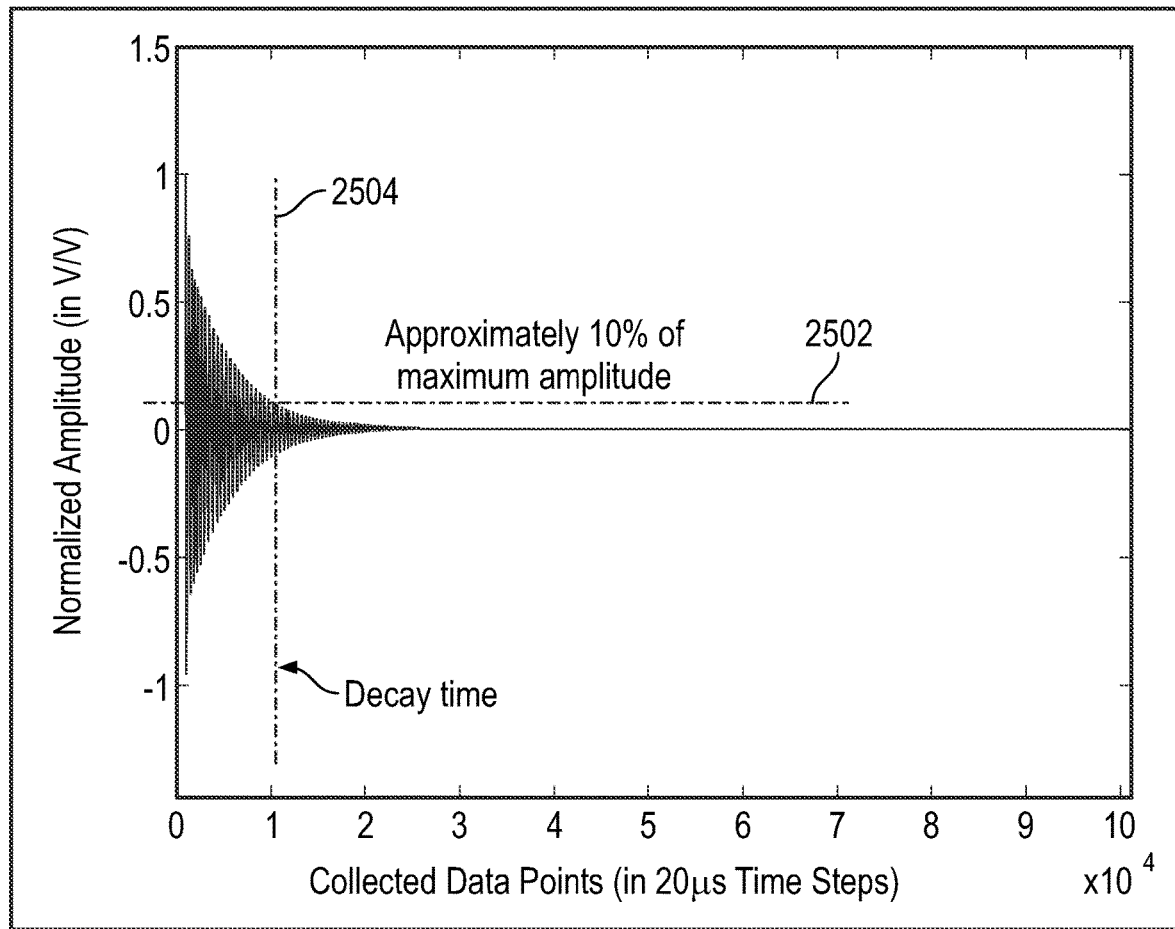
FIG. 25 is a graph diagram illustrating data associated with a vibrational response and a decay time.

Signal damping is based on decay time, which is the time that it takes the vibrational response to dampen to a certain threshold. For example, the threshold can be about ten percent (10%) of the maximum amplitude of the received data. FIG. 25 is a graph diagram illustrating data associated with a vibrational response and a decay time that corresponds to a threshold of 10%. As illustrated, the amplitude of the received data along the y-axis has been normalized. Thus, a threshold of 10% corresponds to an amplitude of 0.1, which is illustrated in FIG. 25 with line 2502. The decay time corresponding to 0.1 is approximately 22 μs, which is illustrated in FIG. 25 with line 2504. Where the target post-tensioned rod is impacted more than one time, the decay times corresponding to each of the vibrational responses can be averaged to find an average decay time.

The average decay time can be used to distinguish between regression models. For example, if the average frequency difference for the target post-tensioned rod corresponds to only one tension level (and thus, one cantilever grouping), that tension level is the estimated tension in the target post-tensioned rod. If, instead, the average frequency difference for the target post-tensioned rod corresponds to more than one tension level (and thus, more than one cantilever grouping), the average decay time can be analyzed to determine whether it is above or below a certain threshold. For example, where the threshold is 20 µs and the average decay time is found to be 22 µs, the estimated tension in the target post-tensioned rod would be the lower level of tension in the model. That is because the vibrational response dampened at a slower rate than the threshold of 20 µs. If the average decay time had been less than the 20 µs-threshold, the estimated tension in the target post-tensioned rod would be the high level of tension in the model because the vibrational response dampened at a faster rate.

Example Methods

Several testing protocols or methods provided by the inventions are provided below. All or some portions of these methods may be implemented with computer-executable instructions stored on one or more memory devices that are executed by a processor.

Figure 26:
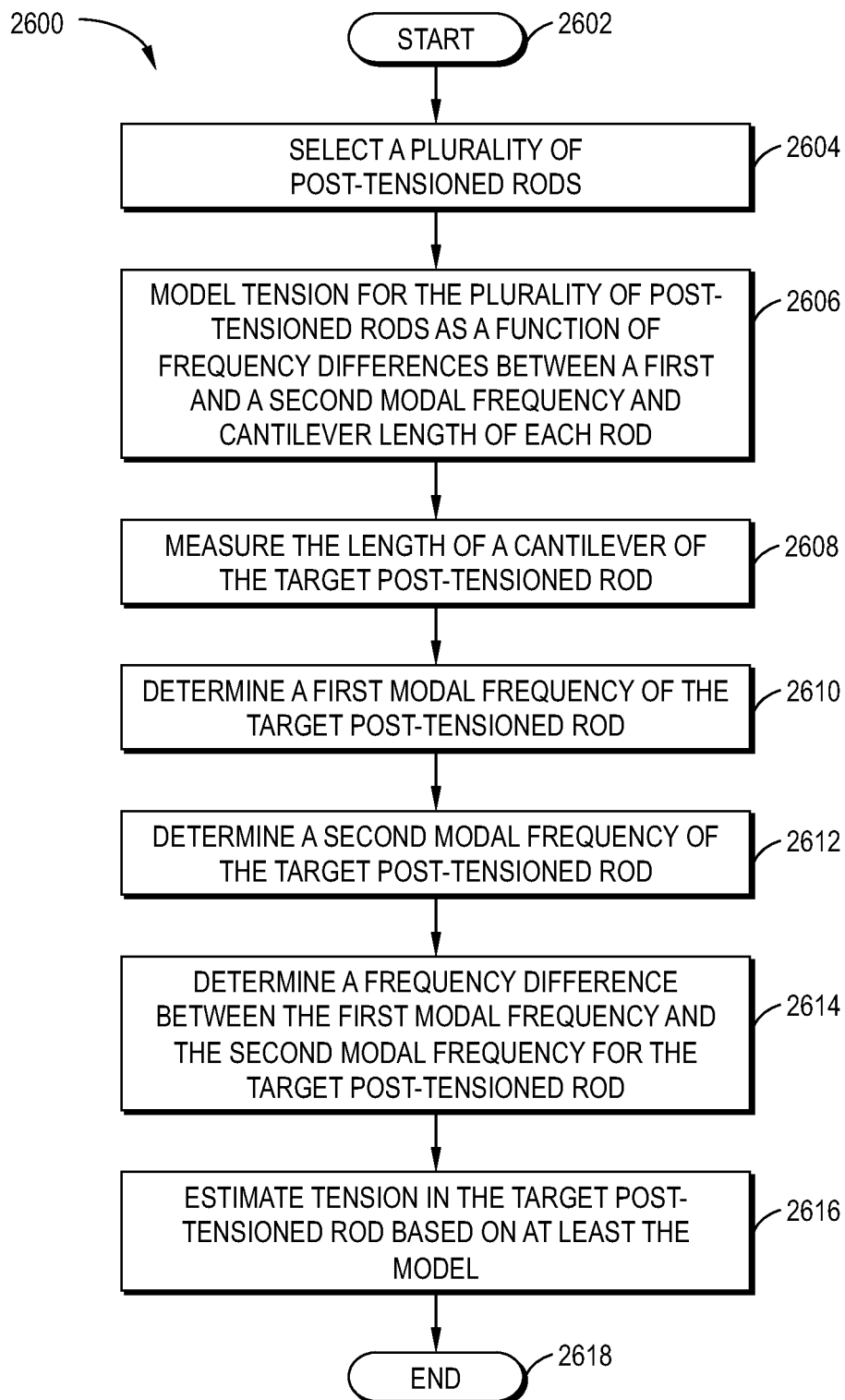
FIG. 26 is a flow diagram illustrating an example method for estimating tension in a target post-tensioned rod.

FIG. 26 is a flow diagram illustrating an example method for estimating tension in a target post tensioned rod. The method of FIG. 26 will be described with reference to the figures. In other examples, additional or alternative systems or components can be used to perform the method of FIG. 26.

Upon starting at step 2602, a plurality of post-tensioned rods can be selected at step 2604. At step 2606, tension for the plurality of post-tensioned rods can be modeled as a function of frequency differences between a first and a second modal frequency and cantilever length of each rod. At step 2608, the length of a cantilever of the target post-tensioned rod can be measured. At step 2610, a first modal frequency of the target post-tensioned rod can be determined. At step 2612, a second modal frequency of the target post-tensioned rod can be determined. At step 2614, a frequency difference between the first modal frequency and the second modal frequency for the target post-tensioned rod can be determined. At step 2616, tension in the target post-tensioned rod can be estimated based on at least the model. The method ends at step 2618.

Figure 27:
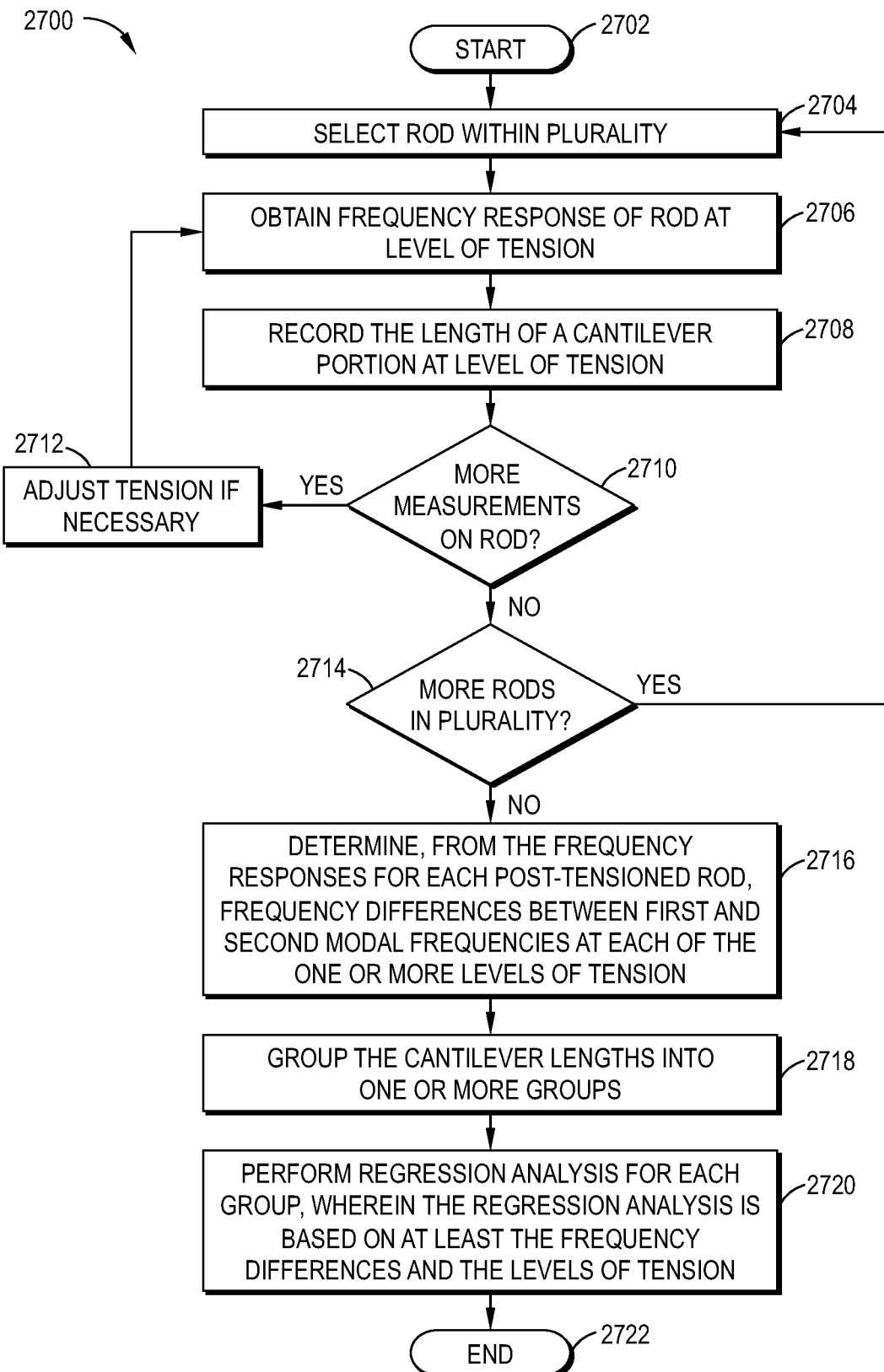
FIG. 27 is a flow diagram illustrating an example method for modeling tension for a plurality of post-tensioned rods.

FIG. 27 is a flow diagram illustrating an example method for modeling tension for a plurality of post-tensioned rods. The method can be used, for example, in connection with method 2600 of FIG. 26. The method of FIG. 27 will be described with reference to the figures. In other examples, additional or alternative systems or components can be used to perform the method of FIG. 27.

Upon starting at step 2702, a rod within the plurality of post-tensioned rods can be selected at step 2704. At step 2706, a frequency response of the selected rod at the level of tension can be obtained. At step 2708, the length of a cantilever portion of the selected rod at the level of tension can be recorded. At step 2710, it can be determined whether more measures on the selected rod are needed or desired. For any of the reasons explained above, several measurements can be made on each selected rod for each specified level of tension. If additional measurements are to be made, at step 2712 the tension in the selected rod can be adjusted if necessary. For example, multiple measurements can be made at a specific level of tension set in the rod. The tension in the rod can also be reset to the same approximate level of tension for additional measurements, as explained above. Thus, tension can be adjusted, if necessary, at step 2712 and steps 2706 through 2710 can be repeated. If, at step 2710, it is determined that additional measurements on the selected rod are not needed or desired, at step 2714, it can be determined whether there are additional rods in the plurality for measurements. If there are additional rods, steps 2704 through 2714 can be repeated. If, at step 2714, it is determined that there are no additional rods, at step 2716, frequency differences between first and second modal frequencies at each of the one or more levels of tension can be determined from the frequency responses for each post-tensioned rod in the plurality. At step 2718, the cantilever lengths can be grouped into one or more groups. At step 2720, regression analysis can be performed for each group, wherein the regression analysis is based on at least the frequency differences and the levels of tension. The method ends at step 2722.

Figure 28:
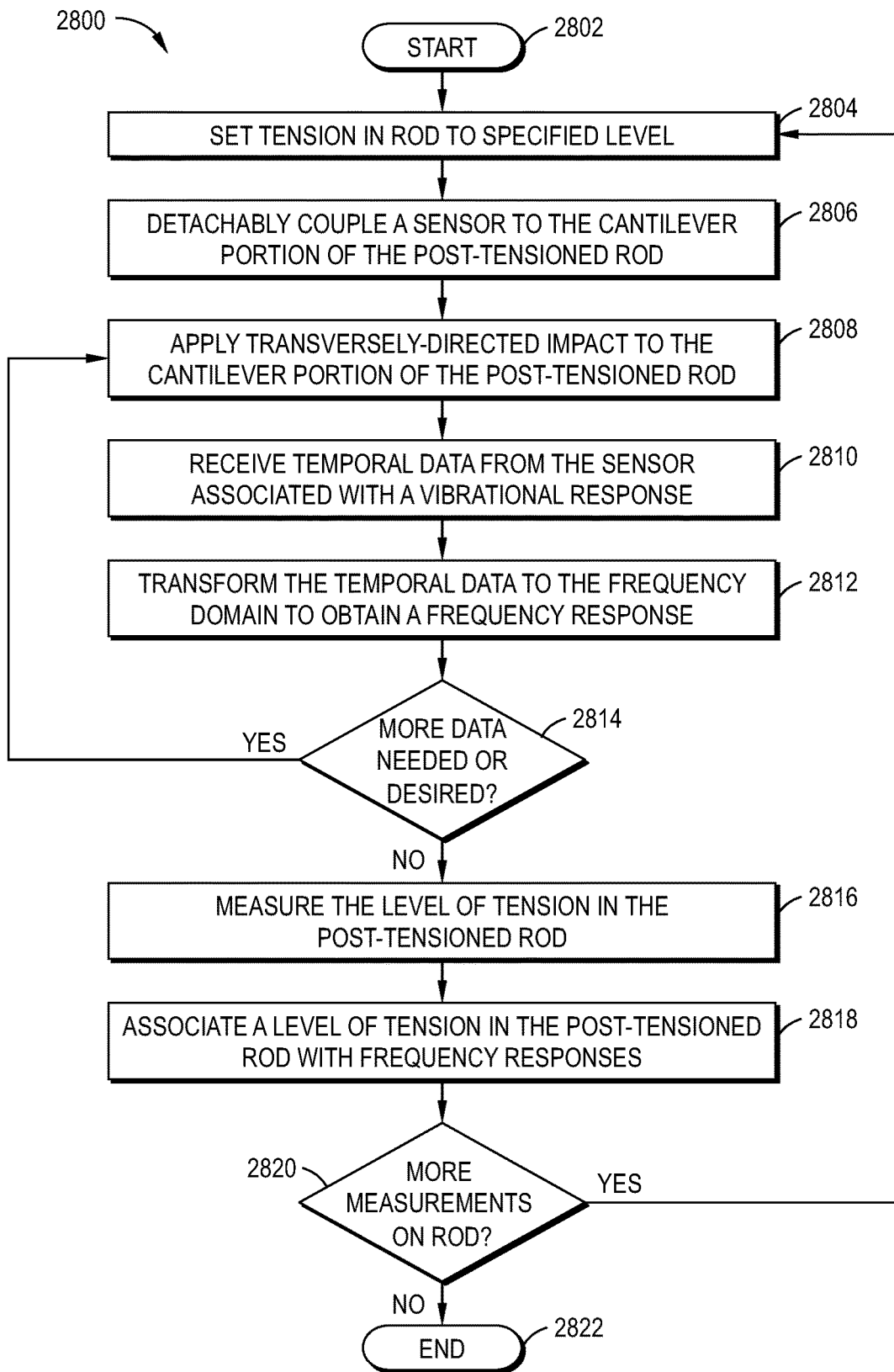
FIG. 28 is a flow diagram illustrating an example method for obtaining a frequency response for one or more levels of tension.

FIG. 28 is a flow diagram illustrating an example method for obtaining a frequency response for one or more levels of tension. The method can be used, for example, in connection with method 2700 of FIG. 27. The method of FIG. 28 will be described with reference to the figures. In other examples, additional or alternative systems or components can be used to perform the method of FIG. 28.

Upon starting at step 2802, tension in the post-tensioned rod can be set to a specified level at step 2804. At step 2806, a sensor can be detachably coupled to the cantilever portion of the post-tensioned rod. At step 2808, a transversely-directed impact can be applied to the cantilever portion of the post-tensioned rod. At step 2810, temporal data associated with a vibrational response can be received from the sensor. At step 2812, the temporal data can be transformed to the frequency domain to obtain a frequency response. At step 2814, it can be determined whether more data is needed or desired for the specified level of tension. For any of the reasons explained above, several measurements can be made on a post-tensioned rod at each level of tension set in the rod. If more data is needed or desired, steps 2808 through 2814 can be repeated. If, at step 2814, it is determined that more data is not needed or desired, at step 2816, the level of tension in the post-tensioned rod can be measured. At step 2818, a level of tension in the post-tensioned rod can be associated with the frequency responses. The level of tension associated can be the tension level set, the tension level measured, or a combination of both as explained above. At step 2820, it can be determined whether additional measurements are to be made on the post-tensioned rod (e.g., additional tension levels). If additional measurements are to be made, at step 2804, tension can be set in the rod to a specified level and steps 2806 through 2820 can be repeated. If, at step 2820, it is determined that additional measurements are not needed, the method can end at step 2822.

Figure 29:
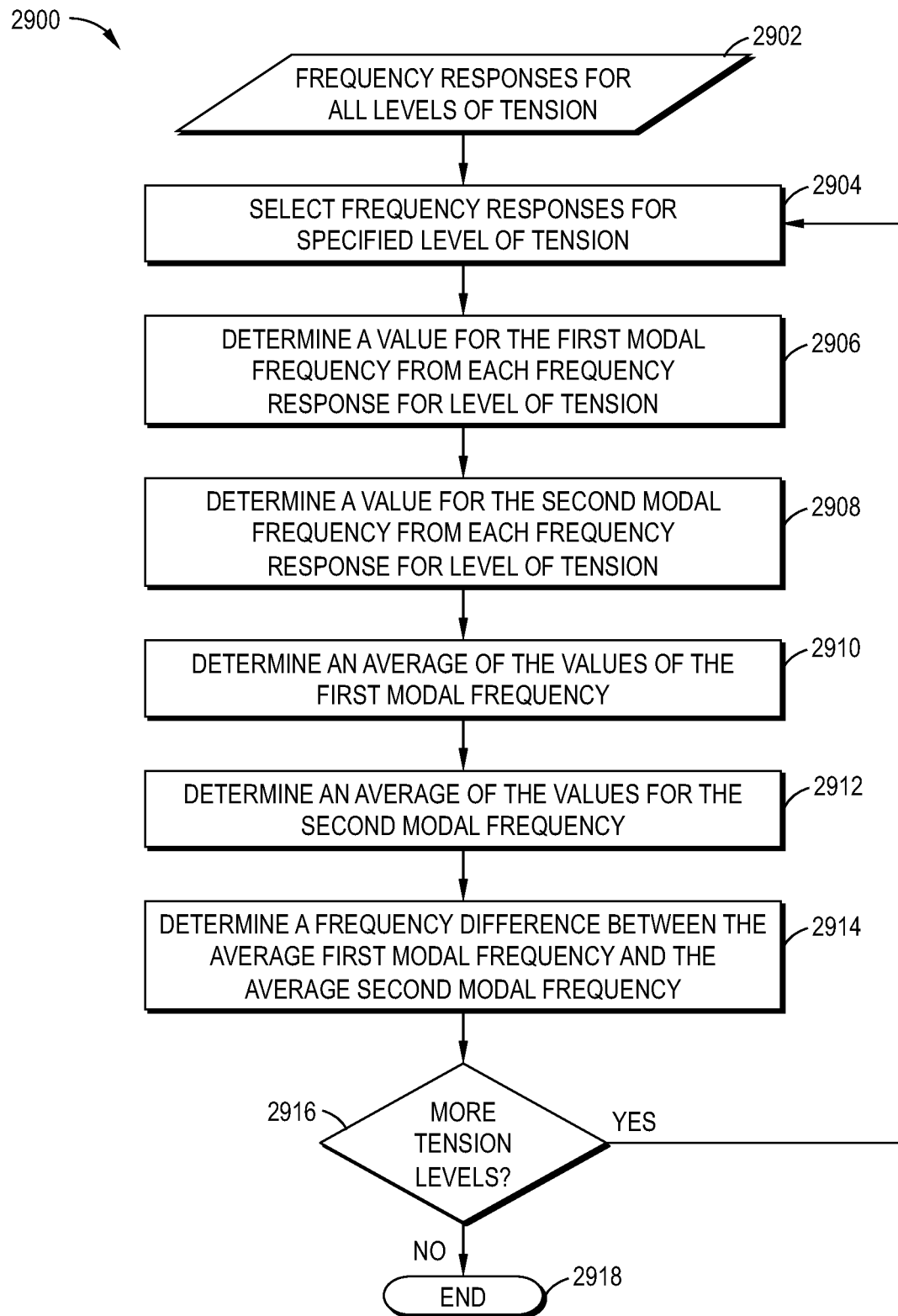
FIG. 29 is a flow diagram illustrating an example method for determining frequency differences between first and second modal frequencies.

FIG. 29 is a flow diagram illustrating an example method for determining, from frequency responses for each post-tensioned rod in a plurality, frequency differences between first and second modal frequencies at each of one or more levels of tension. The method can be used, for example, in connection with method 2700 of FIG. 27. The method of FIG. 29 will be described with reference to the figures. In other examples, additional or alternative systems or components can be used to perform the method of FIG. 29.

Upon starting at step 2902, the frequency responses for all levels of tension for the post-tensioned rod can be provided. At step 2904, the frequency responses for a specified level of tension can be selected. At step 2906, a value for the first modal frequency from each frequency response for the specified level of tension can be determined. At step 2908, a value for the second modal frequency from each frequency response for the specified level of tension can be determined. At step 2910, an average of the values of the first modal frequency can be determined. At step 2912, an average of the values for the second modal frequency can be determined. At step 2914, a frequency difference between the average first modal frequency and the average second modal frequency can be determined. At step 2916, it can be determined whether there are frequency responses for additional levels of tension. If there are additional frequency responses, at step 2904, the frequency response for another specified level of tension can be selected and steps 2906 through 2916 can be repeated. If, at step 2916, it is determined that there are no additional frequency responses to consider, the method can end at step 2918.

Figure 30:
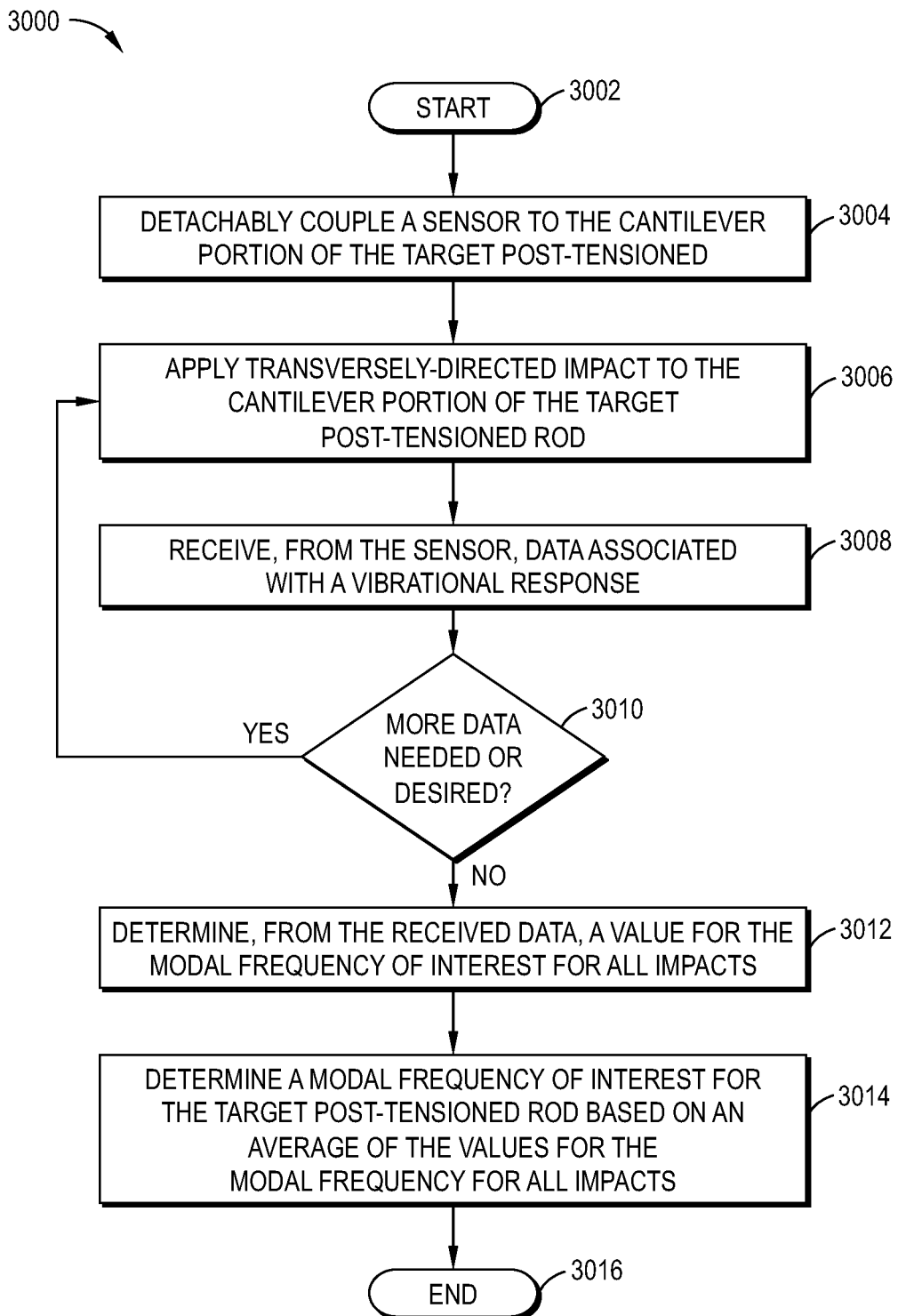
FIG. 30 is a flow diagram illustrating an example method for determining a modal frequency of a target post-tensioned rod.

FIG. 30 is a flow diagram illustrating an example method for determining a modal frequency (e.g., first, second, etc.) of a target post-tensioned rod. The method can be used, for example, in connection with method 2600 of FIG. 26. The method of FIG. 30 will be described with reference to the figures. In other examples, additional or alternative systems or components can be used to perform the method of FIG. 30.

Upon starting at step 3002, a sensor can be detachably coupled to the cantilever portion of the target post-tensioned rod at step 3004. At step 3006, a transversely-directed impact can be applied to the cantilever portion of the target post-tensioned rod. At step 3008, data associated with a vibrational response can be received from the sensor. At step 3010, it can be determined whether additional data is needed or desired. For any of the reasons explained above, several measurements can be made on a post-tensioned rod. If additional data is needed or desired, steps 3006 through 3010 can be repeated. If, at step 3010, it is determined that additional data is not needed or desired, at step 3012, a value for the modal frequency of interest (e.g., first, second, etc.) can be determined for all of the impacts. At step 3014, a modal frequency of interest for the target post-tensioned rod can be determined based on an average of the values for the modal frequency for all of the impacts. The method ends at step 3016.

Figure 31:
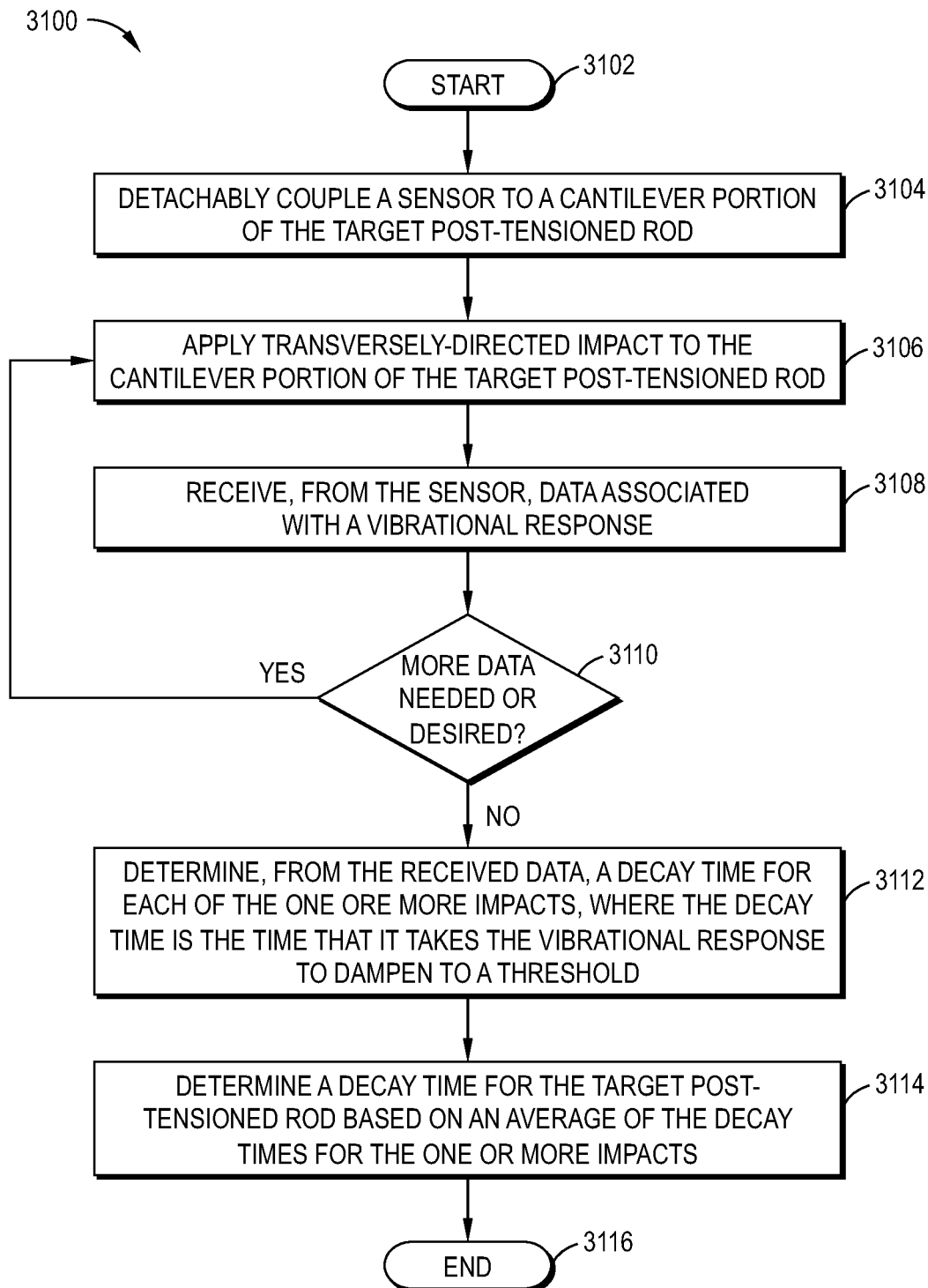
FIG. 31 is a flow diagram illustrating an example method for determining a decay time for a target post-tensioned rod.

FIG. 31 is a flow diagram illustrating an example method for determining a decay time for a target post-tensioned rod. The method can be used, for example, in connection with method 2600 of FIG. 26. The method of FIG. 31 will be described with reference to the figures. In other examples, additional or alternative systems or components can be used to perform the method of FIG. 31.

Upon starting at step 3102, a sensor can be detachably coupled to a cantilever portion of the post-tensioned rod at step 3104. At step 3106, a transversely-directed impact can be applied to the cantilever portion of the target post-tensioned rod. At step 3108, data associated with a vibrational response can be received from the sensor. At step 3110, it can be determined whether additional data is needed or desired. For any of the reasons explained above, several measurements can be made on a post-tensioned rod. If additional data is needed or desired, steps 3106 through 3110 can be repeated. If, at step 3110, it is determined that additional data is not needed, a decay time for each of the one or more impacts can be determined from the received data, wherein the decay time is the time that it takes the vibrational response to dampen to a threshold. At step 3114, a decay time for the target post-tensioned rod can be determined based on an average of the decay times for the one or more impacts. The method ends at step 3116.

Figure 32:
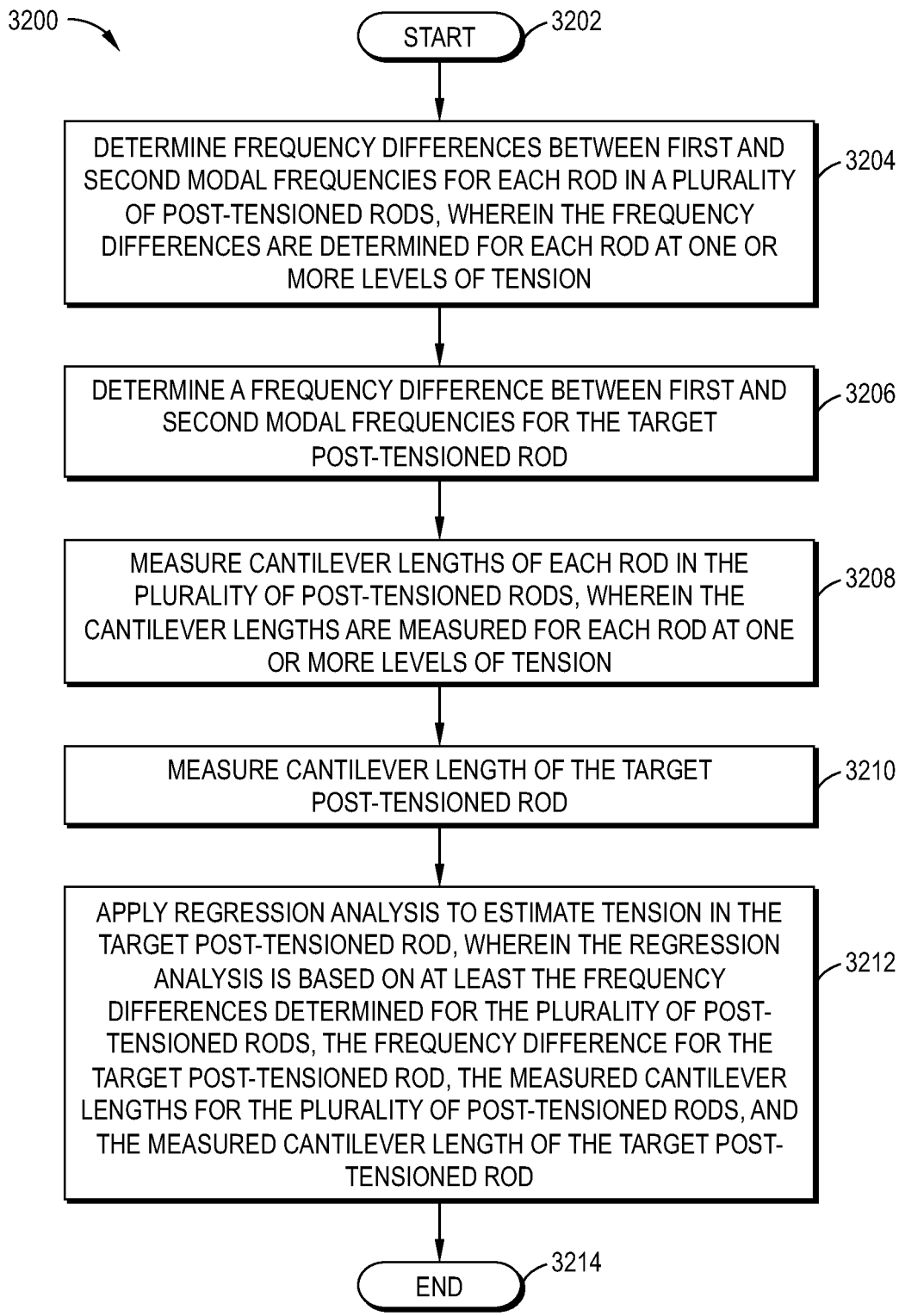
FIG. 32 is a flow diagram illustrating an example method for estimating tension in a target post-tensioned rod.

FIG. 32 is a flow diagram illustrating an example method for estimating tension in a target post-tensioned rod. The method of FIG. 32 will be described with reference to the figures. In other examples, additional or alternative systems or components can be used to perform the method of FIG. 32.

Upon starting at step 3202, at step 3204, frequency differences between first and second modal frequencies for each rod in a plurality of post-tensioned rods can be determined, wherein the frequency differences are determined for each rod at one or more levels of tension. At step 3206, a frequency difference between first and second modal frequencies for the target post-tensioned rod can be determined. At step 3208, cantilever lengths of each rod in the plurality of post-tensioned rods can be measured, wherein the cantilever lengths are measured for each rod at one or more levels of tension. At step 3210, the cantilever length of the target post-tensioned rod can be measured. At step 3212, regression analysis can be applied to estimate tension in the target post-tensioned rod, wherein the regression analysis is based on at least the frequency differences determined for the plurality of post-tensioned rods, the frequency difference for the target post-tensioned rod, the measured cantilever lengths for the plurality of post-tensioned rods, and the measured cantilever length of the target post-tensioned rod. The method ends at step 3214.

Example Algorithms and Methods for Analyzing Data Received from a Sensor.

As explained above, software can be used to analyze the sufficiency of data received from a sensor, such as an accelerometer, to validate that an impact was sufficient or to prompt the field person to impact the cantilever of a post-tensioned rod to generate another vibrational response. The software can also analyze data received from a sensor to determine first and second modal frequencies, determine a frequency difference between modal frequencies, and the like. In some embodiments, the software can reside on receiver 450. In other embodiments, the software can reside on external system 460. In still other embodiments, the software can reside on both receiver 450 and external system 460. For example, some of the steps of the following methods can be carried out in software on receiver 450 while other steps can be carried out in software on external system 460. Some steps of the following methods may not be carried out in software at all. Thus, the inventive methods described below are not limited by implementation.

Figure 33:
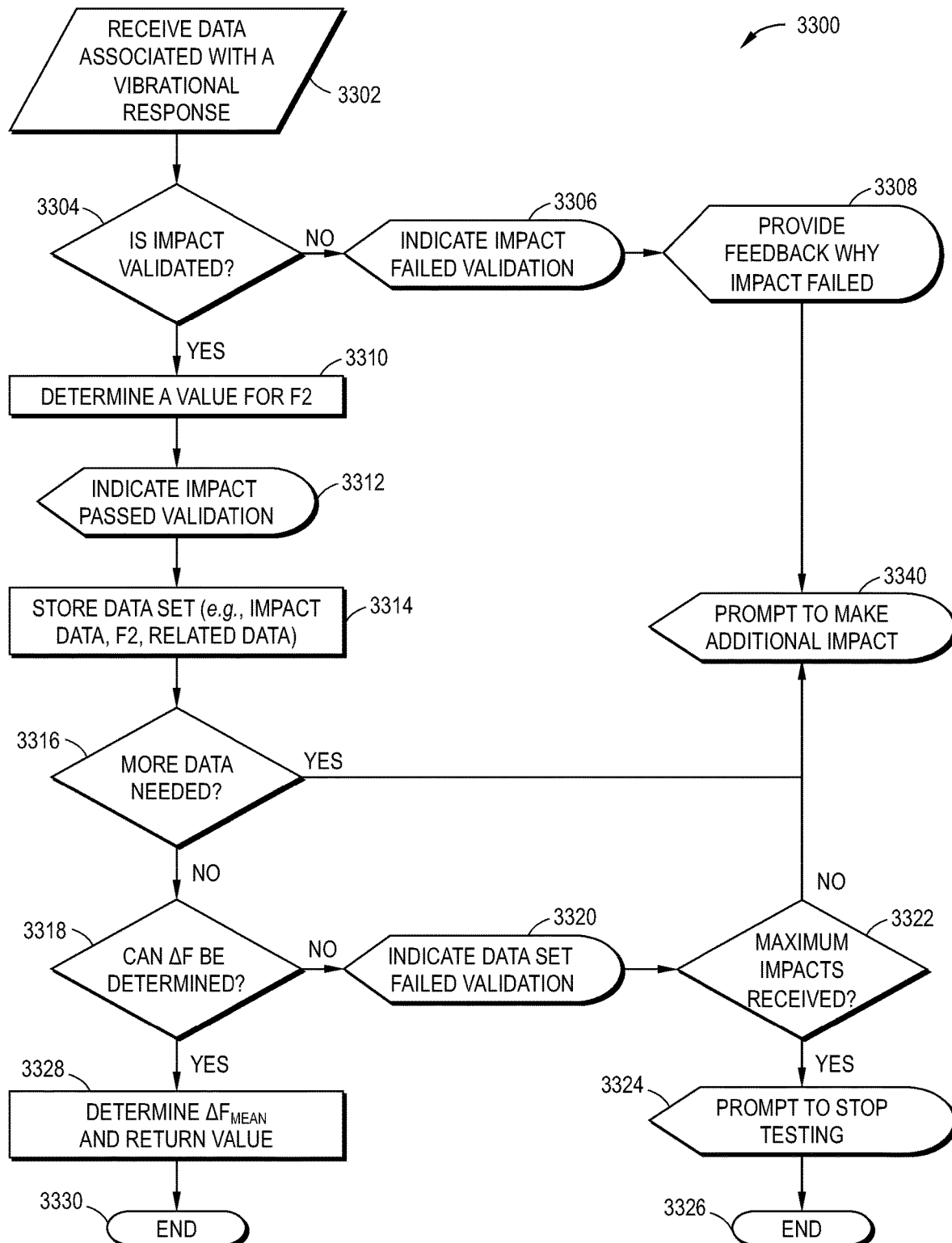
FIG. 33 is a flow diagram illustrating an example method for determining a frequency difference between first and second modal frequencies of a post-tensioned rod.

FIG. 33 is a flow diagram illustrating an example method for determining a frequency difference between first and second modal frequencies of a post-tensioned rod. The determination is based on data received from a sensor, such as an accelerometer, associated with a vibrational response of a post-tensioned rod. The method of FIG. 33 can be applied, for example, in connection with one or more measurements made on the same post-tensioned rod. That is, the method can be repeated for multiple measurements on the same rod until enough valid impacts are made and a frequency difference can be determined. Additionally or alternatively, the method can be repeated for the same rod until it is performed a maximum number of times. The method of FIG. 33 can be applied when creating training data to build a model and when determining a frequency difference for a target post-tensioned rod, for example.

The method of FIG. 33 begins at step 3302 by receiving data associated with a vibrational response, such as from an accelerometer. At step 3304, it can be determined whether the impact to the cantilever of the post-tensioned rod is validated based on the received data. For example, the data can be analyzed to determine whether it is usable or suitable for identifying a first modal frequency and/or a second modal frequency. If the received data is not validated at step 3304, the method of FIG. 33 can indicate, at step 3306, that the impact failed validation and, at step 3308, feedback can be provided regarding why the impact failed validation. At step 3340, the method of FIG. 33 can prompt the operator performing the measurements to impact the cantilever of the post-tensioned rod again. The method can resume at step 3302 if an additional impact is made.

If the received data is validated at step 3304, the received data can be analyzed at step 3310 to determine a value for the second modal frequency (F2). At step 3312, the method of FIG. 33 can indicate that the impact passed validation. At step 3314, a data set can be stored, for example, for later analysis. The data set can include, among other things, data received from the impact, the value for F2 determined at step 3310, and other related data. The related data can include, among other things, a value for the first modal frequency (F1) (e.g., when found during a previous step, such as steps 3304 or 3310) and confidence levels related to F2. It will be appreciated by those of skill in the art that the related data is not limited thereto, but can include other information such as the date and time related to a measurement, the identity of the operator conducting the measurement, information about the equipment used to conduct the measurement, weather conditions, thermal condition of the post-tensioned rod, and more.

At step 3316, it can be determined whether additional data is needed. Additional data may be needed for any of the reasons explained above. If additional data is needed at step 3316, the method of FIG. 33, at step 3340, can prompt the operator performing the measurements to impact the cantilever of the post-tensioned rod again. The method can resume at step 3302 if an additional impact is made.

If it is determined at step 3316 that additional data is not needed, it can be determined at step 3318 whether a data set comprising the data stored at step 3314 for each impact can be validated. For example, the data set can be analyzed to determine whether the stored data is sufficient for determining a frequency difference between first and second modal frequencies ($\Delta F$). The data may not be sufficient, for example, where some or all of the values determined for the second modal frequency vary significantly. By way of example only, suppose a data set contains values for the second modal frequency of 2485 Hz, 2489.2 Hz, 2491 Hz, 2491.7 Hz, and 2600 Hz. In this example, the first four values differ by no more than 7 Hz, whereas the value of 2600 Hz differs by more than 100 Hz. Thus, the value of 2600 Hz may be disregarded, leaving only four data points. If the minimum number of desired data points is five, the example data set might not be validated and the method of FIG. 33, at step 3320, can indicate that the data set failed validation.

Where a data set fails validation, the method of FIG. 33, at step 3322, can determine whether a maximum number of valid impacts to the cantilever has been received and, if so, indicate at step 3324 that the testing should cease and end the method at step 3326. If the maximum number of valid impacts to the cantilever has not been received, the method of FIG. 33 can, at step 3340, prompt the operator performing the measurements to impact the cantilever of the post-tensioned rod again. The method can resume at step 3302 if an additional impact is made. The determination at step 3322 regarding whether a maximum number of valid impacts has been received can be useful, for example, where an operator makes several valid impacts to a cantilever (e.g., passing the condition of step 3304), but the resulting data cannot be used to determine a frequency difference. Rather than the operator repeatedly striking a cantilever and never reaching a determination of a frequency difference, a maximum amount of valid impacts can be set, for example, to sixteen. If the maximum number of valid impacts has been reached but the resulting data is not usable to find a frequency difference, the operator can move on to another cantilever and restart the measurements.

If the data set is validated at step 3318 (e.g., $\Delta F$ can be determined), the method of FIG. 33 can proceed to step 3328 to determine a frequency difference between the average values for the first and second modal frequencies ($\Delta F_{MEAN}$) and subsequently end at step 3330. It should be noted that, if the method of FIG. 33 is performed with only one value for the first and second modal frequencies, average values for each frequency will be the values found.

Impact validation. As discussed above in connection with step 3304 of the method of FIG. 33, an impact made to a cantilever may or may not be valid. An impact may not be valid where the resulting data is not usable or suitable for determining a first and/or second modal frequency. To make this determination, the resulting data can be analyzed in the time domain and/or the frequency domain to determine whether it meets certain criteria.

Figure 34:
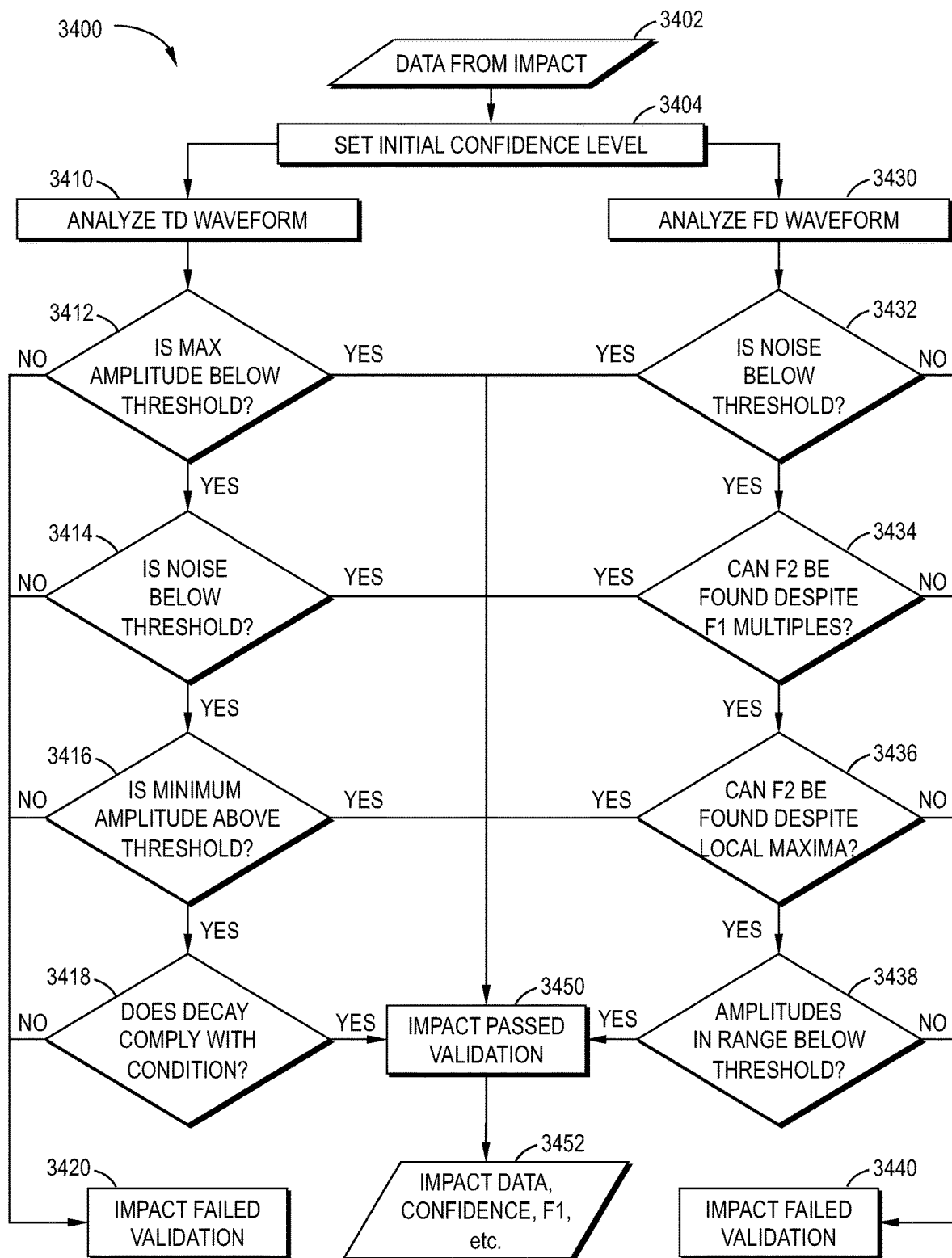
FIG. 34 is a flow diagram illustrating an example method for determining whether an impact made to a cantilever is valid.

FIG. 34 is a flow diagram illustrating an example method for determining whether an impact made to a cantilever is valid. The method of FIG. 34 begins at step 3402 with data being received from a sensor, such as an accelerometer, resulting from impacting a cantilever of a post-tensioned rod. At step 3404, an initial confidence level corresponding to the impact can be set. The confidence level can be adjusted as the received data is analyzed. For example, confidence can be divided into three levels, such as 1, 0.5, and 0, where 1 is the highest confidence and 0 is the lowest confidence. The confidence level may provide insight about the accuracy of the data and used in subsequent analyses. Thus, at step 3404, the initial confidence level can be set to the highest level, such as 1. After step 3404, the time domain (TD) waveform or the frequency domain (FD) waveform can be analyzed. If the received data is in the time domain, it may be more efficient to analyze the time domain waveform first. If the received data is in the frequency domain, it may be more efficient to analyze the frequency domain waveform first. However, the data can be analyzed in either domain first (presuming the data will be analyzed in both domains), or it can be analyzed in only one of the domains. If the received data is in one domain and is to be analyzed in the other domain, an appropriate mathematical transform can be used, such as a Fourier Transform or an inverse Fourier Transform. For convenience, the following description begins with an explanation of analyzing the time domain representation of the received data (step 3410).

At step 3412, the received data can be analyzed in the time domain to determine a maximum amplitude of the received data. If the maximum amplitude exceeds a certain threshold, such as an operating range of the sensor, the condition at step 3412 is not satisfied. This is typically referred to as clipping. Consequently, the impact fails validation (step 3420) and the method is ended. If the maximum amplitude is below the threshold, the condition at step 3412 is satisfied. The method can proceed to step 3414 to test another condition of the time domain waveform, proceed to step 3450 and the impact can be considered validated, or proceed to step 3430 to analyze the frequency domain waveform (not shown by arrow).

At step 3414, the received data can be analyzed in the time domain to determine whether noise is present in a first range of the received data, such as before the primary waveform begins. This is referred to as pre-triggered noise and could be caused, for example, by the operator not allowing enough time to pass between impacts and thus impacting the rod while it is still vibrating from a previous impact. Pre-triggered noise can also be caused by vibrating sources nearby, such as a generator. Pre-triggered noise could be detected in several ways. One example is to divide the first range into sections and, for each section, find the average amplitude and the standard deviation. Then, determine the standard deviation of all the section averages and the average of all the section standard deviations. If the ratio of the standard deviation of all the section averages to the average of all the section standard deviations is above a certain threshold, the condition at step 3414 is not satisfied. Consequently, the impact fails validation (step 3420) and the method is ended. If the ratio of the standard deviation of all the section averages to the average of all the section standard deviations is below the threshold, the condition at step 3414 is satisfied. The method can proceed to step 3416 to test another condition of the time domain waveform, proceed to step 3450 and the impact can be considered validated, or proceed to step 3430 to analyze the frequency domain waveform (not shown by arrow).

At step 3416, the received data can be analyzed in the time domain to determine a minimum amplitude of the received data. If the minimum amplitude is below a certain threshold, such as two percent (2%) of the maximum allowable amplitude, the received data may not be usable to determine first and/or second modal frequencies and the condition at step 3416 is not satisfied. Consequently, the impact fails validation (step 3420) and the method is ended. If the minimum amplitude is above the threshold, the condition at step 3416 is satisfied. The method can proceed to step 3418 to test another condition of the time domain waveform, proceed to step 3450 and the impact can be considered validated, or proceed to step 3430 to analyze the frequency domain waveform (not shown by arrow).

Figure 35:
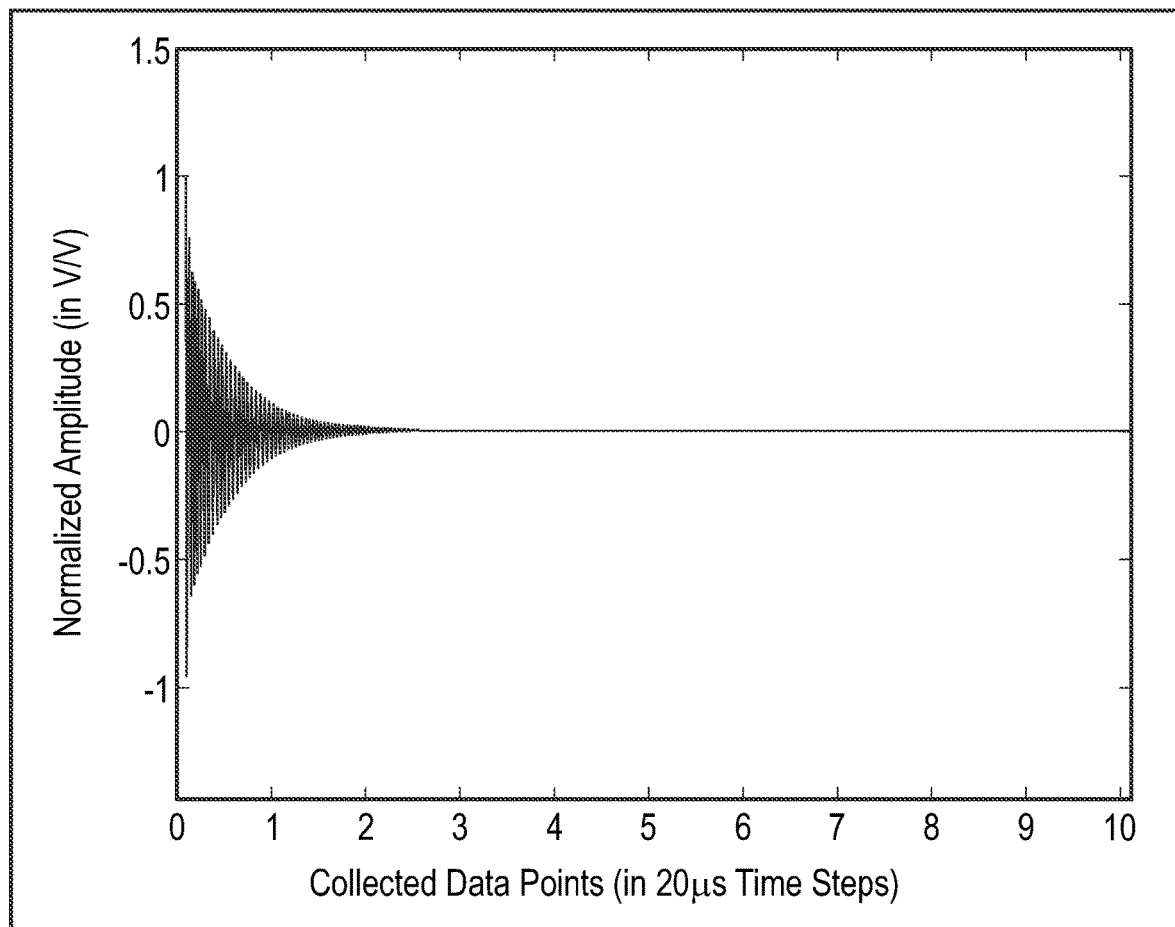
FIG. 35 is a graph diagram illustrating an example waveform in the time domain that decays exponentially until steady state.
Figure 36:
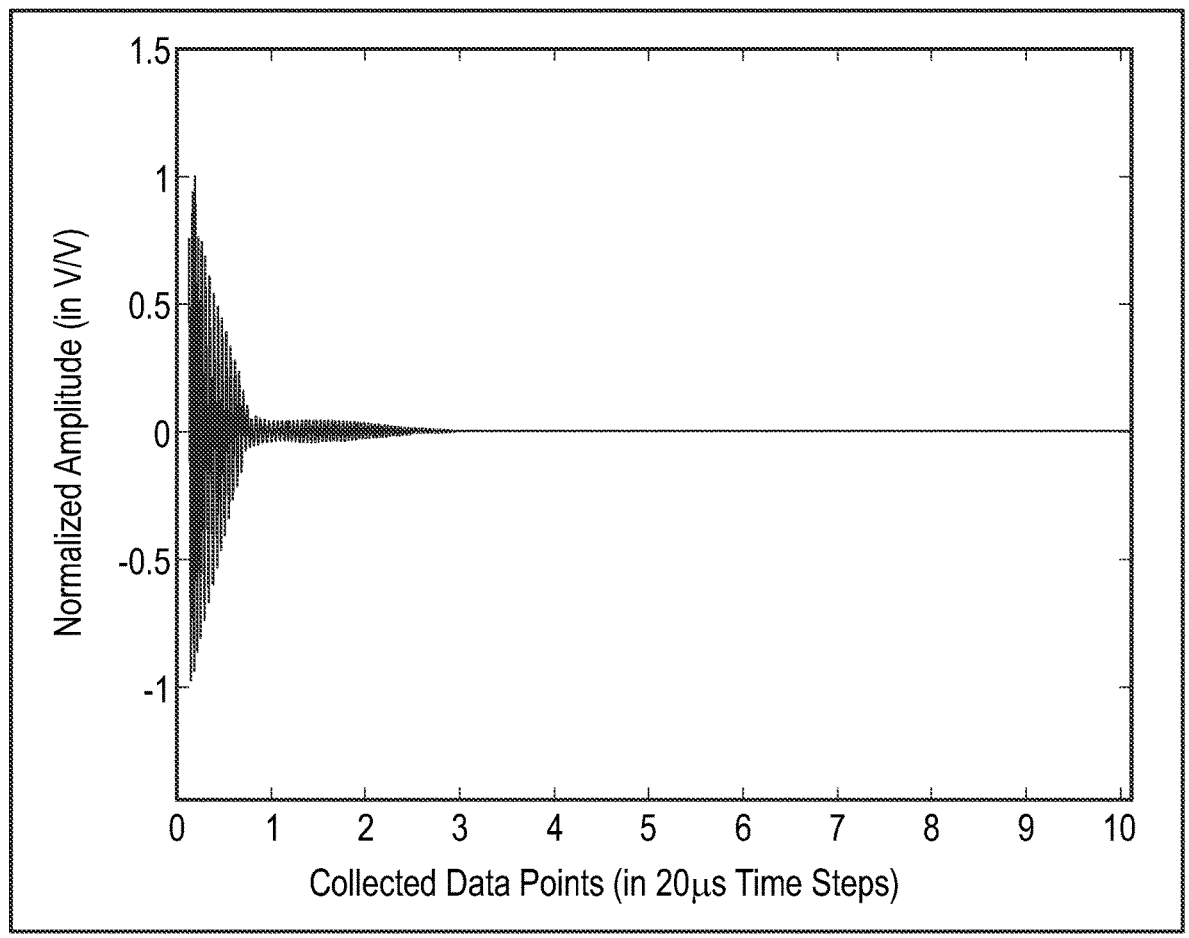
FIG. 36 is a graph diagram illustrating an example waveform in the time domain that does not decay exponentially until steady state.

At step 3418, the received data can be analyzed in the time domain to determine the rate of decay of the received data. If the time-domain waveform does not decay at a consistent exponential rate until steady state as expected, the received data may have post-triggered noise and therefore may not be usable to determine first and/or second modal frequencies. FIG. 35 illustrates an example waveform having a rate of decay that decreases exponentially until steady state. In contrast, FIG. 36 illustrates an example waveform that does not decrease exponentially until steady state. For example, there is an abrupt change in the amplitude of the waveform at approximately 18 is. Thus, the waveform illustrated in FIG. 36 might be an example of post-triggered noise. Other examples of waveforms that do not decrease exponentially until steady state are possible. If the amount of post-triggered noise exceeds a certain threshold, the condition at step 3418 is not satisfied. Consequently, the impact fails validation (step 3420) and the method is ended. If post-triggered noise is present and is below the threshold, the condition at step 3418 is satisfied. The method can proceed to step 3450 and the impact can be considered validated, or it can proceed to step 3430 to analyze the frequency domain waveform (not shown by arrow).

The frequency domain waveform can be analyzed at step 3430, whether before the time domain waveform is analyzed or after one or more conditions of the time domain waveform have been analyzed.

At step 3432, the received data can be analyzed in the frequency domain to determine an amount of noise present in the frequency-domain waveform. If the amount of noise exceeds a first threshold, the received data may not be usable to determine first and/or second modal frequencies. Noise in the frequency-domain waveform could be detected in several ways. One example is to determine whether the absolute displacement of amplitudes of the waveform for all frequencies within a specified range, exclusive of displacements likely associated with F2, exceeds the first threshold. This can be determined, for example, by finding the likely amplitude of F1, normalizing all frequencies in the frequency-domain waveform to the F1 amplitude, specifying a range of frequencies where F2 is likely to be found, and summing the absolute value for all amplitude changes within that range. From the sum, the absolute value for all amplitude changes likely associated with F2 can be subtracted. If the result is above the first threshold, for example, 1.5 times the amplitude of F1, the condition at step 3432 is not satisfied. Consequently, the impact fails validation (step 3440) and the method is ended. If the result is below the first threshold, the condition at step 3432 is satisfied. Additionally, a second threshold, which is lower than the first threshold, can be set to adjust the confidence level if it is exceeded. For example, although the amount of noise present in the frequency-domain waveform may have been less than the first threshold and therefore the condition at step 3432 is satisfied, the amount of noise may still be prevalent enough to call into question the accuracy of the data. Thus, if the amount of noise exceeds the second threshold, the confidence level can be adjusted from 1 to 0.5 (or kept at 0.5 if previously adjusted). Because the condition at step 3432 was satisfied, the method can proceed to step 3434 to test another condition of the frequency domain waveform, proceed to step 3450 and the impact can be considered validated, or proceed to step 3410 to analyze the time domain waveform (not shown by arrow).

Figure 37:
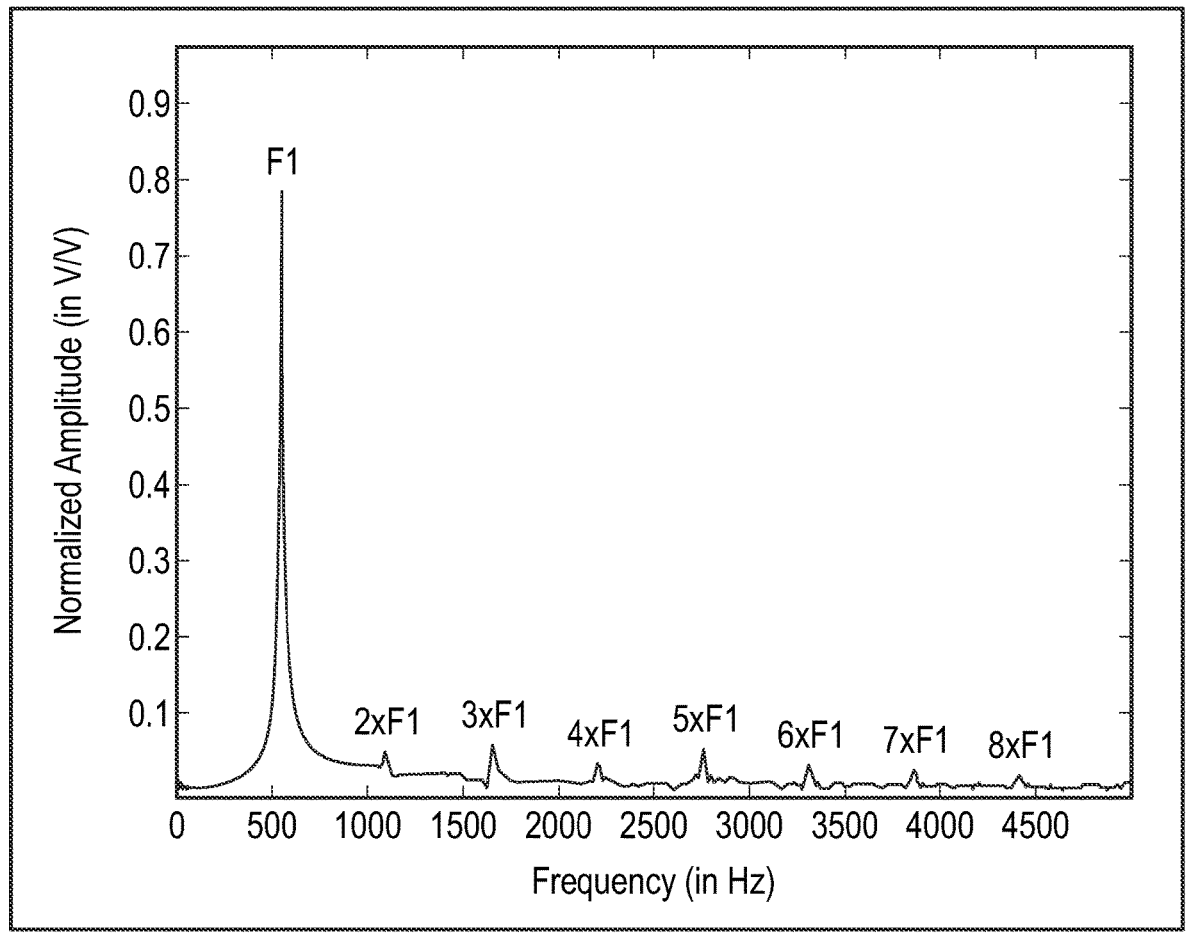
FIG. 37 is a graph diagram illustrating an example waveform in the frequency domain containing periodic amplitudes.
Figure 38:
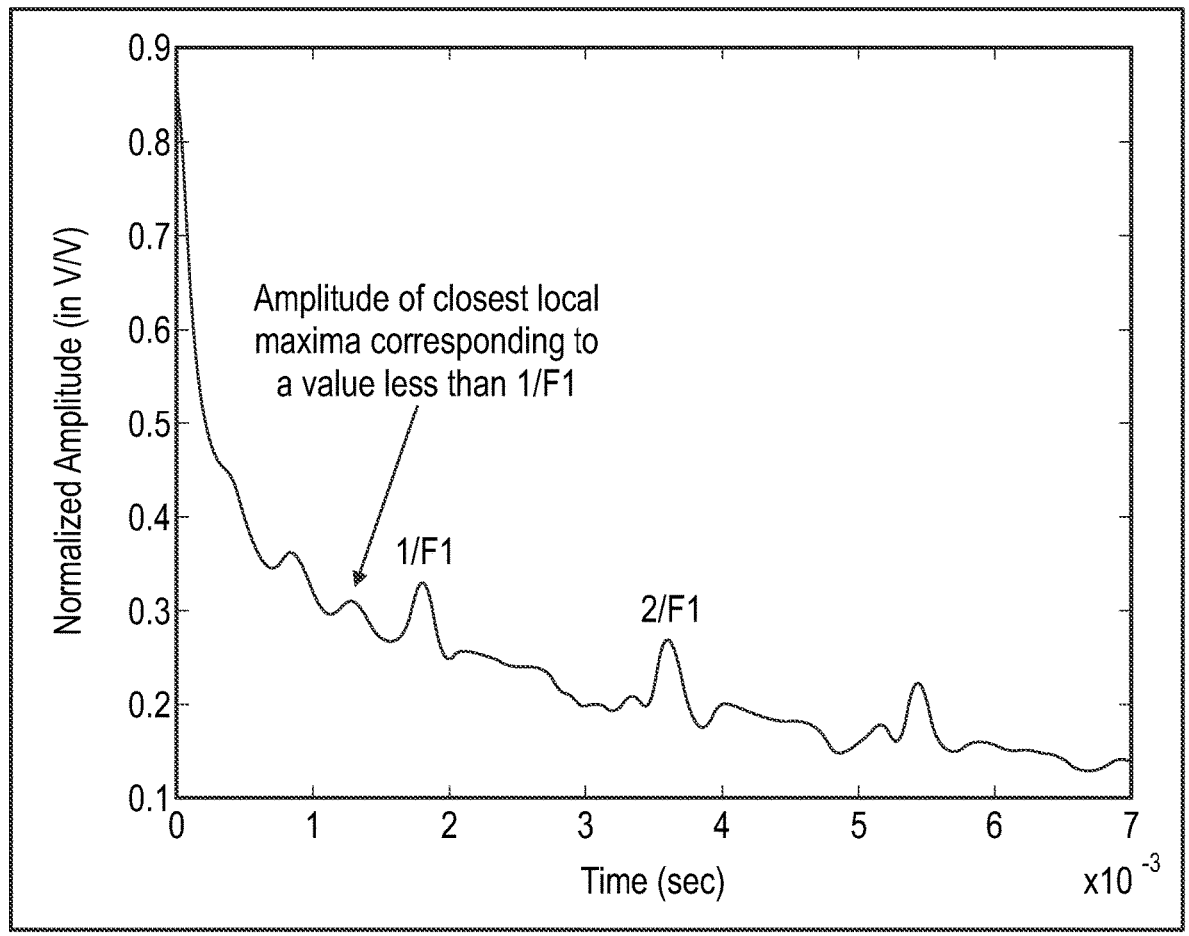
FIG. 38 is a graph diagram illustrating an FFT of the graph of FIG. 37.

At step 3434, the received data can be analyzed to determine whether multiples of a likely frequency value for F1 have amplitudes that may potentially mask the value of F2, thereby rendering the received data unusable to determine the second modal frequency. An example of this phenomenon is illustrated in FIG. 37. As shown, the frequency-domain waveform contains periodic amplitudes at frequencies approximately corresponding to multiples of F1. Whether this phenomenon may potentially mask the value of F2 can be determined in several ways. One example is to find an FFT of the frequency-domain waveform (e.g., an FFT of an FFT). An example is illustrated in FIG. 38, which is an FFT of the waveform illustrated in FIG. 37. From the resulting waveform, determine an amplitude corresponding to the period of F1 (i.e., 1/F1). If that amplitude is greater than an amplitude of the closest local maxima corresponding to a value less than 1/F1 or greater than an amplitude corresponding to twice the period of F1 (i.e., 2/F1), the condition at step 3434 is not satisfied. Consequently, the impact fails validation (step 3440) and the method is ended. If the amplitude at 1/F1 is less than both an amplitude of the closest local maxima corresponding to a value less than 1/F1 and the amplitude corresponding to 2/F1, the condition at step 3434 is satisfied. The method can proceed to step 3436 to test another condition of the frequency domain waveform, proceed to step 3450 and the impact can be considered validated, or proceed to step 3410 to analyze the time domain waveform (not shown by arrow).

At step 3436, the received data can be analyzed in the frequency domain to determine whether multiple local maxima may obscure the value of F2, thereby rendering the received data unusable to determine first and/or second modal frequencies. This can be determined, for example, by finding the width of each local maxima corresponding to half of the peak amplitude of the maxima and determining whether the widths exceed a certain threshold. If at least three local maxima have both widths that exceed the threshold and amplitudes that exceed half of the maximum possible F2 amplitude, the condition at step 3436 is not satisfied. Consequently, the impact fails validation (step 3440) and the method is ended. If the widths do not exceed the threshold, the condition at step 3436 is satisfied. The method can proceed to step 3438 to test another condition of the frequency domain waveform, proceed to step 3450 and the impact can be considered validated, or proceed to step 3410 to analyze the time domain waveform (not shown by arrow).

At step 3438, the received data can be analyzed in the frequency-domain to determine whether the amplitudes within a specified range exceed a first threshold, thereby rendering the received data unusable to determine first and/or second modal frequencies. This can be determined, for example, by identifying a range of frequencies and finding the lower quartile of amplitudes within that range. If the lower quartile of amplitudes are above the first threshold, the condition at step 3438 is not satisfied. Consequently, the impact fails validation (step 3440) and the method is ended. If the lower quartile of amplitudes are below the first threshold, the condition at step 3438 is satisfied. Additionally, a second threshold, which is lower than the first threshold, can be set to adjust the confidence level if it is exceeded. For example, although the amplitudes within the specified range may not have exceeded the first threshold and therefore the condition at step 3438 is satisfied, the amplitudes within the specified range may still be large enough to call into question the accuracy of the data. Thus, if the amplitudes exceed the second threshold, the confidence level can be adjusted from 1 to 0.5 (or kept at 0.5 if previously adjusted). Because the condition at step 3438 was satisfied, the method can proceed to step 3450 and the impact can be considered validated, or it can proceed to step 3410 to analyze the time domain waveform (not shown by arrow).

Once the impact is considered validated at step 3450, the method can return information at step 3452 (e.g., information relating to the time domain representation of the impact data, information relating to the frequency domain representation of the impact data, confidence levels, value for F1 (if found when conditions were tested), etc.) and the method is ended. It should be noted that any or all of the conditions illustrated in FIG. 34 can be analyzed when carrying out method 3400. Moreover, the conditions analyzed can be analyzed in any order. For example, the condition at step 3414 can be analyzed, followed by the condition at step 3438, followed by the condition at step 3412, etc.

Figure 39:
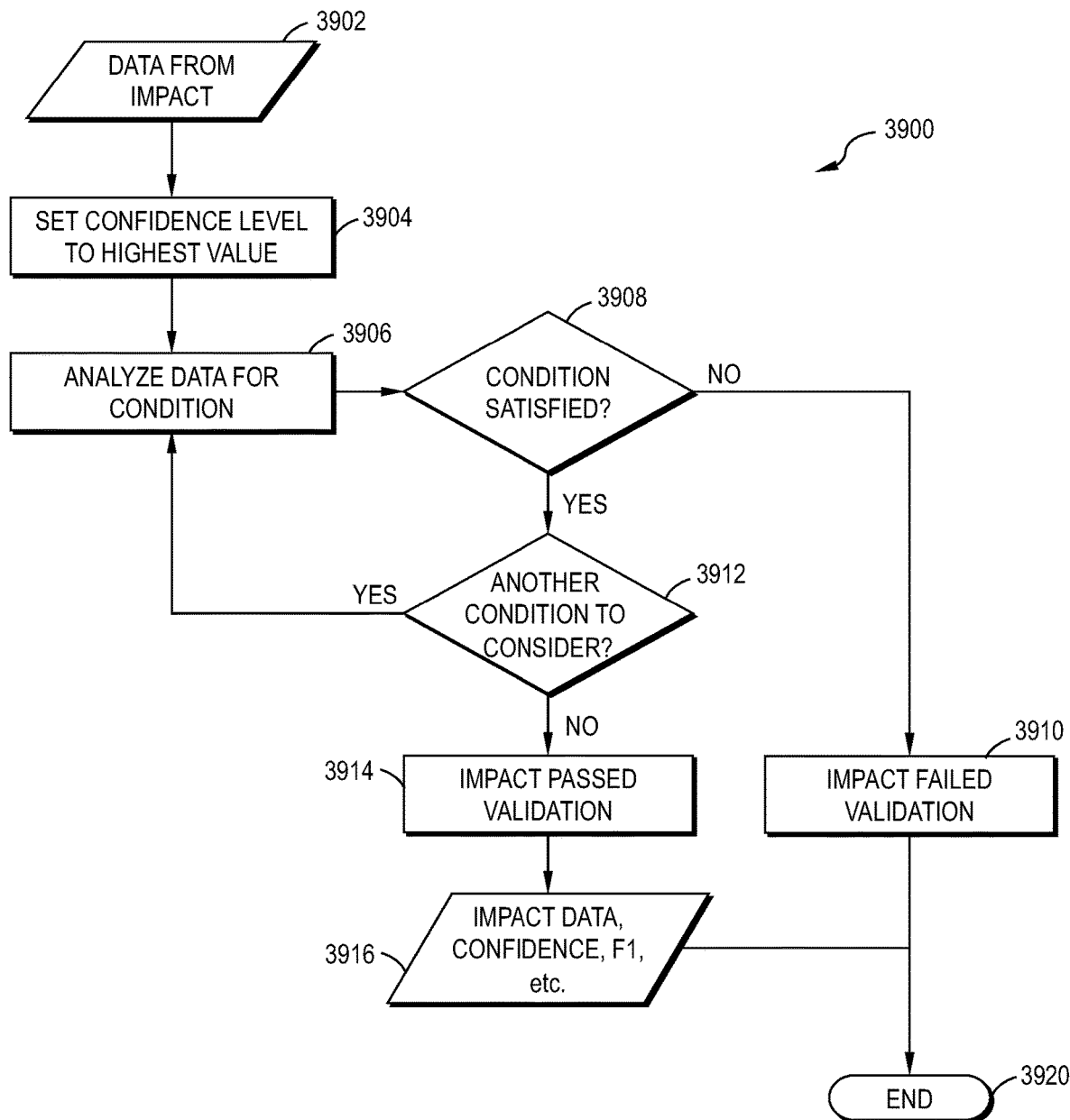
FIG. 39 is a flow diagram illustrating a general method for determining whether an impact is valid.

FIG. 39 is a flow diagram illustrating a general method for determining whether an impact is valid. The method of FIG. 39 begins at step 3902 with data being received from a sensor, such as an accelerometer, resulting from impacting a cantilever of a post-tensioned rod. At step 3904, an initial confidence level corresponding to the impact can be set, for example, to a level of 1. At step 3906, the received data can be analyzed to determine whether a first condition is met including, for example, any of the conditions illustrated and described in connection with FIG. 34. At step 3908, it can be determined whether the condition is satisfied. If the condition is not satisfied, the impact fails validation (step 3910) and the method is ended at step 3920. If the condition is satisfied, it can be determined at step 3912 whether the data should be analyzed for another condition. If another condition is to be considered, the method repeats at step 3906 for the next condition. If no other conditions are to be considered, the impact passes validation (step 3914) and data from the impact, the confidence level, and the value for F1 (if determined) are returned (step 3916). The method is ended at step 3920.

Determining F2. As discussed above in connection with step 3312 of the method of FIG. 33, a value for the second modal frequency (F2) can be determined from the data received from an accelerometer. There are several ways to determine F2. One example is the method of FIG. 40.

Figure 40:
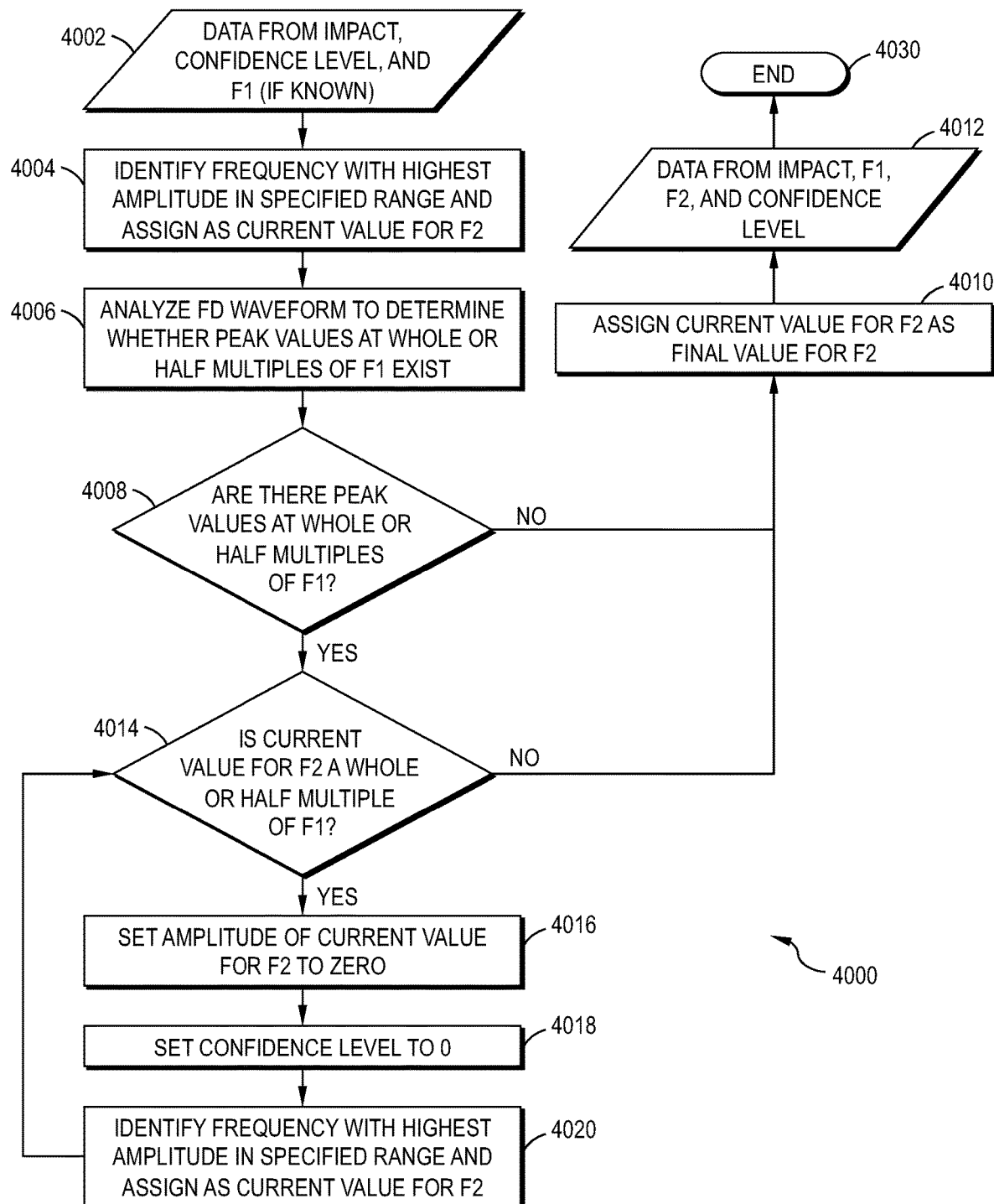
FIG. 40 is a flow diagram illustrating an example method for determining a second modal frequency.

FIG. 40 is a flow diagram illustrating an example method for determining a second modal frequency. The method begins at step 4002 by receiving data from a sensor, such as an accelerometer, resulting from impacting a cantilever of a post-tensioned rod, the confidence level associated with the impact, and a value for F1 (if known). At step 4004, the received data can be analyzed to identify a frequency with the highest amplitude in a specified frequency range. The specified range can be, for example, a frequency range that is known to likely contain a second modal frequency for the rod. For example, the frequency range can be approximately 3.9 to 6 times the frequency of F1. It should be noted that if the value of F1 was not previously determined, it can be determined at this step. The frequency with the highest amplitude in the specified range is assigned as the current value for F2.

At step 4006, the received data can be analyzed in the frequency domain to determine whether peak values at frequencies corresponding to whole or half multiples of F1 exist, such as, for example, at 1.5 times F1 and at 2 times F1. If it is determined at step 4008 that peak values do not exist at whole or half multiples of F1, the current value for F2 can be assigned as the final value for F2 at step 4010. If it is determined at step 4008 that peak values at whole or half multiples of F1 exist, it is determined at step 4014 whether the current value for F2 is a whole or half multiple of F1. For example, the current value for F2 can be analyzed to determine if it is 4.5 times F1 or 5 times F1. If the current value for F2 is not a whole or half multiple of F1, the current value for F2 can be assigned as the final value for F2 at step 4010. If the current value for F2 is a whole or half multiple of F1, the amplitude at the current value for F2 can be set to zero (step 4016) and the confidence level can be set to 0 (step 4018). The confidence level can be set to 0 because the current value for F2 is discarded at step 4016, indicating that the next value for F2 could be incorrect.

At step 4020, the received data is analyzed again in the specified range to identify a frequency with the highest amplitude, which is assigned as the current value for F2. At step 4014, the current value of F2 is analyzed to determine whether it is a whole or half multiple of F1. This process can be repeated until the current value of F2 is not a whole or half multiple of F1. When the final value of F2 is set at step 4010, data from the impact, values for F1 and F2, and the confidence level are returned at step 4012. The method is ended at step 4030.

Data validation. As discussed above in connection with step 3320 of the method of FIG. 33, a data set comprising the stored data (e.g., impact data, F1, F2, confidence levels, related data) can be validated. There are different ways to validate the data set. One example is the method of FIG. 41.

Figure 41:
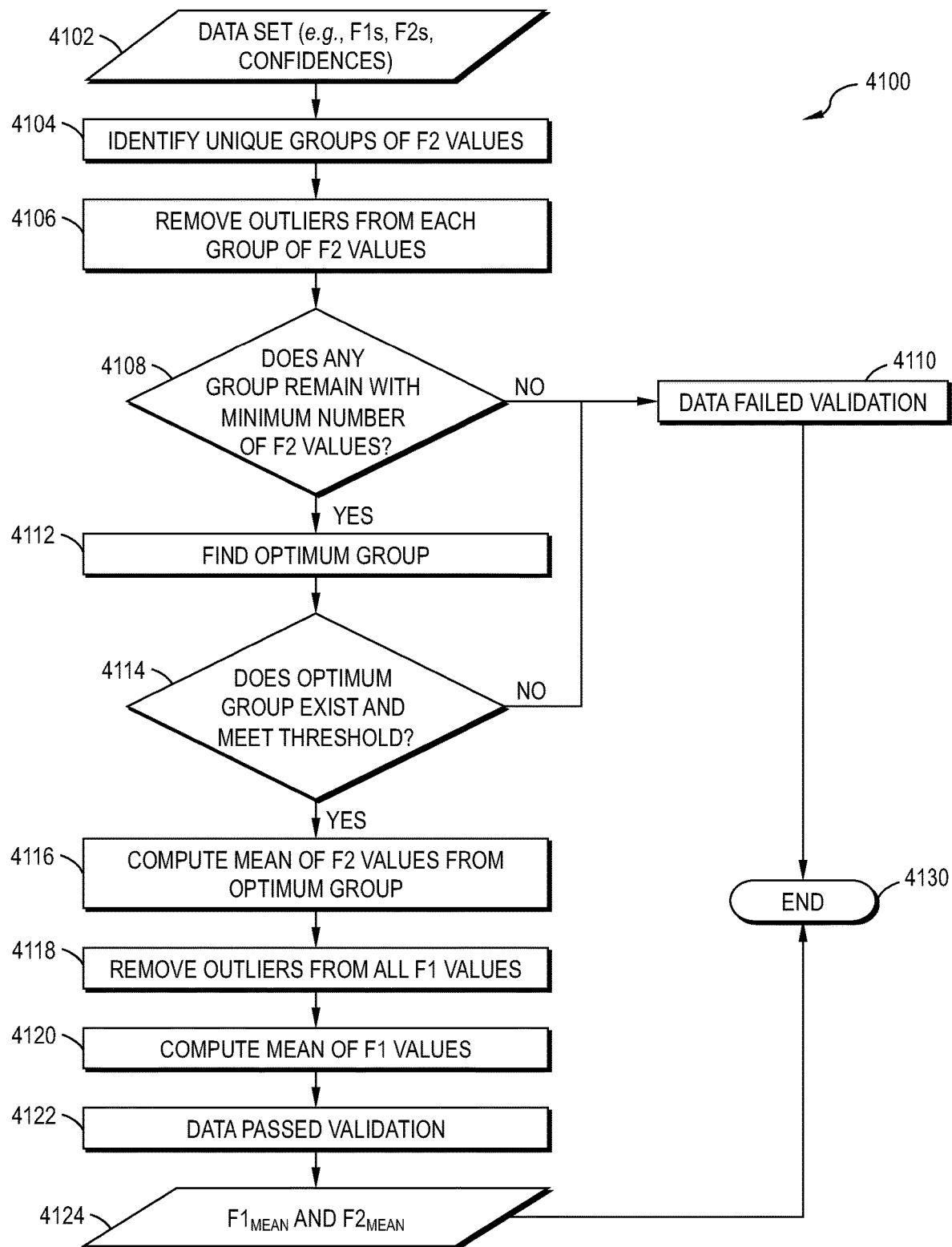
FIG. 41 is a flow diagram illustrating an example method for validating a data set.

FIG. 41 is a flow diagram illustrating an example method for validating a data set. The method begins at step 4102 by receiving the data set. As noted above, the data set can include values for F1, F2, and confidence levels associated with each of the impacts. At step 4104, the values of F2 can be grouped into unique groups. At step 4106, outlier values for F2 can be removed from each unique group. At step 4108, it is determined whether any of the unique groups contains a minimum number of F2 values, for example, at least five values. If none of the unique groups contains a minimum number of F2 values, the data set fails validation (step 4110) and the method is ended at step 4130.

If it is determined at step 4108 that at least one group contains a minimum number of F2 values, an optimum group can be found at step 4112. It should be noted that if only one group contains a minimum number of F2 values, that group will be the optimum group. If more than one group contains a minimum number of F2 values, the optimum group could be, for example, the group having the highest confidence levels.

At step 4114, the optimum group can be analyzed to determine if it meets a certain threshold. For example, the optimum group can be analyzed to determine if there are at least five F2 values, and that either one F2 value has the highest confidence level or at least five F2 values have the next highest confidence level. For example, where confidence levels comprise 1, 0.5, and 0, it can be determined at step 4114 whether there are at least five F2 values where at least one of the values has a confidence level of 1, or whether there are at least five F2 values where at least five of the values have a confidence level of 0.5. If the optimum group does not meet the threshold, the data set fails validation (step 4110) and the method is ended at step 4130.

If the optimum group meets the threshold, the average of all F2 values within the group can be determined at step 4116. At step 4118, outlier values for F1 can be removed from the data set. At step 4120, the average of all remaining F1 values within the data set can be determined. The data set passes validation (step 4122) and the average values of F1 and F2 are returned at step 4124. The method is ended at step 4130.

Unique Groups. As discussed above in connection with step 4104 of the method of FIG. 41, the values of F2 can be grouped into unique groups. There are several ways to group values of F2 into unique groups. One example is the method of FIG. 42.

Figure 42:
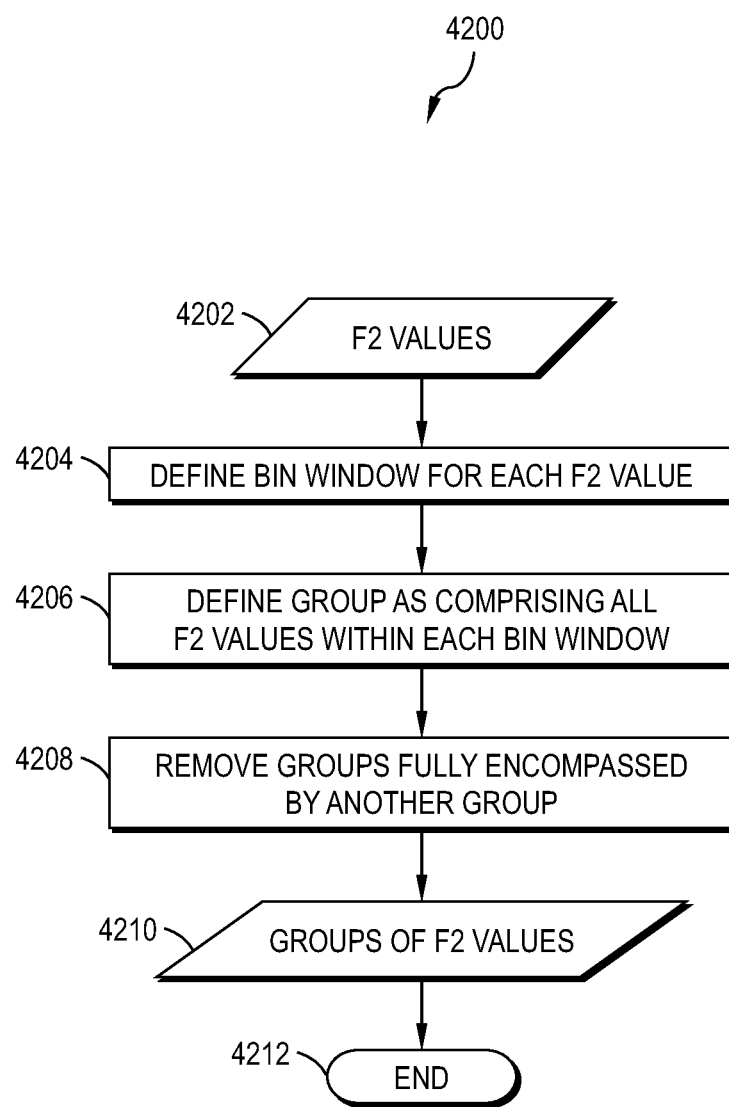
FIG. 42 is a flow diagram illustrating an example method for grouping values of second modal frequencies into unique groups.

FIG. 42 is a flow diagram illustrating an example method for grouping values of F2 into unique groups. The method begins at step 4202 by receiving values for F2. At step 4204, a bin window can be defined for each value of F2. For example, a bin window can comprise a frequency range spanning from F2 to a value of F2 plus a frequency differential, such as 50 Hz. In this regard, each value of F2 will have its own bin window. At step 4206, groups of values for F2 can be defined. For example, a group can be defined as all values of F2 that fall within each bin window. At step 4208, groups that are fully encompassed within another group can be discarded. In this regard, the groups of F2 values at step 4210 will comprise unique groups of values for F2. The method ends at step 4212.

Removing Outliers. As discussed above in connection with steps 4106 and 4118 of the method of FIG. 41, outlier values of F2 and F1, respectively, can be removed. There are several ways to define an outlier and to remove them. One example is the method of FIG. 43.

Figure 43:
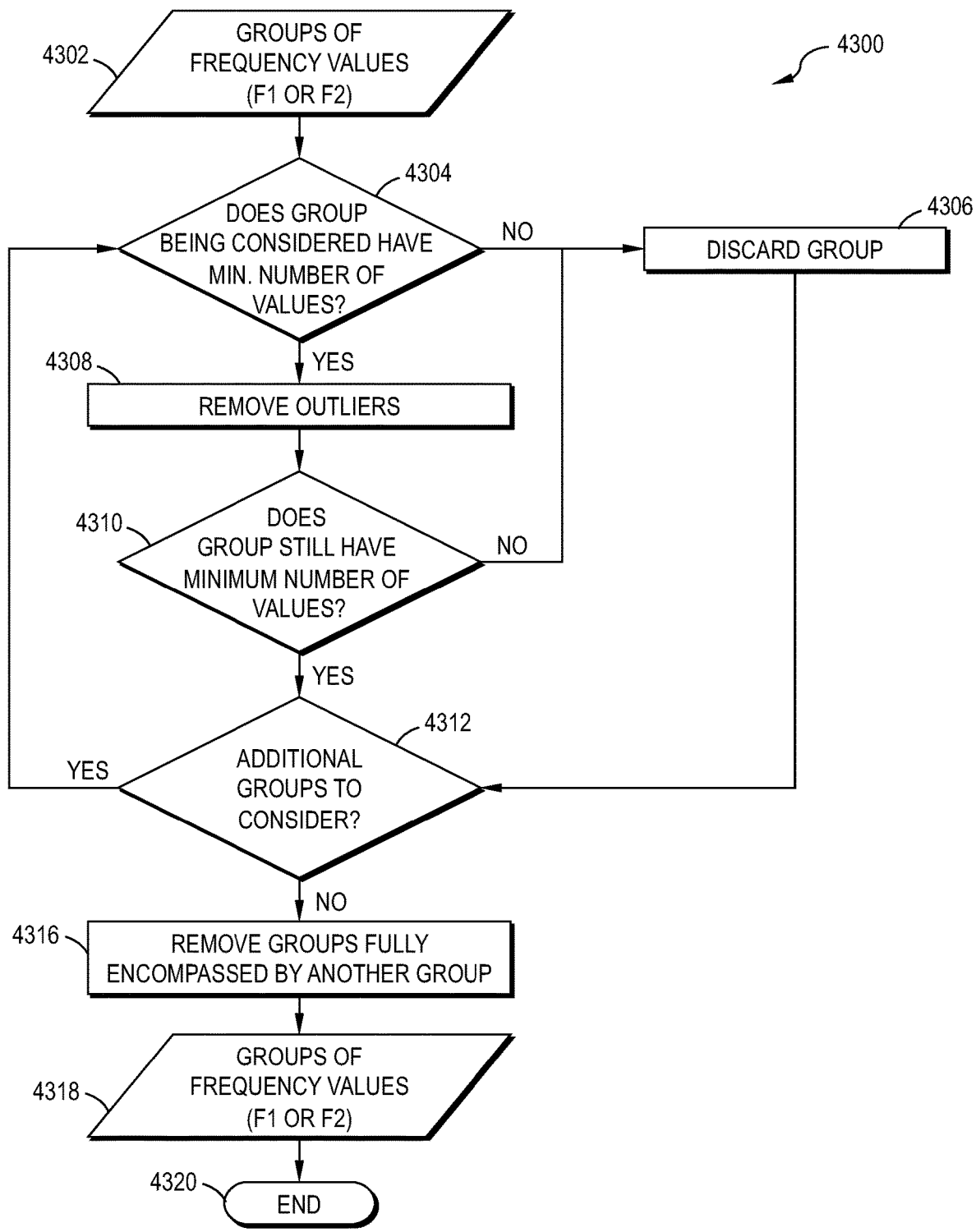
FIG. 43 is a flow diagram illustrating an example method for removing outlier values of a first modal frequency and/or a second modal frequency.

FIG. 43 is a flow diagram illustrating an example method for removing outlier values of F1 and/or F2. The method begins at step 4302 by receiving groups of values for F1 or F2, such as, for example, unique groups of F2. At step 4304, it is determined whether the first group contains a minimum number of values, for example, at least five values. If the group does not contain a minimum number of values, the group can be discarded at step 4306 and it can be determined, at step 4312, whether there are additional groups to consider. If there are additional groups to consider, the next group can be analyzed at step 4304 to determine whether it contains a minimum number of values and the process can be repeated.

If, at step 4304, the group being considered is determined to contain a minimum number of values, outlier values can be removed from the group at step 4308. An outlier can be defined, for example, as a value greater than five standard deviations away from an average of the other values in the group. At step 4310, it can be determined whether the group being considered still has a minimum number of values, for example, at least five values, after outliers were removed in step 4308. If the group does not contain a minimum number of values, the group can be discarded at step 4306 and it can be determined, at step 4312, whether there are additional groups to consider.

If it is determined at step 4310 that the group being considered has a minimum number of values, it can be determined at step 4312 whether there are additional groups to consider and the process described above can be repeated. If it is determined at step 4312 that there are no additional groups to consider, groups fully encompassed by another group can be discarded at step 4316 and the groups of frequency values (F1 or F2) can be returned at step 4318. The method is ended at step 4320.

It will be appreciated that when the method of FIG. 43 is applied to only one received group, such as a group of F1 values, and it is determined at step 4304 that the group does not contain a minimum number of values, the group will be discarded at step 4306 and no additional groups will remain. In that case, no groups will be fully encompassed by another group at step 4316. Accordingly, no groups will be returned at step 4318. When the method of FIG. 43 is applied in connection with step 4106 of the method of FIG. 41, the data set will fail validation because, at step 4108, no group will contain a minimum number of values.

Optimum Group. As discussed above in connection with step 4112 of the method of FIG. 41, an optimum group of F2 values can be found. There are several ways to define and find an optimum group. One example is the method of FIG. 44.

Figure 44:
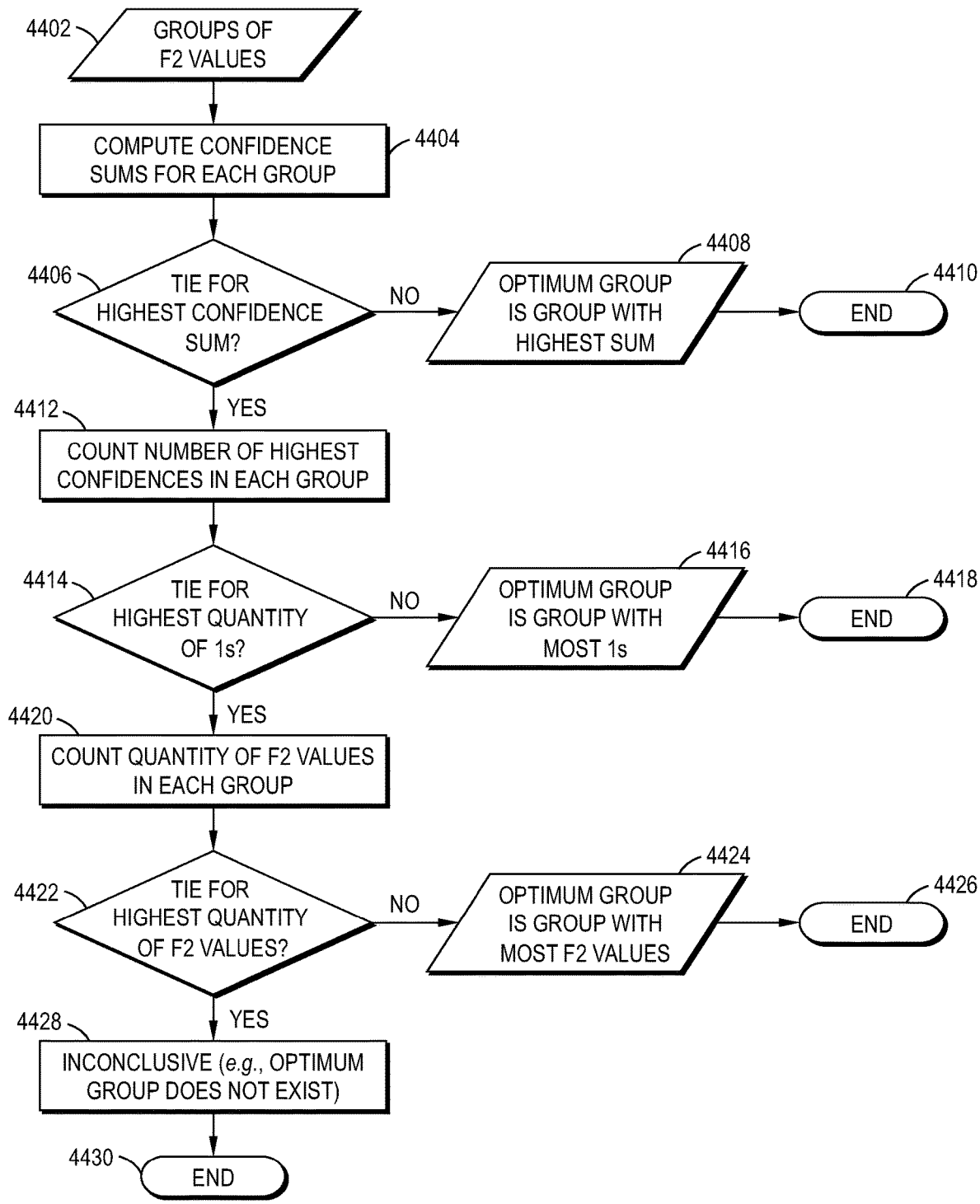
FIG. 44 is a flow diagram illustrating an example method for finding an optimum group of values for a second modal frequency.

FIG. 44 is a flow diagram illustrating an example method for finding an optimum group of F2 values. The method begins at step 4402 by receiving groups of F2 values, such as unique groups. At step 4404, the sum of confidence levels for each group can be computed. At step 4406, it is determined whether more than one group has the same highest confidence sum (i.e., a tie). If only one group has the highest confidence sum, that group is the optimum group and is returned at step 4408. The method is ended at step 4410.

If more than one group has the same highest confidence sum, the number of the highest confidence levels in each group can be determined at step 4412. For example, where confidence levels comprise 1, 0.5, and 0, at step 4412, the number of 1s for each group can be determined. At step 4414, it is determined whether more than one group has the same number of highest confidence levels. If only one group has the most highest confidence levels, that group is the optimum group and is returned at step 4416. The method is ended at step 4418.

If more than one group has the same number of highest confidence levels, the amount of F2 values in each group can be determined at step 4420. At step 4422, it is determined whether more than one group has the same number of F2 values. If only one group has the most F2 values, that group is the optimum group and is returned at step 4424. The method is ended at step 4426.

If more than one group has the same number of F2 values, determining the optimum group is inconclusive (step 4428) and the method is ended at step 4430.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. For example, while many of the embodiments and the principles of the inventions have been explained in the context of first and second modal frequencies of post-tensioned rods, it is contemplated herein that other modal frequencies may be used as well. Further, the sequence of steps for the example methods described or illustrated herein are not to be construed as necessarily requiring their performance in the particular order described or illustrated unless specifically identified as requiring so or clearly identified through context. Moreover, the example methods may omit one or more steps described or illustrated, or may include additional steps in addition to those described or illustrated. Thus, one of ordinary skill in the art, using the disclosures provided herein, will appreciate that various steps of the example methods can be omitted, rearranged, combined, and/or adapted in various ways without departing from the spirit and scope of the inventions.

What is claimed is:

1. A method of estimating tension in a target post-tensioned rod, the method comprising:
    modeling tension for a plurality of post-tensioned rods as a function of frequency differences between a first and a second modal frequency and cantilever length of each rod;
    measuring the length of a cantilever of the target post-tensioned rod;
    determining a first modal frequency of the target post-tensioned rod;
    determining a second modal frequency of the target post-tensioned rod;
    determining a frequency difference between the first modal frequency and the second modal frequency for the target post-tensioned rod; and
    estimating tension in the target post-tensioned rod based on at least the model.

2. The method of claim 1, wherein modeling tension for the plurality of post-tensioned rods comprises:
    for each post-tensioned rod in the plurality;
        obtaining a frequency response for one or more levels of tension; and
        recording the length of a cantilever portion at each of the one or more levels of tension;
    determining, from the frequency responses for each post-tensioned rod, frequency differences between first and second modal frequencies at each of the one or more levels of tension;
    grouping the cantilever lengths into one or more groups; and
    performing regression analysis for each group, wherein the regression analysis is based on at least the frequency differences and the levels of tension.

3. The method of claim 2, wherein obtaining a frequency response for one or more levels of tension comprises:
    setting tension in the post-tensioned rod to one or more levels of tension;
    for each level of tension,
        detachably coupling an accelerometer to the cantilever portion of the post-tensioned rod;
        applying one or more transversely-directed impacts to the cantilever portion of the post-tensioned rod;
        receiving temporal data from the accelerometer associated with a vibrational response for each of the one or more impacts;
        transforming the temporal data to the frequency domain to obtain a frequency response for each of the one or more impacts;
        measuring the level of tension in the post-tensioned rod; and
        associating a level of tension in the post-tensioned rod with each of the one or more frequency responses.

4. The method of claim 3, wherein associating a level of tension in the post-tensioned rod with each of the one or more frequency responses comprises:
    finding, for each level of tension, an average of (a) the level of tension set in the post-tensioned rod and (b) the level of tension measured in the post-tensioned rod; and
    associating the average tension with each corresponding frequency response.

5. The method of claim 2, wherein determining, from the frequency responses for each post-tensioned rod, frequency differences between first and second modal frequencies at each of the one or more levels of tension comprises:
    for each level of tension:
        determining a value for the first modal frequency from each frequency response for that level of tension;
        determining a value for the second modal frequency from each frequency response for that level of tension;
        determining an average of the values for the first modal frequency;
        determining an average of the values for the second modal frequency; and
        determining a frequency difference between the average first modal frequency and the average second modal frequency.

6. The method of claim 1, wherein determining a first modal frequency of the target post-tensioned rod comprises:
    detachably coupling an accelerometer to the cantilever portion of the target post-tensioned rod;
    applying one or more transversely-directed impacts to the cantilever portion of the target post-tensioned rod;
    receiving, from the accelerometer, data associated with a vibrational response for each of the one or more impacts;
    determining, from the received data, a value for the first modal frequency for each of the one or more impacts; and
    determining a first modal frequency of the target post-tensioned rod based on an average of the values for the first modal frequency for the one or more impacts.

7. The method of claim 1, wherein determining a second modal frequency of the target post-tensioned rod comprises:
    detachably coupling an accelerometer to the cantilever portion of the target post-tensioned rod;
    applying one or more transversely-directed impacts to the cantilever portion of the target post-tensioned rod;
    receiving, from the accelerometer, data associated with a vibrational response for each of the one or more impacts;
    determining, from the received data, a value for the second modal frequency for each of the one or more impacts; and determining a second modal frequency of the target post-tensioned rod based on an average of the values for the second modal frequency for the one or more impacts.

8. The method of claim 1, wherein estimating tension in the target post-tensioned rod based on at least the model comprises identifying a level of tension in the model that corresponds to the frequency difference and the length of the cantilever portion of the target post-tensioned rod.

9. A method of estimating tension in a target post-tensioned rod, the method comprising:
   determining frequency differences between first and second modal frequencies for:
      a plurality of post-tensioned rods, wherein the frequency differences are determined for each rod at one or more levels of tension; and
      the target post-tensioned rod;
   measuring cantilever lengths of:
      the plurality of post-tensioned rods, wherein the cantilever lengths are measured for each rod at one or more levels of tension; and
      the target post-tensioned rod; and
   applying regression analysis to estimate tension in the target post-tensioned rod, wherein the regression analysis is based on at least the frequency differences determined for the plurality of post-tensioned rods, the frequency difference for the target post-tensioned rod, the measured cantilever lengths for the plurality of post-tensioned rods, and the measured cantilever length of the target post-tensioned rod.

10. The method of claim 9, wherein determining frequency differences between first and second modal frequencies comprises:
   detachably coupling an accelerometer to a cantilever of a post-tensioned rod;
   applying one or more transversely-directed impacts to the cantilever;
   receiving, from the accelerometer, data associated with a vibrational response for each of the one or more impacts;
   determining, for each of the one or more impacts, that a second modal frequency can be determined from the received data;
   determining, from the received data, a value for the first modal frequency corresponding to each impact;
   determining, from the received data, a value for the second modal frequency corresponding to each impact;
   determining, from at least the values for the first modal frequency and the values for the second modal frequency, that a frequency difference can be determined for the values of the first and second modal frequencies; and
   determining a frequency difference between an average of the values for the first modal frequency and an average of the values for the second modal frequency.

11. The method of claim 10, wherein determining, for each of the one or more impacts, that a second modal frequency can be determined from the received data comprises determining, from a time-domain representation of the received data, that a maximum amplitude is below a threshold.

12. The method of claim 10, wherein determining, for each of the one or more impacts, that a second modal frequency can be determined from the received data comprises determining, from a time-domain representation of the received data, that noise is below a threshold.

13. The method of claim 10, wherein determining, for each of the one or more impacts, that a second modal frequency can be determined from the received data comprises determining, from a time-domain representation of the received data, that a minimum amplitude is above a threshold.

14. The method of claim 10, wherein determining, for each of the one or more impacts, that a second modal frequency can be determined from the received data comprises determining, from a time-domain representation of the received data, that the received data decays at an exponential rate until steady state.

15. The method of claim 10, wherein determining, for each of the one or more impacts, that a second modal frequency can be determined from the received data comprises determining, from a frequency-domain representation of the received data, that the sum of amplitudes of composite frequencies in a range is below a threshold.

16. The method of claim 10, wherein determining, for each of the one or more impacts, that a second modal frequency can be determined from the received data comprises:
   determining a first modal frequency from the received data;
   finding a Fast Fourier Transform (FFT) of a frequency-domain representation of the received data;
   determining, from the FFT of the frequency-domain representation of the received data, that an amplitude corresponding to the period of the first modal frequency is less than an amplitude of the received data corresponding to the closest local maxima at a value less than the period of the first modal frequency; and
   determining, from the FFT of the frequency-domain representation of the received data, that the amplitude corresponding to the period of the first modal frequency is less than an amplitude corresponding to twice the period of the first modal frequency.

17. The method of claim 10, wherein determining, for each of the one or more impacts, that a second modal frequency can be determined from the received data comprises determining, from a frequency-domain representation of the received data, that amplitudes of at least three local maxima have widths at half-peak amplitude that is less than a threshold and amplitudes less than half of the maximum possible amplitude for the second modal frequency.

18. The method of claim 10, wherein determining, for each of the one or more impacts, that a second modal frequency can be determined from the received data comprises determining, from a frequency-domain representation of the received data, that a lower quartile of amplitudes in a range of frequencies is less than a threshold.

19. The method of claim 10, wherein determining, from the received data, a value for the second modal frequency corresponding to each impact comprises:
   identifying a first frequency with the highest amplitude within a first range of frequencies;
   determining, from the received data, whether a frequency-domain representation of the received data contains peak values at any whole or half multiples of a first modal frequency;
   wherein, if the frequency-domain representation of the received data does not contain peak values at any whole or half multiples of the first modal frequency, setting a value for the second modal frequency equal to the first frequency; and wherein, if the frequency-domain representation of the received data contains peak values at any whole or half multiples of the first modal frequency,
setting the amplitude at the first frequency to zero; and
setting a value for the second modal frequency equal to a second frequency with the highest amplitude within the first range of frequencies.

20. The method of claim 10, wherein determining, from at least the values for the first modal frequency and the values for the second modal frequency, that a frequency difference can be determined for the values of the first and second modal frequencies comprises:
identifying unique groups of values for the second modal frequency;
removing outliers from each unique group of values for the second modal frequency;
determining, from the unique groups, an optimum group;
computing, from the optimum group, an average of the values for the second modal frequency;
removing outliers from the values of the first modal frequency; and
computing an average of the remaining values for the first modal frequency.

21. The method of claim 20, wherein identifying unique groups of values for the second modal frequency comprises:
defining, for each value for the second modal frequency, a bin window that corresponds to the value plus a frequency differential;
defining, for each bin window, a group as comprising all values for the second modal frequency that fall within the bin window; and
discarding groups that are fully encompassed within another group.

22. The method of claim 20, wherein removing outliers from each unique group of values for the second modal frequency comprises:
discarding each unique group that contains an amount of values for the second modal frequency below a minimum threshold of values;
discarding, for each remaining unique group, any value that is greater than five standard deviations away from an average of the remaining values in the group;
discarding each remaining unique group that contains an amount of values for the second modal frequency below the minimum threshold of values; and
discarding groups that are fully encompassed within another group.

23. The method of claim 20, wherein determining, from the unique groups, an optimum group comprises:
computing confidence sums for each unique group; and
identifying an optimum group as the group with the highest confidence sum;
wherein, if two or more groups have the same highest confidence sum, identifying an optimum group as the group containing the most number of the highest confidence level;
wherein, if two or more groups have an equal number of the highest confidence level, identifying an optimum group as the group containing the most values for the second modal frequency;
wherein, if two or more groups have an equal number of values for the second modal frequency, determining that an optimum group cannot be identified.

24. A computing device for estimating tension in a target post-tensioned rod, the computing device comprising:
a display;
an input module configured to receive data from an accelerometer detachably coupled to a post-tensioned rod; and
a processor coupled to the input module and one or more memory devices, wherein the processor is configured to:
execute instructions stored in the one or more memory devices, wherein execution of the instructions causes a graphical user interface to be displayed on the display, wherein the graphical user interface is configured to receive input from a user;
receive, from the input module, and process, data corresponding to vibrational responses associated with impacting a plurality of post-tensioned rods, wherein each impact on each rod in the plurality of post-tensioned rods corresponds to a level of tension;
receive, from the input module, and process, data corresponding to a vibrational response associated with impacting the target post-tensioned rod;
receive, from the graphical user interface, and process, data corresponding to lengths of cantilevers for each rod in the plurality of rods, wherein each length of each cantilever corresponds to a level of tension;
receive, from the graphical user interface, and process, data corresponding to a length of a cantilever of the target post-tensioned rod;
perform regression analysis on the data corresponding to vibrational responses associated with impacting the plurality of post-tensioned rods, the data corresponding to a vibrational response associated with impacting the target post-tensioned rod, the data corresponding to lengths of cantilevers for each rod in the plurality of rods, and the data corresponding to a length of a cantilever of the target post-tensioned rod; and
provide an estimate of the tension in the target post-tensioned rod based on at least the regression analysis.

* * * * *